June 23, 1953   A. BRIECHLE   2,642,773
DOCUMENT PHOTOGRAPHING MACHINE
Filed March 27, 1944   25 Sheets-Sheet 3

INVENTOR
AMBROSIUS BRIECHLE
BY
ATTORNEY

June 23, 1953  A. BRIECHLE  2,642,773
DOCUMENT PHOTOGRAPHING MACHINE
Filed March 27, 1944  25 Sheets-Sheet 5

INVENTOR
AMBROSIUS BRIECHLE
BY
ATTORNEY

Inventor
AMBROSIUS BRIECHLE

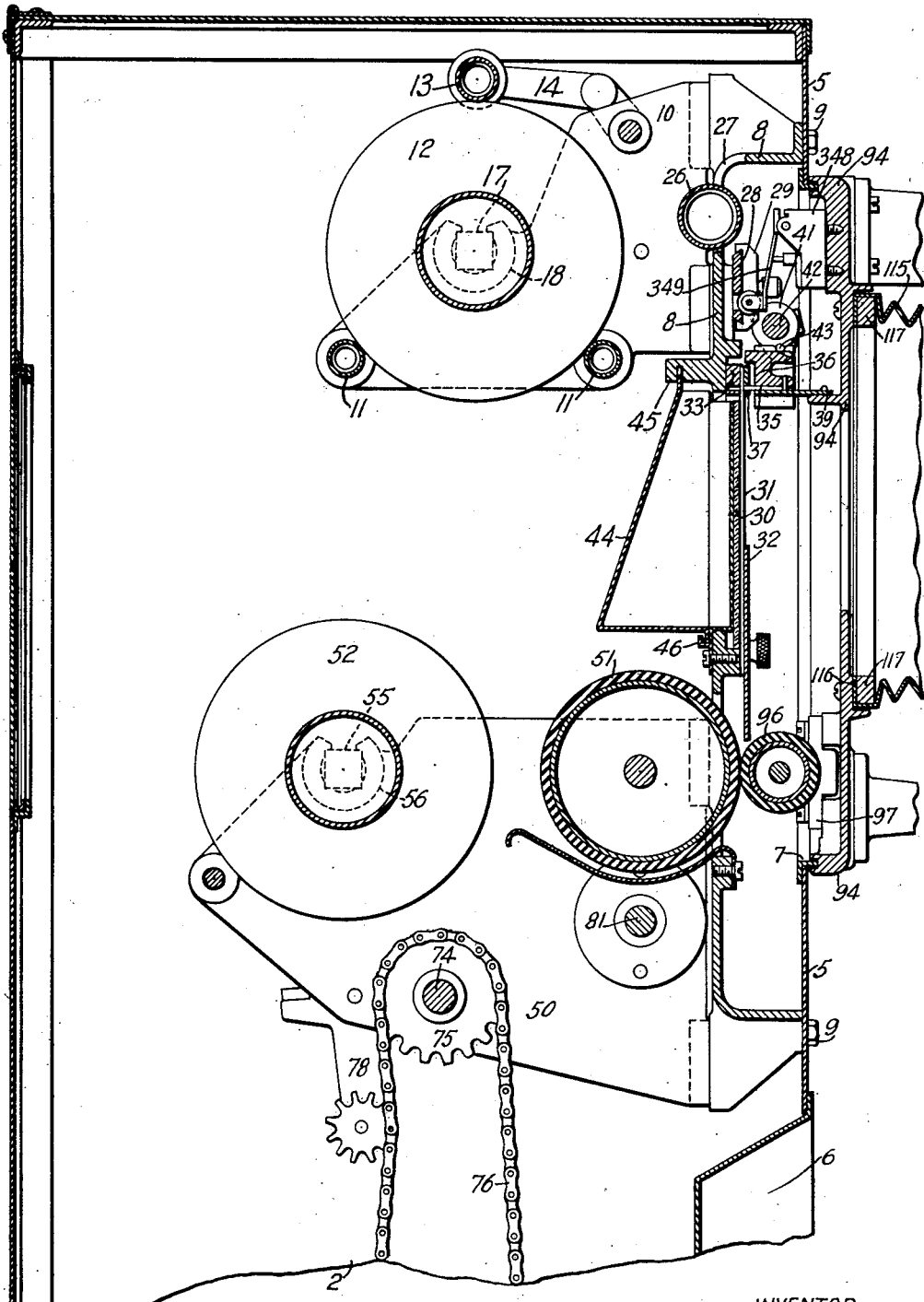

June 23, 1953     A. BRIECHLE     2,642,773
DOCUMENT PHOTOGRAPHING MACHINE
Filed March 27, 1944     25 Sheets-Sheet 9
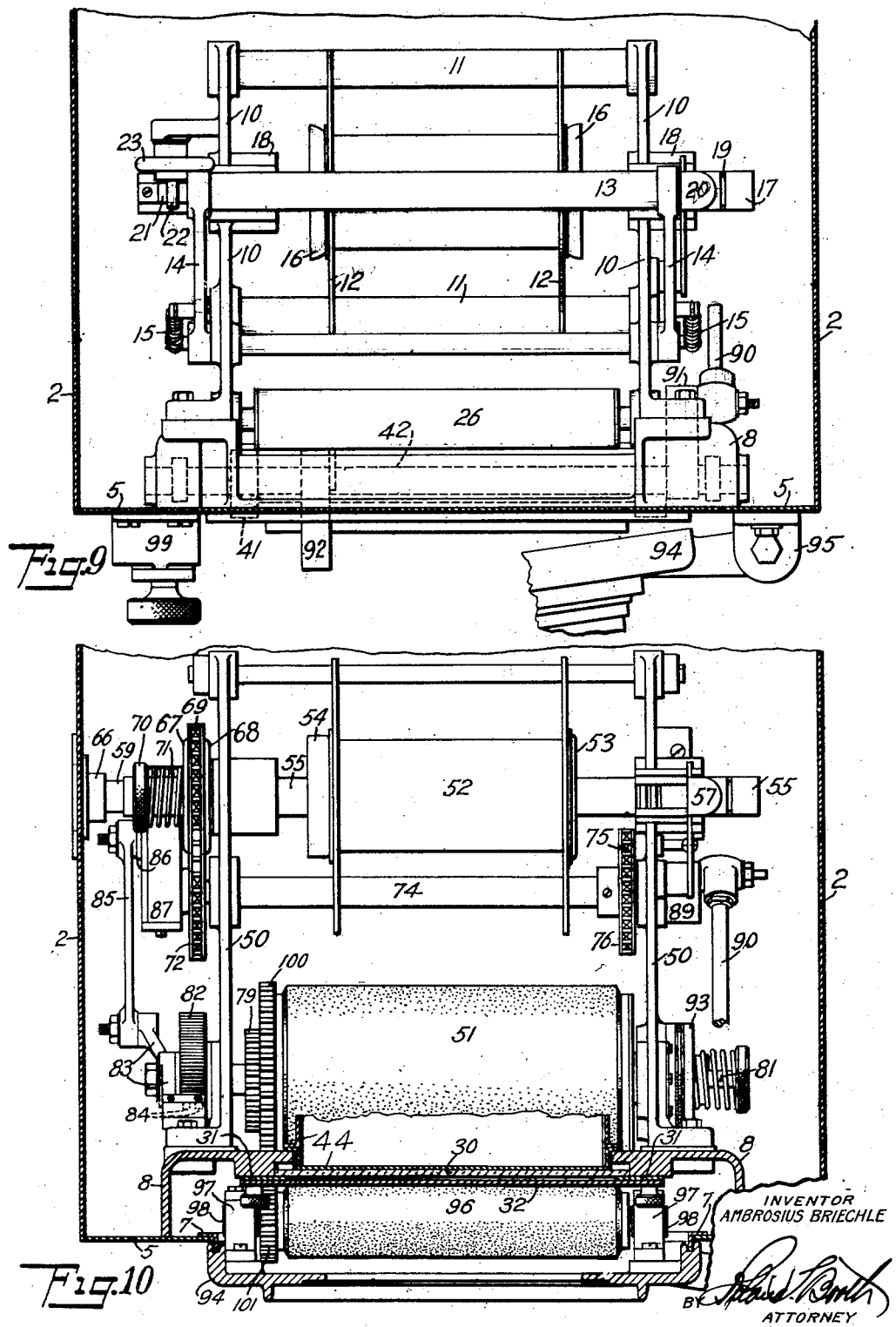

June 23, 1953 A. BRIECHLE 2,642,773
DOCUMENT PHOTOGRAPHING MACHINE
Filed March 27, 1944 25 Sheets-Sheet 10
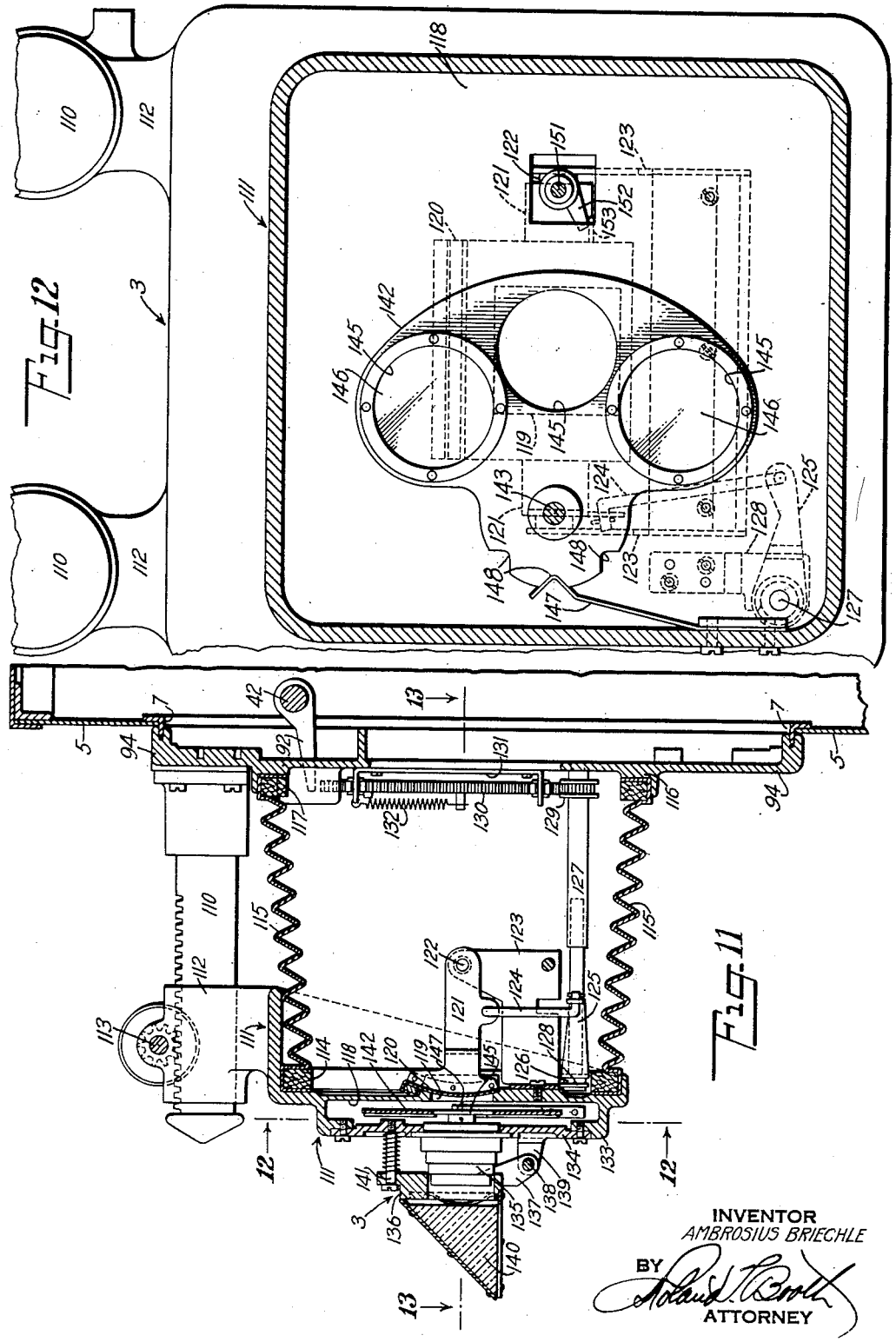
INVENTOR
AMBROSIUS BRIECHLE
BY
ATTORNEY June 23, 1953  A. BRIECHLE  2,642,773
DOCUMENT PHOTOGRAPHING MACHINE
Filed March 27, 1944  25 Sheets-Sheet 11
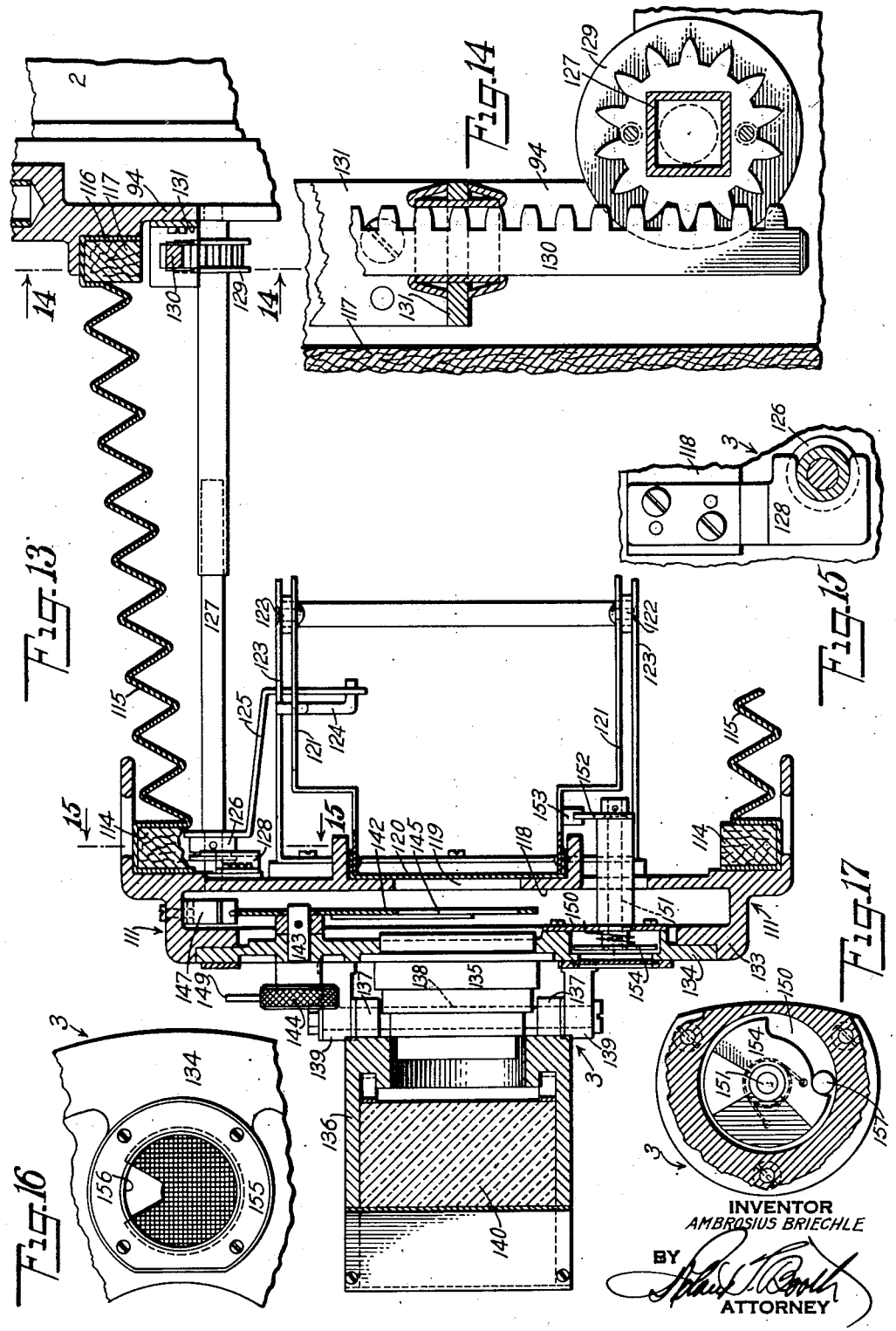
INVENTOR
AMBROSIUS BRIECHLE
BY
ATTORNEY June 23, 1953 A. BRIECHLE 2,642,773
DOCUMENT PHOTOGRAPHING MACHINE
Filed March 27, 1944 25 Sheets-Sheet 12
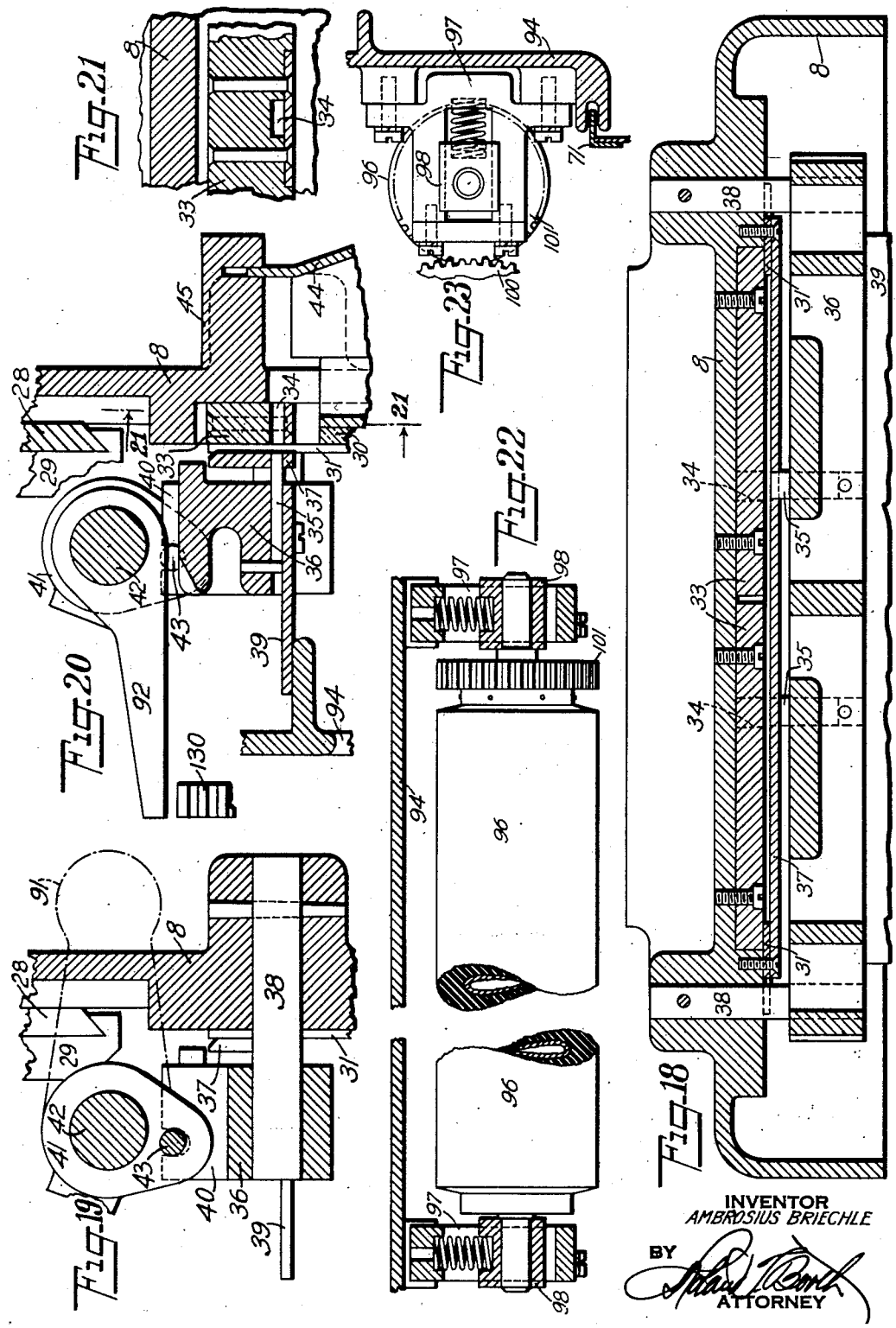

June 23, 1953 A. BRIECHLE 2,642,773
DOCUMENT PHOTOGRAPHING MACHINE
Filed March 27, 1944 25 Sheets-Sheet 13
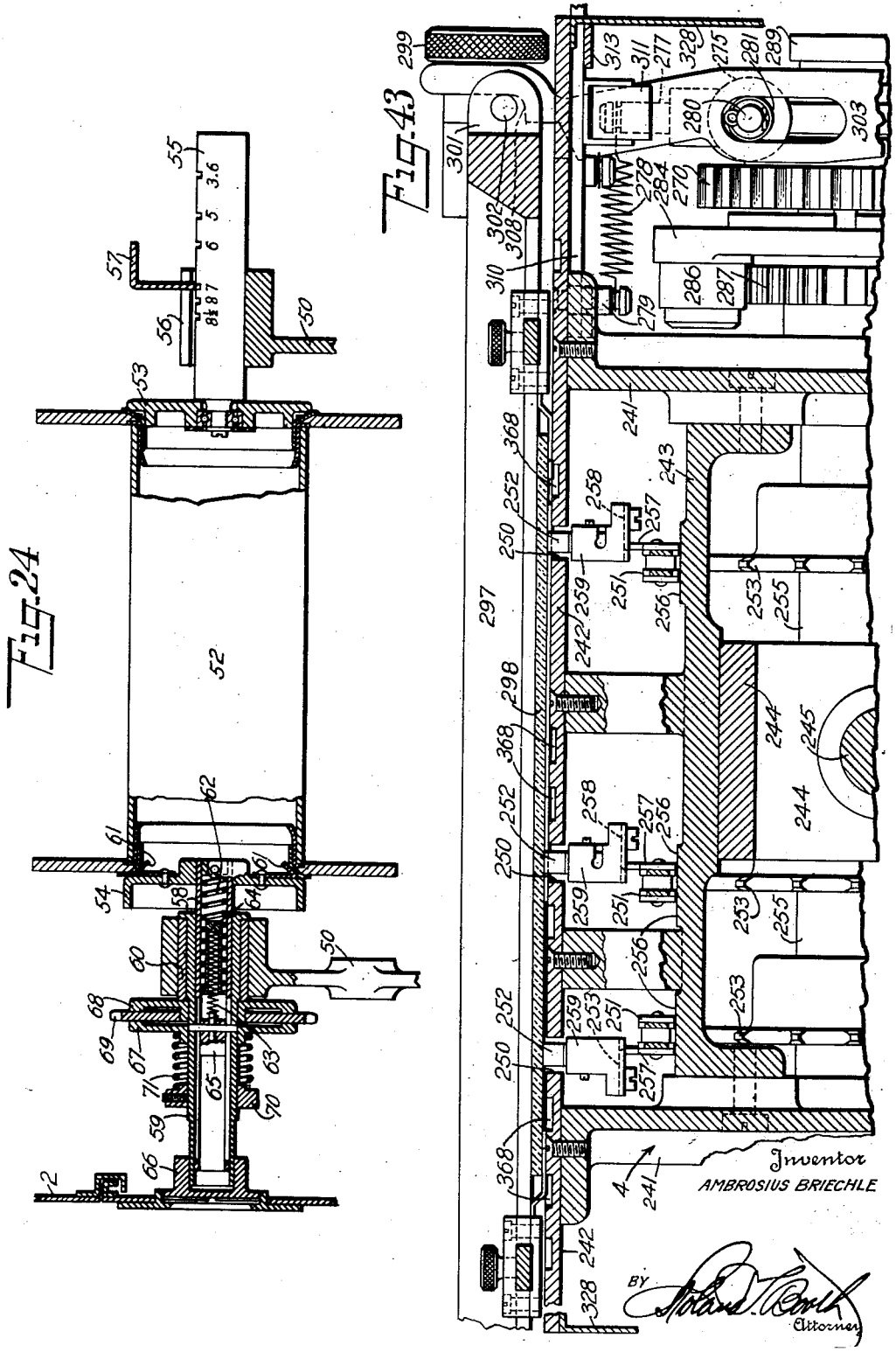
Inventor
AMBROSIUS BRIECHLE June 23, 1953  A. BRIECHLE  2,642,773
DOCUMENT PHOTOGRAPHING MACHINE
Filed March 27, 1944  25 Sheets-Sheet 18
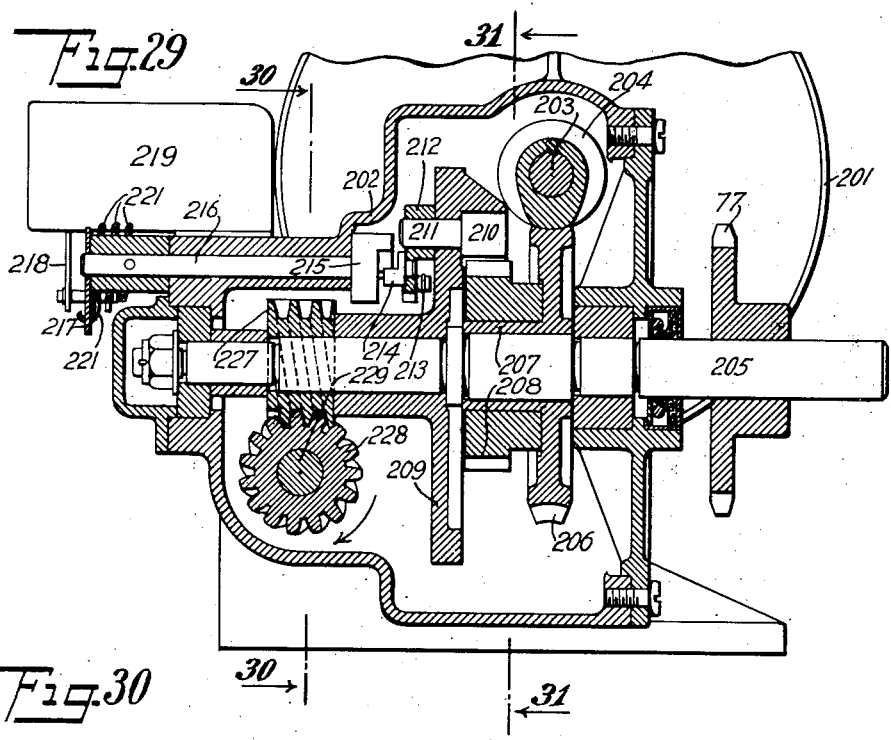
Fig. 29
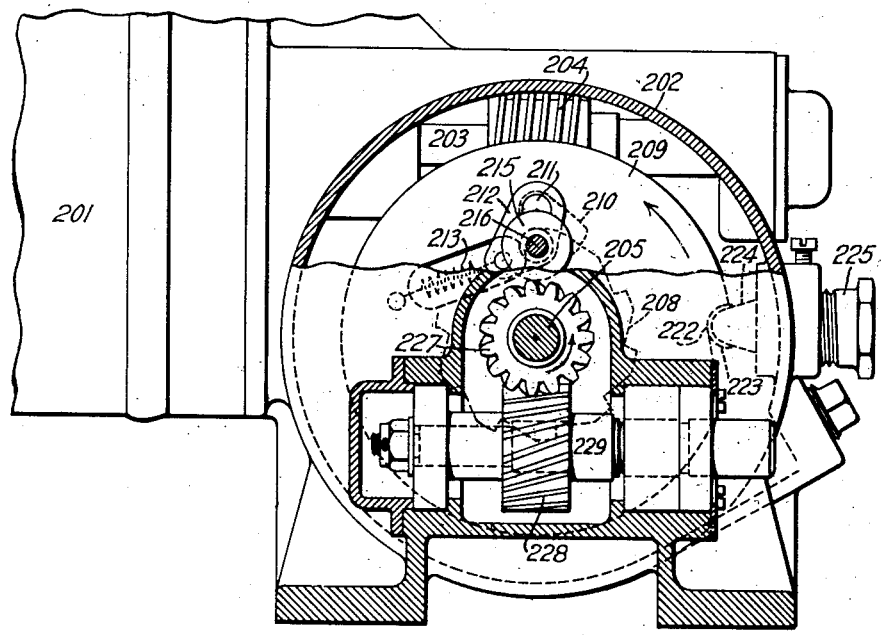
Fig. 30
INVENTOR
AMBROSIUS BRIECHLE
BY
ATTORNEY June 23, 1953 A. BRIECHLE 2,642,773
DOCUMENT PHOTOGRAPHING MACHINE
Filed March 27, 1944 25 Sheets-Sheet 19
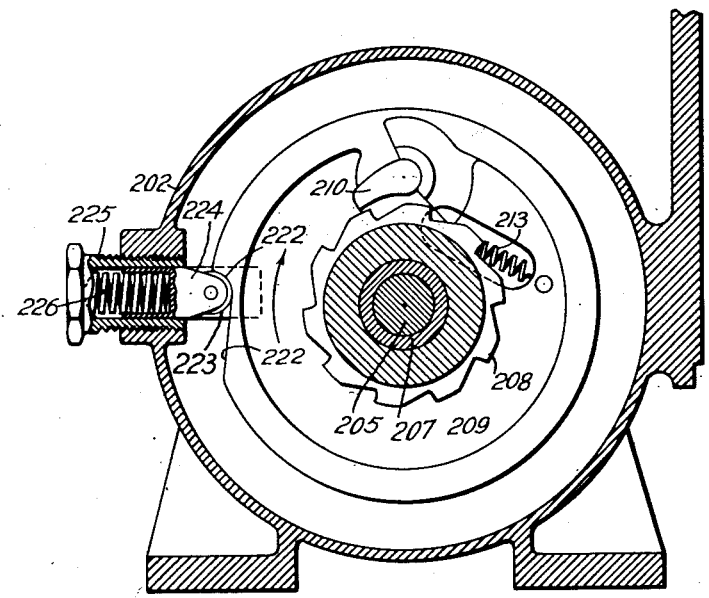
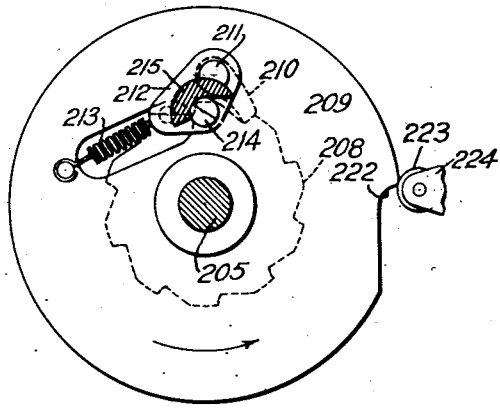 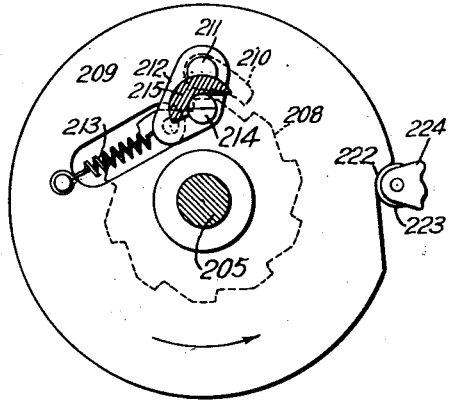
Inventor
AMBROSIUS BRIECHLE
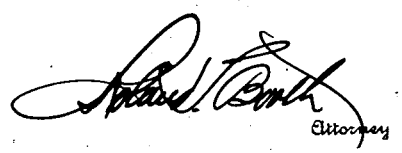

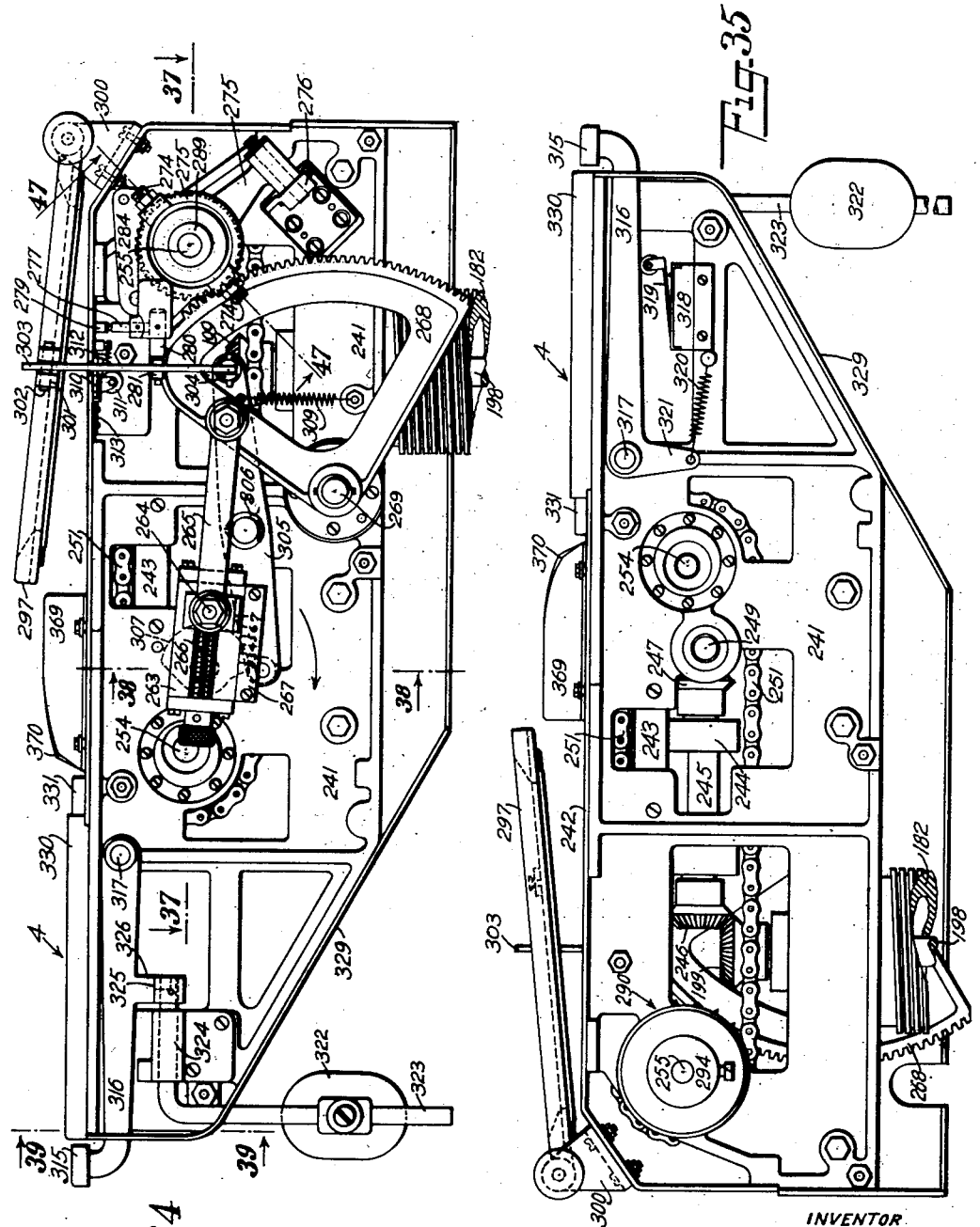

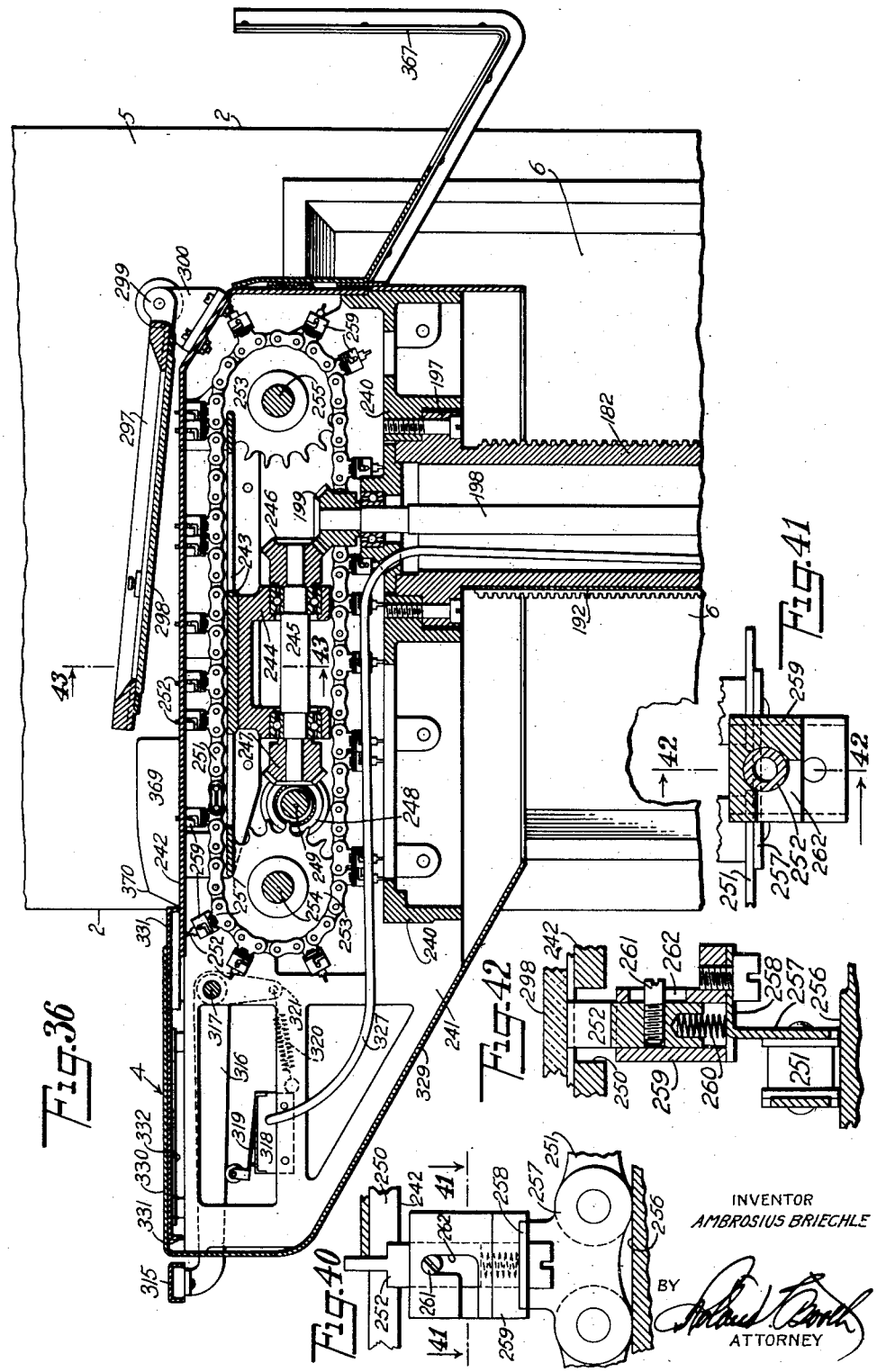

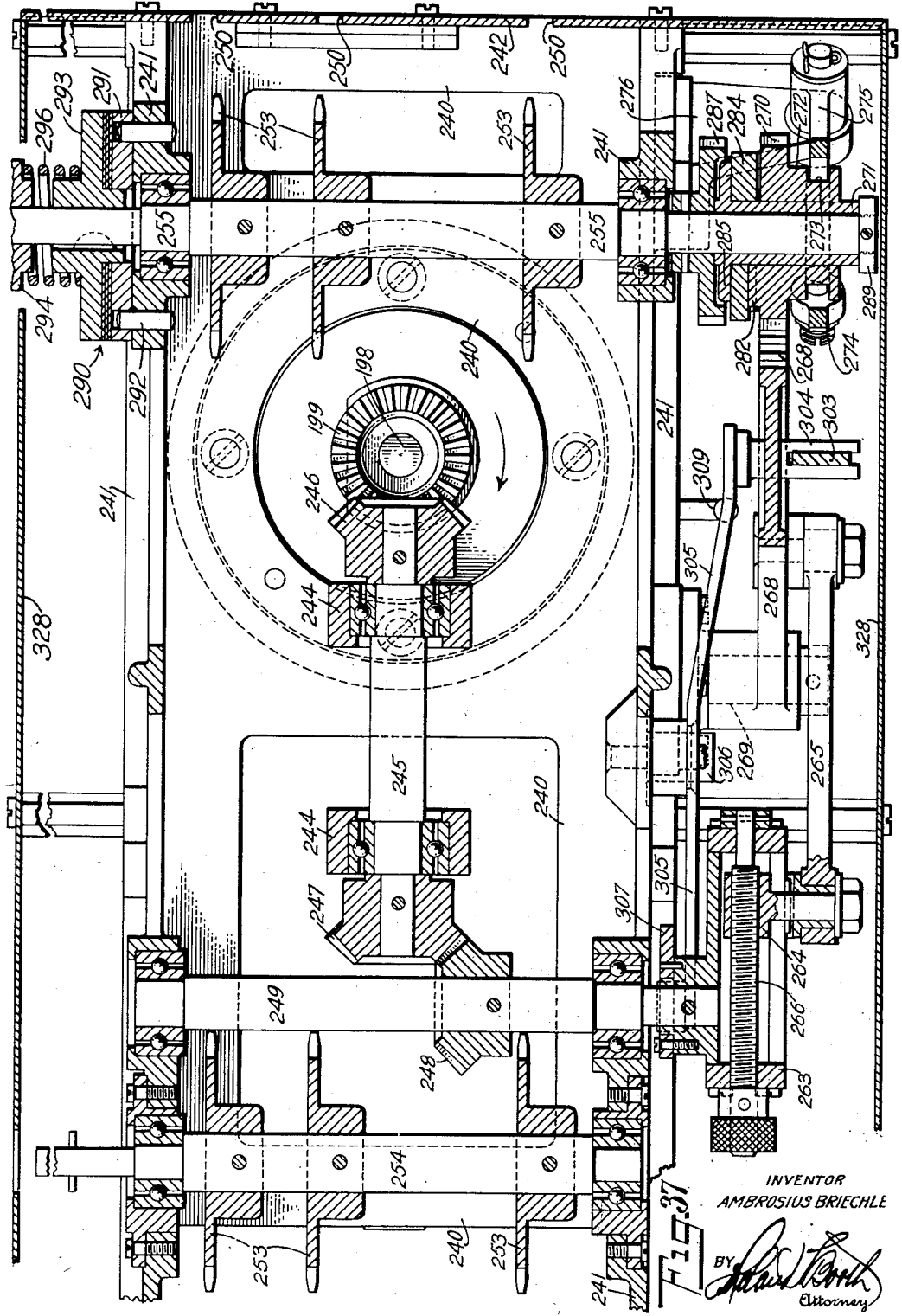

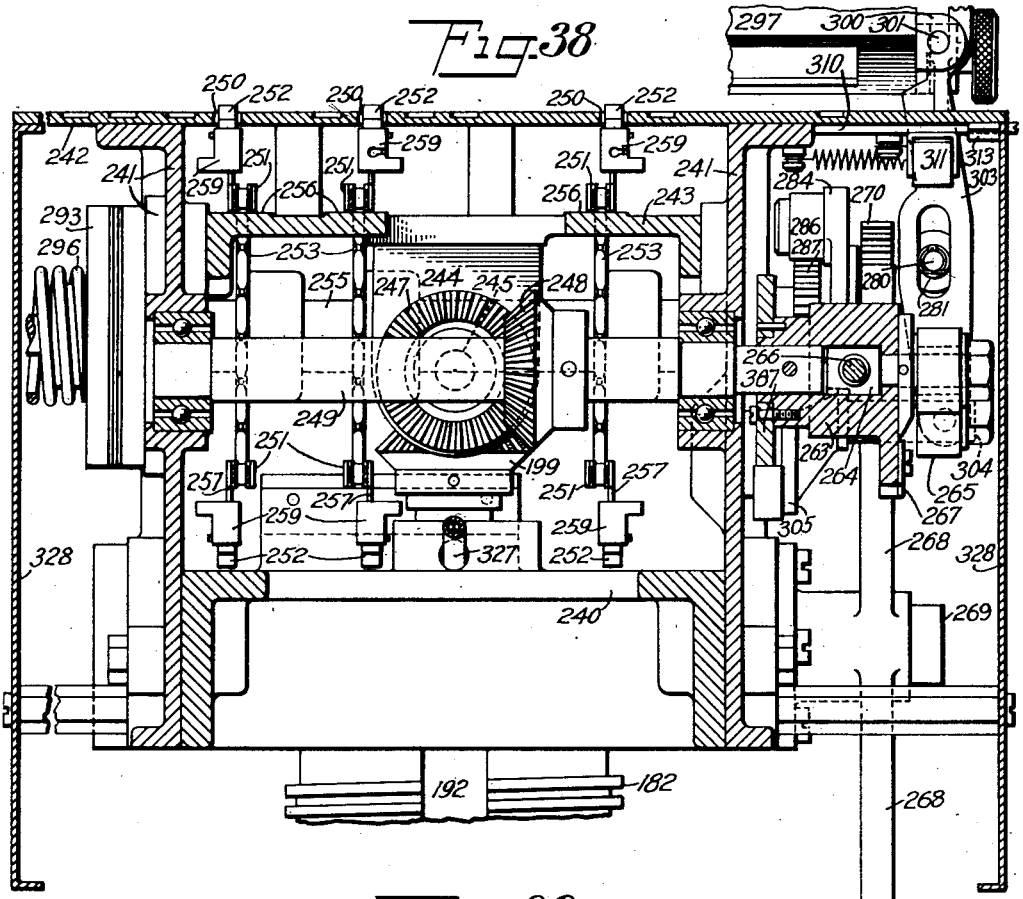
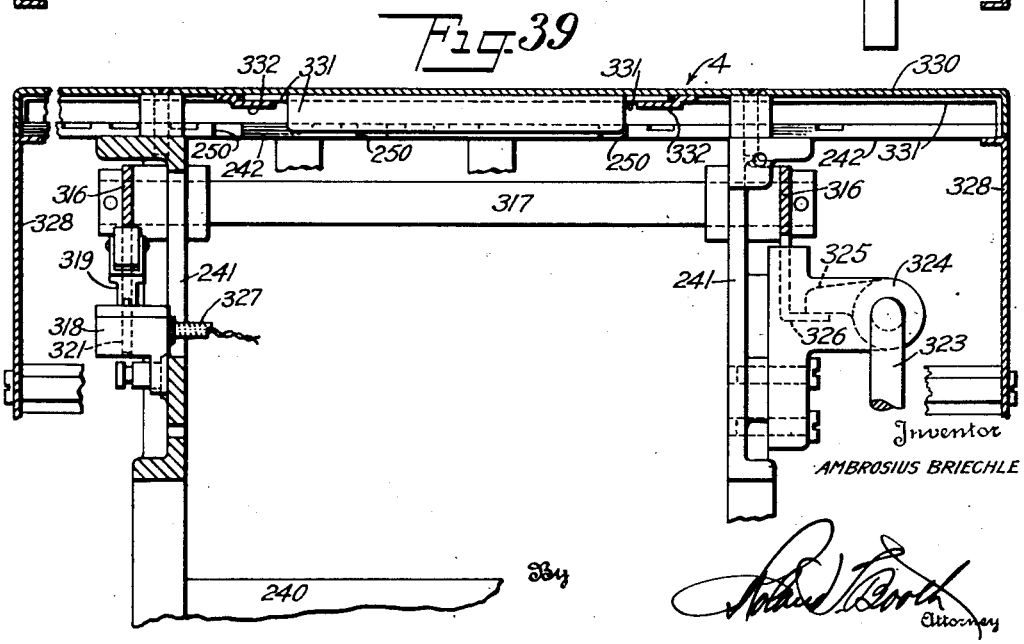

June 23, 1953    A. BRIECHLE    2,642,773
DOCUMENT PHOTOGRAPHING MACHINE
Filed March 27, 1944    25 Sheets-Sheet 24
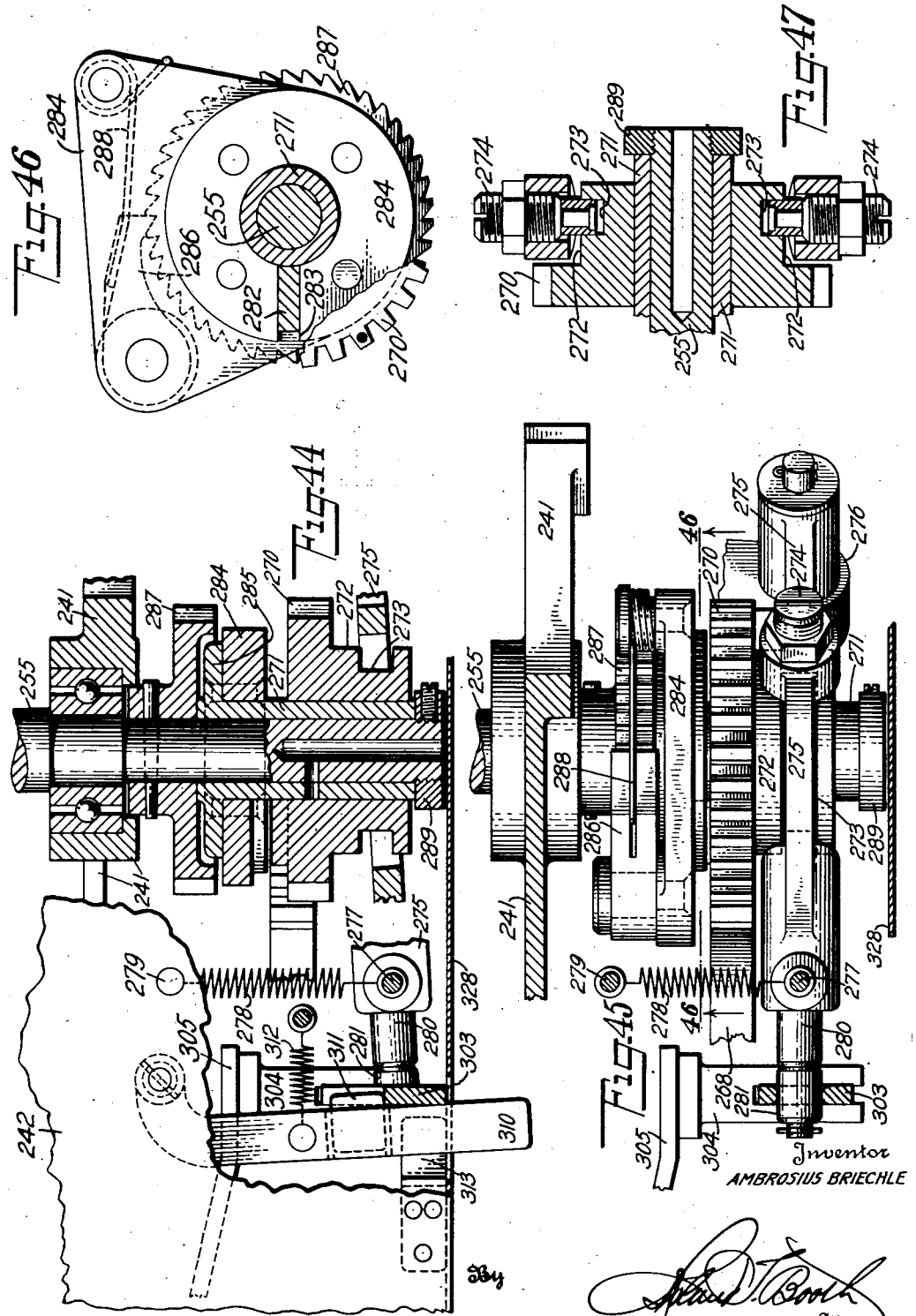
Inventor
AMBROSIUS BRIECHLE
Attorney

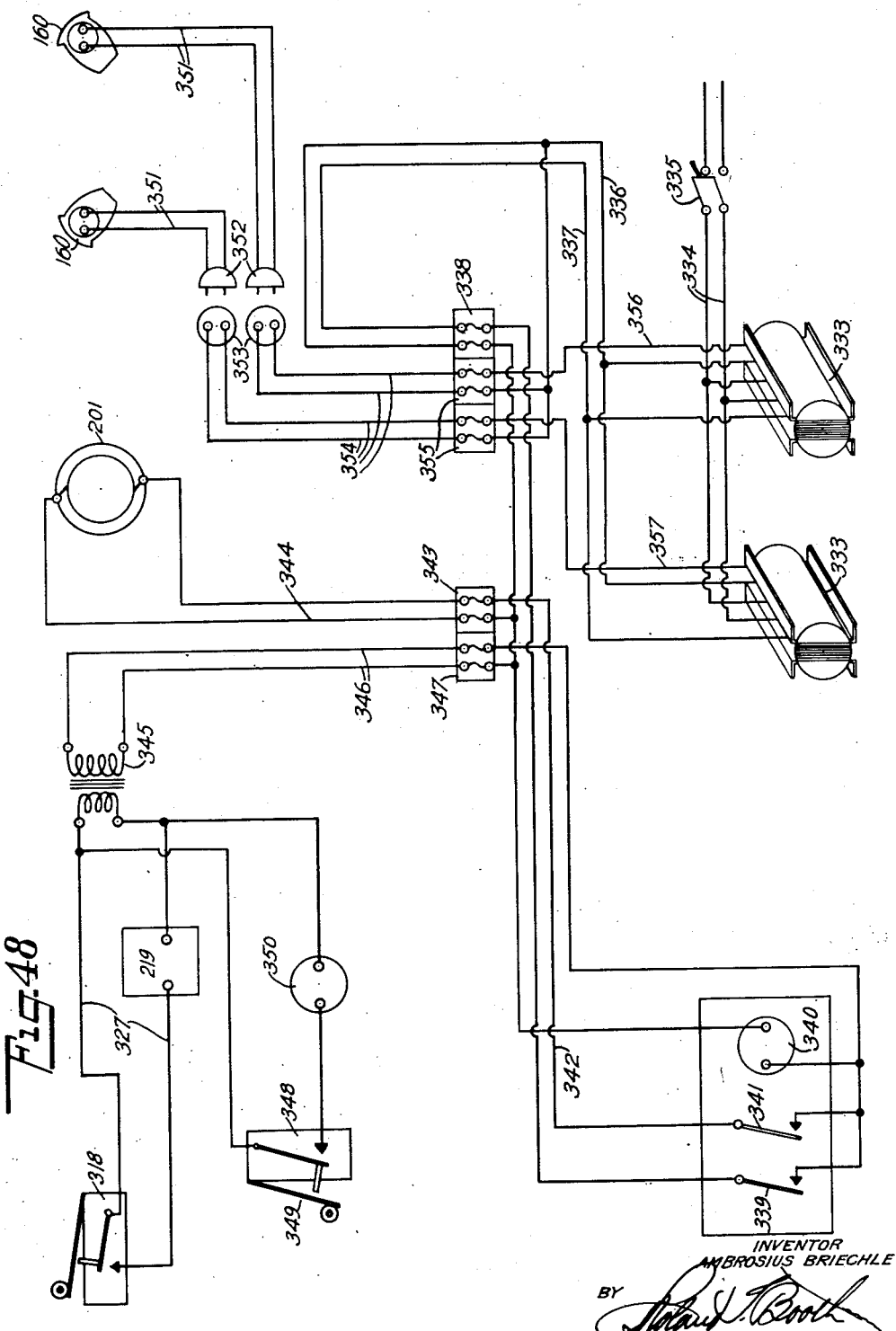

Patented June 23, 1953

2,642,773

UNITED STATES PATENT OFFICE 2,642,773

DOCUMENT PHOTOGRAPHING MACHINE

Ambrosius Briechle, Brooklyn, N. Y., assignor to Remington Rand Inc., Buffalo, N. Y., a corporation of Delaware Application March 27, 1944, Serial No. 528,221

34 Claims. (Cl. 88—24)

The present invention is directed to improvements in a machine for photographing documents.

The document photographing machine constructed according to the present invention comprehends the combination of means that will rapidly produce photographic copies of documents of a character that heretofore required the use of two or more different machines; the provision of a machine that is simplified in construction and operation; the provision of a machine that may be constructed and operated with less labor and with a reduction in the cost of document copies with increased machine operating efficiency; the provision of a machine for rapidly producing positive reading photographic copies of cards, and sheets varying in size from 2.4 x 3.6 inches to 6 x 8.5 inches while the size of the sensitized strip used will vary in width from 3.6 to 8.5 inches without material waste of sensitized strip material; the provision of a machine having a combination in which the documents may be fed automatically in either of two directions through a photographing position in making positive photographic copies on a sensitized strip wherein by changing the direction of feed of documents in the photographing position, more than one duplicate copy of such documents may be produced without changing the rate of feed of documents through the photographing position; and in providing a machine where feed ratios between the document feed and the strip feed can be readily made without interchanging parts in the machine; and having the document and sensitized strip feed interconnected and controlled for manual operation to provide one complete cycle of operation to photograph a document for each manual operation of the control device.

The invention further provides for the use of sensitized strips of different widths by having the supply and receiving spools for the strips mounted and efficiently retained in centered relation in a strip mounting and supporting frame with readily adjustable guide means on the frame for holding and guiding the strip through the focal plane for the photographing means; the provision of a gate carrying the photographing means that may be moved away from the housing and supporting frame carrying the sensitized strip so as to open up the front of the machine to provide convenient access to the strip guide and punching means for adjustment and setting thereof together with the addition and removal of masking plates of various size determined according to the size of photograph to be taken; the provision of a copy table formed to provide a photographing position for documents with feeding means to feed documents through the photographing position in one direction on said table with convenient and readily operable means for changing the position of the table relative to the photographing means in three different directions so that without interchange of parts, adjustments of the copy table can be readily made to bring documents of various sizes within the range of the machine into proper position in the photographing position on the copy table for photographing on the strip without waste of sensitized material; the provision of control means for the coordinated operation of the entire machine arranged to provide a manually operated control adapted to release the machine for one cycle of operation upon each manual operation of the control means; and the provision of an auxiliary control for a movable cover plate used to hold documents flat on the copy table in photographing position operable independently of the control means to stop copy feed on the copy table when it is desired to produce duplicate copies that may not be produced in a shifted position of the copy table.

There are other features involved in the machine that facilitate its construction, operation and adjustment in making positive reading photographic copies of documents that will be hereinafter more clearly pointed out in describing the structure and operation of the machine.

In the drawings:

Fig. 8 is an enlarged vertical cross-section through the upper portion of the camera housing, sensitized strip supporting and feeding mechnism and associated structure.

Fig. 9 is a horizontal cross-section through the top portion of the camera housing taken substantially along the line 9—9 of Fig. 6 showing the sensitized strip supporting and feeding mechanism in plan.

Fig. 10 is a horizontal cross-section taken substantially on line 10—10 of Fig. 6 showing the lower portion of the mechanism for mounting and feeding the sensitized strip.

Fig. 11 is a vertical longitudinal cross-section on an enlarged scale through the gate on the front of the camera housing carrying the lens unit illustrating details of construction.

Fig. 12 is an enlarged cross-section taken on line 12—12 of Fig. 11.

Fig. 13 is an enlarged fragmentary horizontal cross-section taken substantially along the line 13—13 of Fig. 11.

Fig. 14 is an enlarged detail cross-section taken on line 14—14 of Fig. 13.

Fig. 15 is an enlarged detail cross-section taken on line 15—15 of Fig. 13.

Fig. 16 is an enlarged fragmentary view showing the signal device for indicating the position of the shutter at the front of the camera adjacent the lens unit.

Fig. 17 is an enlarged fragmentary cross-section of the signal structure shown in Fig. 16 in which the parts shown in Fig. 16 have been removed to illustrate the details of construction of the signal disc.

Fig. 18 is an enlarged detail cross-section through the punch for the sensitized strip taken substantially on line 18—18 of Fig. 6.

Fig. 19 is an enlarged detail cross-section through a part of the punch structure taken on line 19—19 of Fig. 6.

Fig. 20 is an enlarged detail cross-section taken on line 20—20 of Fig. 6.

Fig. 21 is a detail cross-section taken on line 21—21 of Fig. 20.

Fig. 22 is an enlarged horizontal cross-section showing the supplemental feed roll and the mounting structure therefor.

Fig. 23 is an enlarged fragmentary cross-sectional detail view showing the supplemental feed roll and the mounting structure therefor in end elevation looking from the left-hand side of the machine as illustrated in Fig. 10.

Fig. 24 is an enlarged detail cross-section taken on line 24—24 of Fig. 4 showing the details of construction of the receiving spool mounting and driving structure.

Fig. 29 is a cross-section taken on line 29—29 of Fig. 28 showing the driving means for the camera for obtaining one cycle of operation for each actuation of the manual control means.

Fig. 30 is a cross-section taken on line 30—30 of Fig. 29 with the upper portion of the casing broken away to illustrate details of construction of the driving means.

Fig. 31 is a cross-section taken on line 31—31 of Fig. 29.

Fig. 32 shows how the drive means and control mechanism cooperate to produce one cycle of operation of the machine, the parts being shown in the positions they occupy just prior to the end of a cycle of operation.

Fig. 33 is a view similar to Fig. 32 showing another position of the parts nearer the end of the cycle of operation than that shown in Fig. 32 in which the clutch plate has been kicked ahead of its normal position with respect to the ratchet during disengagement of the drive pawl at the end of the cycle.

Fig. 34 shows the copy table in side elevation on an enlarged scale looking from the right side and with the side cover plate removed to illustrate the details of construction.

Fig. 35 shows the copy table in side elevation looking from the left side with the side cover plate removed.

Fig. 36 is a vertical longitudinal cross-section taken on line 36—36 of Fig. 25 and showing details of construction of the copy table.

Fig. 37 is a horizontal cross-section taken on line 37—37 of Fig. 34.

Fig. 38 is a vertical transverse cross-section taken on line 38—38 of Fig. 34.

Fig. 39 is an enlarged detail cross-section taken on line 39—39 of Fig. 34.

Fig. 40 is an enlarged fragmentary detail showing the structure of one of the document feed fingers in side elevation.

Fig. 41 is a cross-section taken on line 41—41 of Fig. 40.

Fig. 42 is a cross-section taken on line 42—42 of Fig. 41.

Fig. 43 is a vertical transverse cross-section through the copy table taken on line 43—43 of Fig. 36.

Fig. 44 is an enlarged fragmentary plan view of a portion of the copy table with parts broken away to illustrate the manual control for connecting and disconnecting the document feed means with the driving means, the clutch and drive mechanism being shown in horizontal cross-section.

Fig. 45 is a top plan view of the document feed controlling means shown in Fig. 44.

Fig. 46 is a cross-section taken on line 46—46 of Fig. 45.

Fig. 47 is an enlarged detail cross-section through the ratchet gear and clutch member showing its mounting on the end of one of the shafts of the document feed mechanism and illustrating the details of construction of the connection between this ratchet gear and the operating arm for sliding it on the shaft to engage and disengage the clutch.

Fig. 48 is a wiring diagram of the electric circuits in the machine.

The photographing machine incorporating the present invention is particularly designed to photograph documents for producing one or more copies equal in size to the original and in which the sizes may vary from 2.4 x 3.6 inches to 6 x 8.5 inches. The photographic copies are positive reading negatives to eliminate the cost of producing a negative. However, in some cases it may be desired to first produce a negative and then in producing a number of copies of the same document to produce them as positives rather than as positive reading negatives. The machine is designed to use varying widths of sensitized paper from 3.6 inches up to 8.5 inches. The machine is also adapted to make photographic reductions of documents of varying sizes, and will make reductions of documents of approximately 8.5 x 11 inches.

The present document photographing machine is particularly designed to rapidly feed standard sizes of cards, sheets and forms across the copy table in which the feed mechanism is operated in timed relation to the photographing mechanism and the sensitized strip feed so that accurate photographic reproductions of the cards or other documents can be rapidly and accurately made at low cost. In addition, the machine provides for producing two or more duplicate copies of documents of several different sizes in a rapid and inexpensive manner without stopping the feed mechanism during the production of the duplicate copies. This is obtained by maintaining a constant feed of documents through the photographing position on the copy table and changing the position of the copy table from front feed position, where it is used for making copies of most all sizes of documents within the range of the camera, to side-feed position for producing more than one duplicate copy of a document while maintaining constant feeding of documents. Provision is made to set the machine for feeding and photographing any size of document within the range of the photographing unit.

Figure 1:
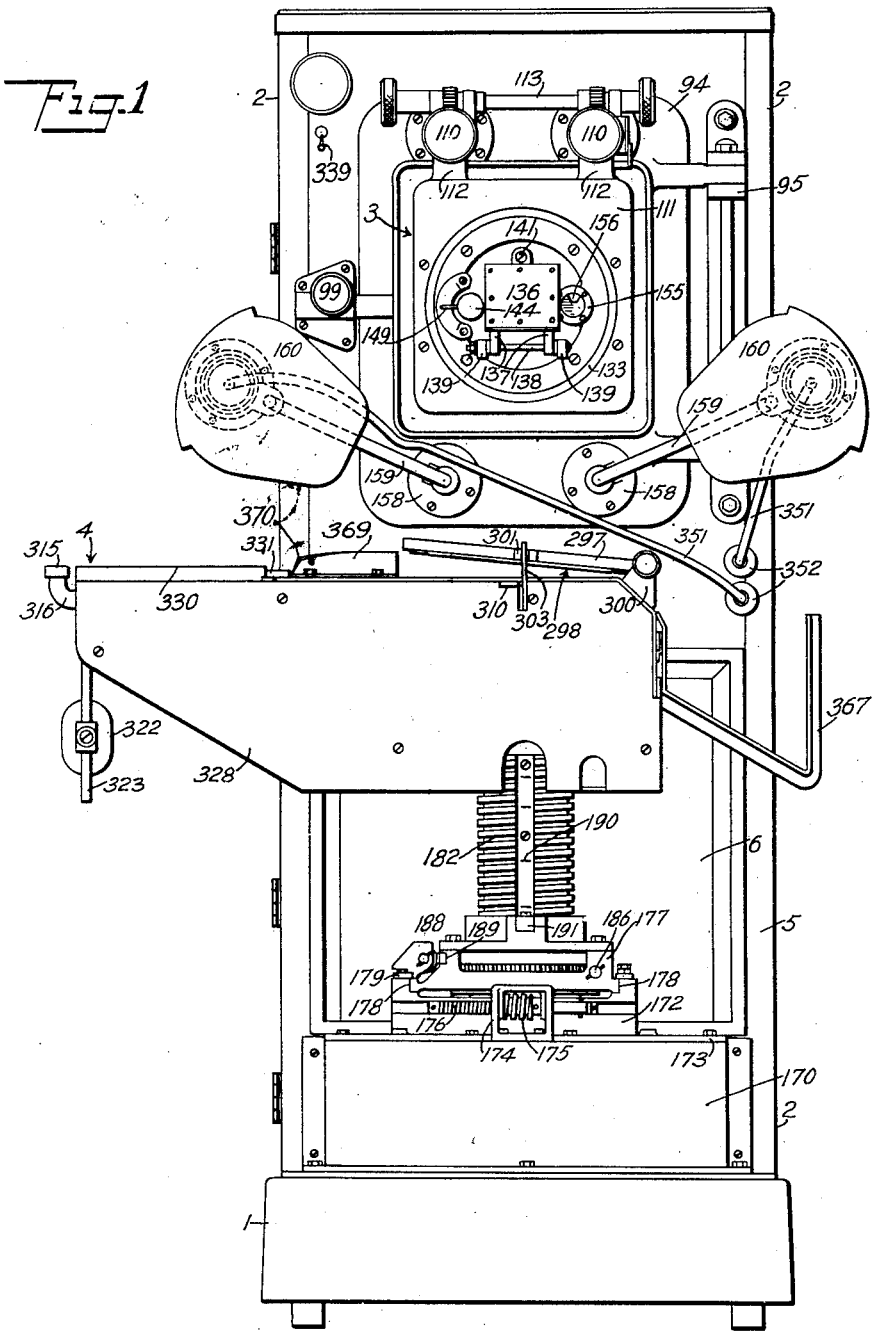
Fig. 1 shows a front elevation of the document photographing machine incorporating the present invention with the copy table in side feed position with the front end extending to the lefthand side of the machine.

The machine illustrated in the drawings includes a suitable base 1 having a housing 2 mounted on and extending upwardly from one end thereof to provide a mounting and enclosure for the drive means and the sensitized strip mounting and feeding mechanism. The housing supports a photographing means at the top portion having lens unit 3 projecting over copy table 4 adjustably mounted on the opposite end of the base. The end of the base carrying copy table 4 will be considered the front of the machine, Fig. 1 showing the machine looking at the front with the copy table in side feed position.

Figure 2:
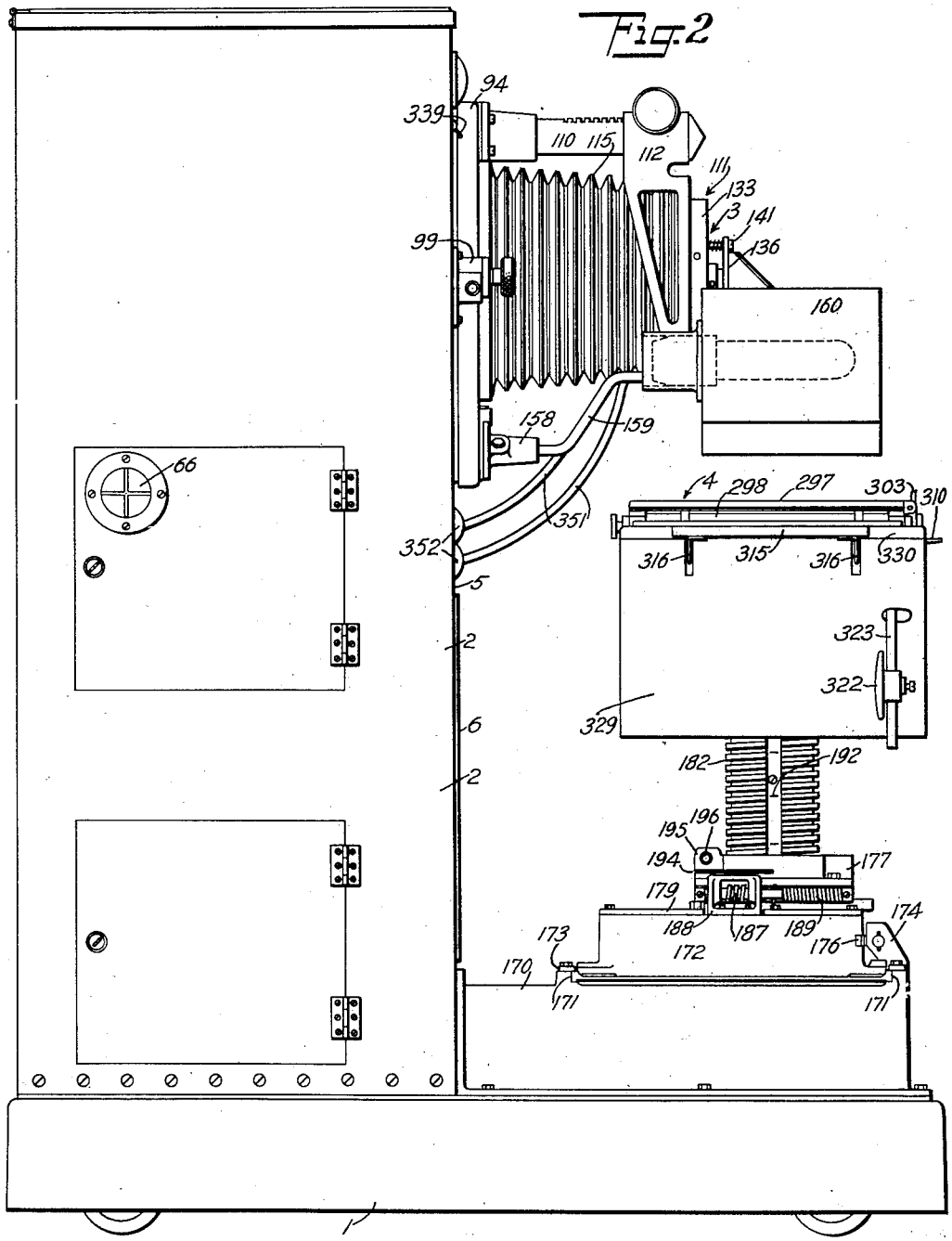
Fig. 2 is a side elevation of the machine looking at the left side.

Housing 2 is light tight. Housing 2 is provided with two hinged doors in the left-hand side wall, as shown in Fig. 2, that may be opened to provide access to the drive means through the lower door and to the strip feeding means through the upper door. The top on housing 2 is hingedly mounted on the rear wall so that it may be moved to an open position to facilitate access through the top of the housing to the sensitized strip guiding and feed means. The rear wall of housing 2 has a door that may be opened for access to the strip feeding means.

The front wall 5 of housing 2 is formed with a large rectangular opening in the lower portion to receive an offset imperforate sheet metal insert 6 having the marginal portion welded to front wall 5. This structure provides a substantially rigid wall structure permitting use of thin sheet metal in the construction of the housing for obtaining a rigid housing substantially free from vibration of a character that will interfere with efficient photographing operation.

The upper portion of front wall 5 is formed with a rectangular opening having an angular jamb 7 mounted therein with one flange extending forwardly.

*Strip feed*

The structure for supporting and feeding the sensitized strip is mounted in the upper end of housing 2 and is shown in Figs. 4 to 10 and 18 to 24.

Figure 6:
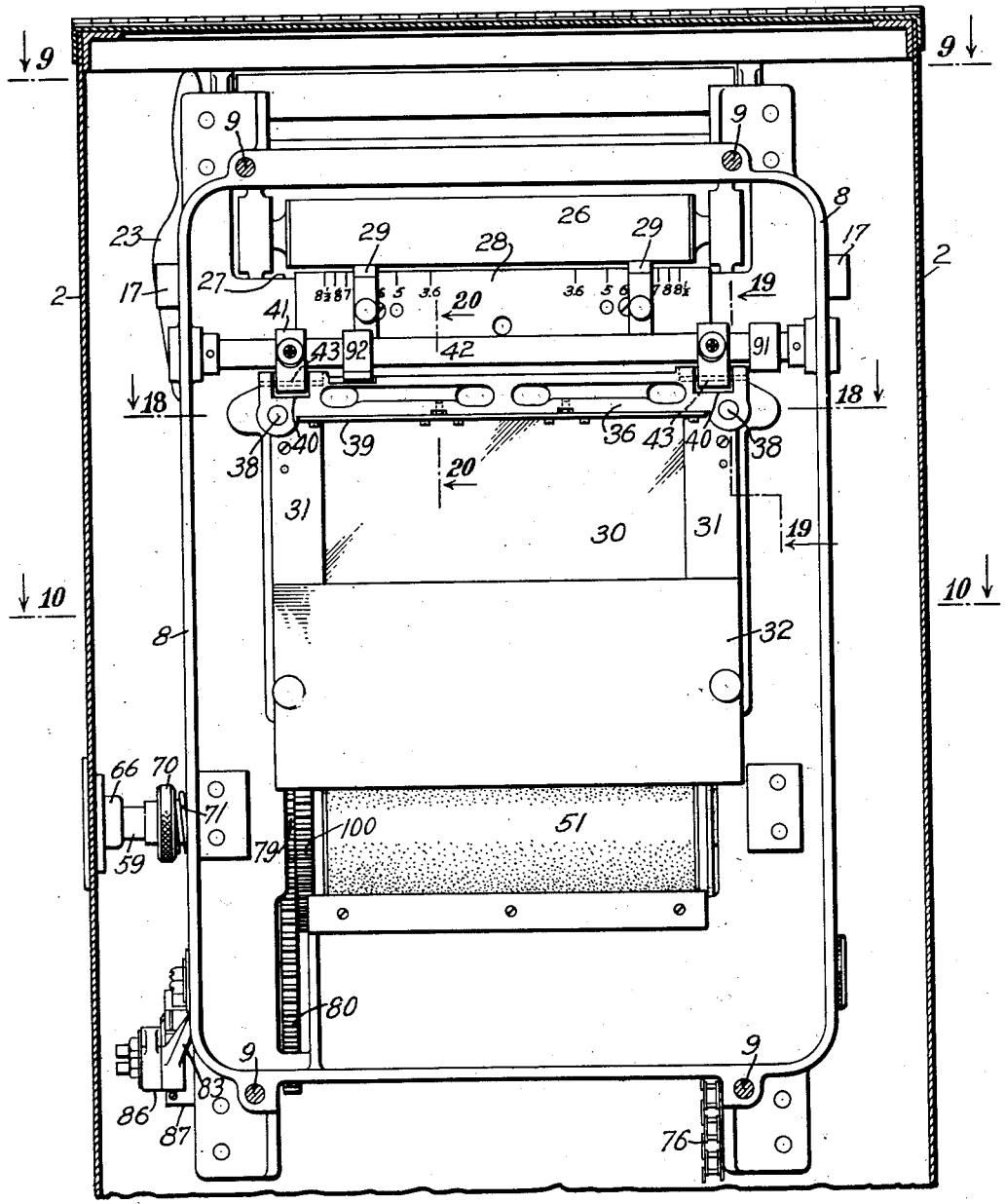
Fig. 6 is an enlarged cross-section of the upper portion of the housing taken across the inside face of the front wall and showing the sensitized paper supporting and feeding structure in front elevation.

A record supporting frame 8 has a substantially flat plate portion with marginal flanges extending laterally and forwardly on all four sides and formed at the free edges to engage the inside face of front wall 5 about the opening in the upper end thereof, as shown in Fig. 8. Supporting frame 8 is rigidly bolted to front wall 5 at the four corners, as indicated in Figs. 4 and 6, at 9.

The upper end of supporting frame 8 is formed on the upper side portions to detachably mount a pair of spaced parallel upper side frames 10 in rearwardly extending relation to provide a support and cradle structure for mounting a supply spool 12 carrying a sensitized strip. A pair of rollers 11 are journalled at opposite ends in spaced parallel horizontal relation in the lower edges of upper side frames 10 at the forward and rear portions to provide the bottom part of a cradle for rotatably supporting supply spool 12. Spool 12 is mounted in the cradle between side frames 10 with the peripheries of the spool ends seated on rollers 11, in the manner shown in Fig. 8.

Figure 4:
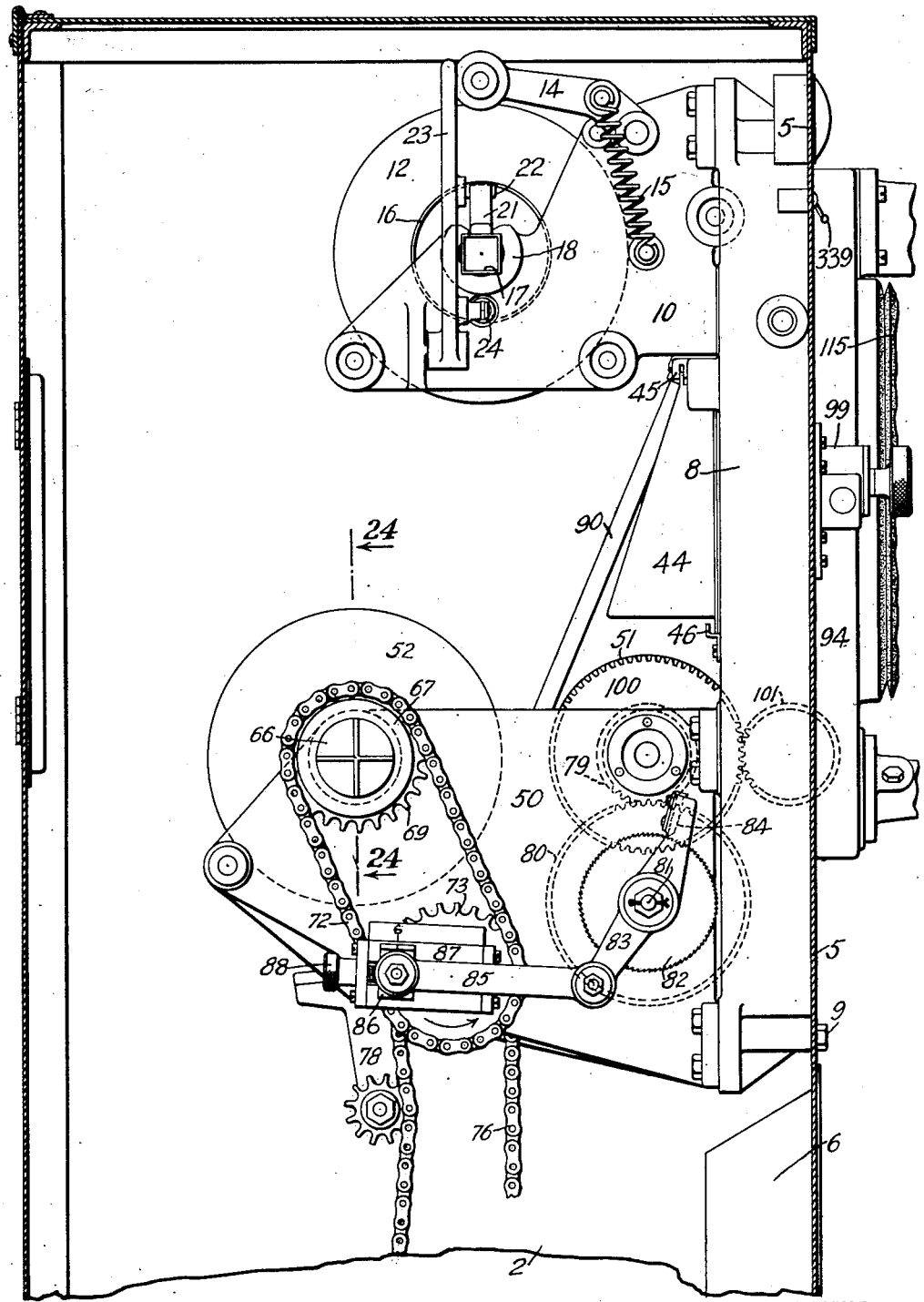
Fig. 4 is an enlarged cross-section through the housing of the machine showing the supporting frame and associated structure for holding and feeding a sensitized strip in side elevation, looking from the left side, as shown in Fig. 1.

A spool retaining roller 13 is journalled at opposite ends in the free ends of a pair of arms 14 pivotally mounted at their opposite ends on the upper front portions of upper side frames 10, as clearly shown in Figs. 4, 5, 8 and 9. Coil springs 15 have one end secured to arms 14 and the opposite ends secured to upper side frames 10. The end of springs 15 secured to arms 14 is positioned fairly close to the pivotal mounting for the arms on side frames 10, as shown in Fig. 4 for example, so that the spool retaining roller may be manually operated into the position shown in Figs. 4 and 5 where it engages the peripheries of the spool ends of spool 12 at points substantially opposite to the engagement of the spool ends with rollers 11. This provides for the springs to operate arms 14 to retain spool 12 in the cradle formed by the cooperation of rollers 11 and 13 and upper side frames 10.

When it is desired to remove spool 12 from the cradle, manual operation of spool retaining roller 13 and arms 14 to swing the same upwardly from the position shown in Fig. 4 after the top cover on the housing is opened, will move the connection of springs 15 on arms 14 past the pivotal mounting for arms 14 on upper side frames 10. This will move arms 14 past dead center position for springs 15 so that they will move into an upwardly and forwardly extending position where the arms engage the upper front edges of the upper side frames 10 where they are secured to supporting frame 8. With the parts in this position the spool may be removed and a new one placed in the cradle.

Figure 7:
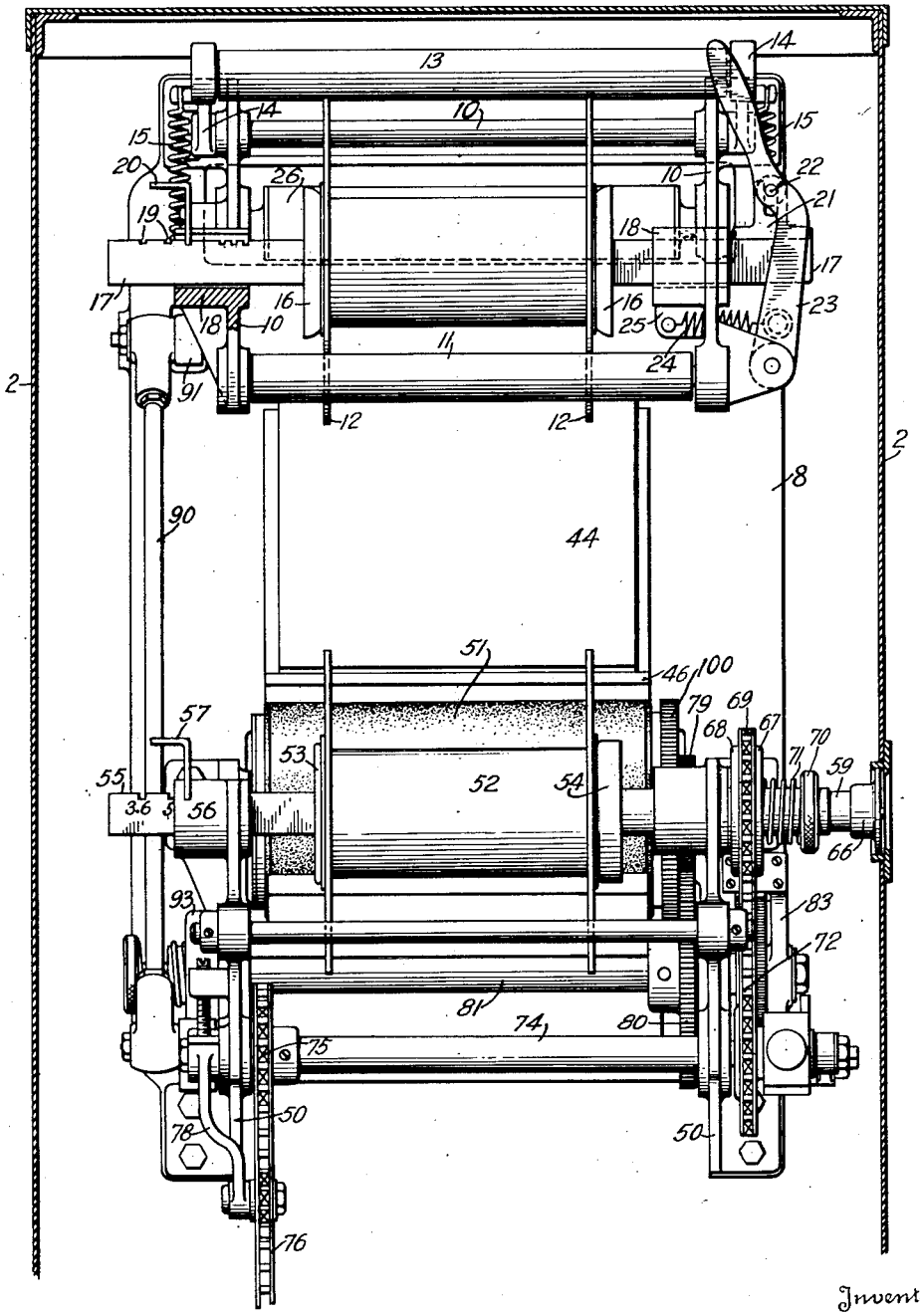
Fig. 7 is a cross-section taken approximately along the line 7—7 of Fig. 5 through the upper portion of the housing and illustrating the sensitized strip supporting and feeding mechanism in rear elevation with portions broken away and shown in cross-section for convenience in illustrating details of construction.

Spool 12 is held in centered relation in the cradle by means of a pair of spool engaging members 16 frictionally engaging opposite ends of spool 12. A pair of rods 17 rigidly support spool engaging members 16, one on the inner end of each rod. Rods 17 are formed of square tubes and are slidably engaged in rod bearings 18 formed in upper side frames 10, as clearly shown in Figs. 4, 5 and 7. Rod 17 on the right-hand side of the machine, shown at the left-hand side of Fig. 7, is formed with a plurality of transverse slots 19 on the top side thereof having spring actuated latch 20 pivoted on the right-hand upper side frame 10 detachably engaged therein for selectively retaining said rod and its spool engaging member 16 in a selected position of adjustment. This provides for adjustment of the right-hand spool engaging member 16 to a position where it will center a spool carrying a sensitized strip of known size in proper position in the cradle for feeding the strip in making photographic copies of documents.

Spool 12 is retained in frictional contact with spool engaging member 16 shown at the left-hand side of Fig. 7 by operation of the spool-engaging member shown at the right-hand side of Fig. 7. To obtain this operation the spool-engaging member shown at the right-hand side of Fig. 7 carries a bracket 21 on the free end having a bifurcated end portion receiving pin 22 extending laterally from the central portion of lever 23 pivoted at the lower end on a lateral projection extending outwardly from the lower edge portion of upper side frame 10. A coil spring 24 has one end secured to lever 23 immediately above the pivot portion thereof, as shown in Figs. 4 and 7, and extends through an opening in upper side frame 10 and has the opposite end engaged over projection 25 extending inwardly from the left-hand upper side frame, shown at the right of Fig. 7. This spring is maintained under tension for normally operating lever 23 to move rod 17 shown at the right-hand side of Fig. 7 with its spool engaging member toward the end of spool 12 and frictionally retain it under spring tension so that spool 12 is frictionally engaged between spool engaging members 16. This places a tension on the sensitized strip to keep it taut in passing through the focal plane and until it is engaged by the feed rolls.

As the sensitized strip leaves supply spool 12 it is passed over guide roller 26 journalled at its opposite ends in the front edges of upper side frames 10 in a position where it is located in and with its periphery projecting through an elongated opening 27 in the upper end of supporting frame 8 as shown in Figs. 6 and 8. The sensitized strip is then fed downwardly over the front face of supporting frame 8.

A guide plate 28 is mounted on a pair of bosses extending forwardly from the upper front face of supporting frame 8 just below opening 27 as clearly shown in Fig. 6. The upper and lower edges of guide plate 28 are beveled for cooperation with a groove in guide blocks 29 mounted on plate 28 for horizontal sliding movement toward and from the center portion of plate 28. The sensitized strip is fed over the forward face of plate 28 between guide blocks 29, positioned on plate 28 to guide the sensitized strip centrally over the front of frame 8. Plate 28 is provided with marks for indicating the setting of guide blocks 29 for different widths of sensitized strip material. Suitable set screws threadedly mounted in blocks 29 are adapted for manual operation to hold the blocks in adjusted position.

The central portion of rigid supporting frame 8 is provided with a focal plane through which the sensitized strip material is fed and positioned during the taking of pictures of documents. In order to enable the image to be focused in the focal plane to take a clear picture, a ground glass plate 30 is mounted in an opening in frame 8, as shown in Figs. 6 and 8. This plate 30 defines the focal plane of the camera and enables the image of the object being photographed to be viewed on the plate so that the focus can be adjusted to obtain a clear picture. A pair of vertical guide strips 31 are mounted one on each side of ground glass plate 30 and secured to the front face of supporting frame 8 in spaced parallel relation. These strips further aid in defining the side edges of the focal plane through which sensitized strip material passes and also form guides for wide sensitized strip material as it is passed through the focal plane. These strips are not adjustable but are permanently mounted in the position shown.

Guide strips 31 provide a support for masking plate 32. Masking plate 32 is used for masking portions of the focal plane to correspond with the various sizes of pictures being taken on sensitized strips of various widths depending upon the type of documents being photographed. Various sizes of masking plates may be used in place of the one shown and detachably secured to guide strips 31 which space them away from the front face of ground glass plate 30 to provide for the passage of sensitized strip material under the masking plate. Guide strips 31 are provided with openings for receiving threaded screws adapted to hold the masking plate in any one of a plurality of adjusted positions, these holes not being shown in the drawings due to the fact that they are covered by the masking plate.

Between the upper edge of ground glass plate 30 and guide plate 28 supporting frame 8 is provided with a punch structure for intermittently punching the sensitized strip as it is fed over frame 8 through the focal plane. The punch is provided for punching openings simultaneously with the taking of a picture of a document on the adjacent portion of the strip in the focal plane.

A pair of die blocks 33 are mounted in end to end relation as shown in Figs. 8, 18 and 20 on frame 8 adjacent the upper edge of ground glass plate 30. These die blocks are formed with die openings 34 to receive punches 35 mounted on punch bar 36 in spaced parallel relation as clearly shown in Figs. 6, 8 and 18 to 20.

A punch guide plate 37 is secured at opposite ends to the upper ends of guide strips 31 in spaced parallel relation in front of guide blocks 33 as clearly shown in Figs. 18 and 20. Punch guide plate 37 is formed with a pair of openings to slidably receive punches 35 and hold them in aligned relation with die openings 34 for accurately punching the sensitized strip during a dwell in its movement between guide blocks 33 and punch guide strip 37.

Punch bar 36 is slidably mounted at opposite ends on a pair of spaced parallel guide rods 38 rigidly mounted in supporting frame 8, see Figs. 6 and 18 to 20. In between the portions of punch bar 36 slidable on guide rods 38, the lower portion of the punch bar carries a detachable retaining strip 39 secured on the bottom face of punch bar 36 for cooperation in retaining punches 35 engaged in transverse channels formed in the punch bar in operative relation therein.

The ends of punch bar 36 are formed at the upper corners with channels 40 for receiving the ends of punch operating arms 41 rigidly mounted on shaft 42 journalled at its ends in the side flanges of rigid supporting frame 8. Cross pins 43 are mounted in the free ends of punch operating arms 41 and extend transversely therethrough to engage at opposite sides of channels 40 in vertical slots formed in punch bar 36. This structure provides the driving connection for sliding the punch on guide rods 38 to punch a pair of rectangular holes in transversely aligned relation in a sensitized strip immediately adjacent the upper edge of an image photographed thereon in the focal plane.

As clearly shown in Figs. 8 to 20 die openings 34 provide for the discharge of chips from the punch through the rear face thereof and the opening in frame 8 into a chip box 44 mounted against the rear face of ground glass plate 30. The upper edge of the rear wall of chip box 44 is engaged in a slot formed in rearward projection 45 on frame 8 while the lower forward edge of chip box 44 is seated on the lower edge of the opening in frame 8. A retaining clip 46 secured to the rear face of supporting frame 8 by suitable screws engages a flange on the bottom of the chip box for normally retaining it in position to receive the chips from the punch in the operation of the machine. Chip box 44 is removed when it is desired to view and focus an image on the ground glass plate.

A pair of lower side frames 50 are mounted in spaced parallel rearwardly extending relation at the lower end of rigid supporting frame 8 detachably secured in any suitable manner to the lower side portions thereof. A main feed roll 51 is journalled at opposite ends in lower side frames 50 with the forwardly extending portion of the periphery projecting through a slot in the lower portion of frame 8 to a point where it is tangential with the plane of the front face of ground glass plate 30 as clearly shown in Fig. 8. The sensitized strip after being fed through the focal plane extends downwardly under masking plate 32 and engages over the periphery of main feed roll 51. The sensitized strip passes through the elongated opening in supporting frame 8 about main feed roll 51 to the rear of the frame where it is then extended to and wound upon a receiving spool 52. Receiving spool 52 is mounted between the rear ends of lower side frames 50 on spool supporting members 53 and 54, respectively.

Figure 5:
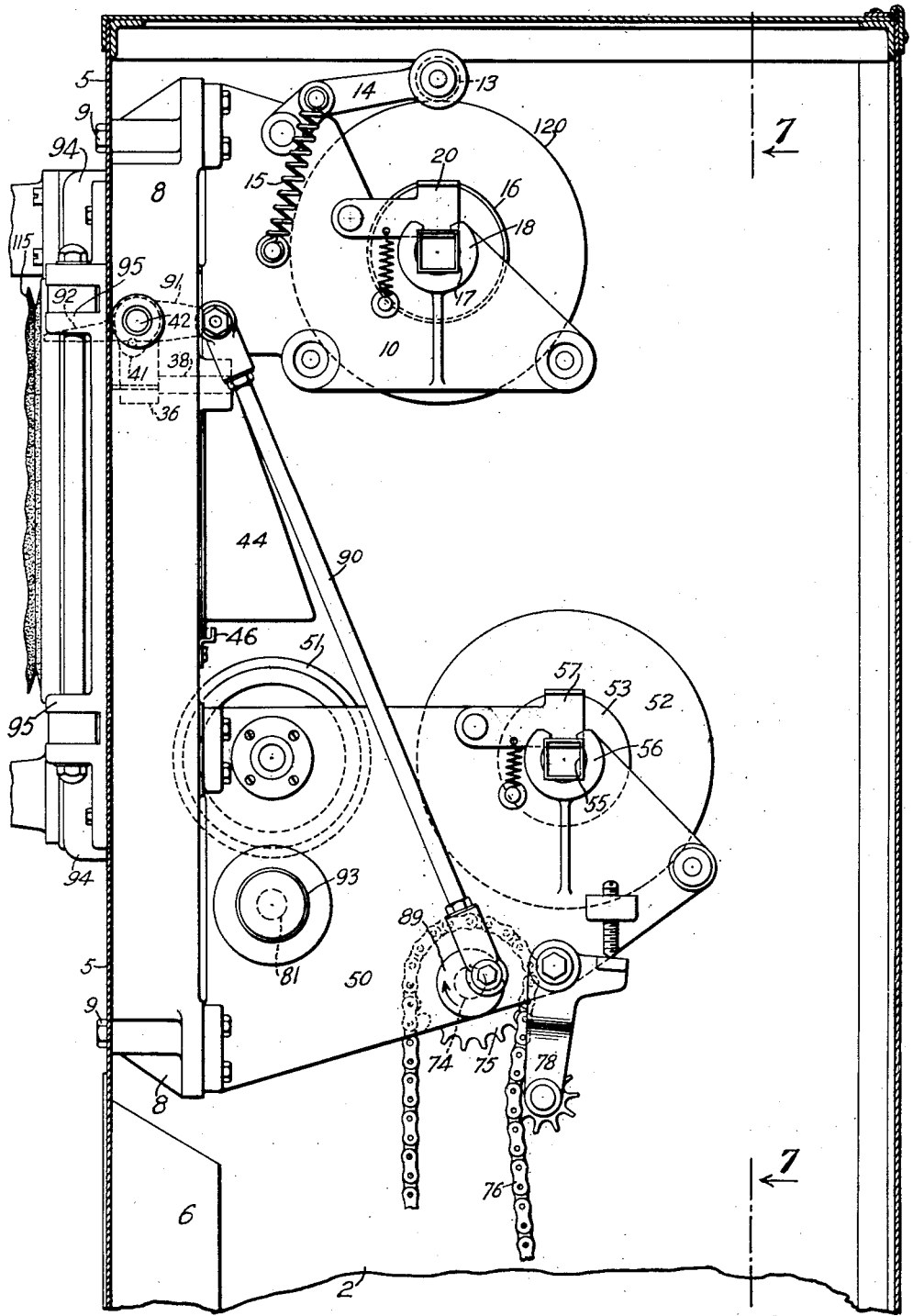
Fig. 5 is an enlarged cross-section similar to Fig. 4 looking at the strip mounting and feeding mechanism in elevation and at the opposite side from that shown in Fig. 4.

Spool supporting member 53 is rotatably mounted on tubular rod 55 axially slidable in bearing 56 formed in lower side frame 50 on the right-hand side of the machine as shown particularly in Figs. 5, 7 and 24. A plurality of transversely extending slots in the upper edge of tubular rod 55 are adapted to receive the retaining latch 57 for selective engagement in one of the transverse slots to retain tubular rod 55 in the desired position of adjustment for holding receiving spool 52 in properly centered relation between the lower side frames according to the width of sensitized strip being used in the machine.

Spool supporting member 53 is formed to provide an annular flange for engaging within the end of receiving spool 52 in the manner disclosed in Fig. 24 in order to effectively support one end of the spool for rotation with spool supporting member 53 on its rotatable mounting on tubular rod 55.

Spool supporting member 54 is rigidly mounted on tubular sleeve 58 having axial telescoping movement in tubular shaft 59 rotatable in bearing sleeve 60 mounted in lower side frame 50 at the left-hand side of the machine, as illustrated in Fig. 24. Spool supporting member 54 carries a pair of spool driving fingers 61, Fig. 24, engaging in the end of receiving spool 52 for gripping and rotating the spool to wind the exposed sensitized strip on spool 52 in the operation of the machine.

Spool supporting member 54 is resiliently projected into engagement with the end of receiving spool 52 for holding the spool driving members 61 in interengaged relation with the end thereof and for holding the opposite end of spool 52 engaged on spool supporting member 53. The resilient means for projecting spool supporting member 54 into engagement with the end of the spool has a pair of coil springs 62 and 63 respectively, engaged with a floating spring supporting member 64 providing for the support of the two springs in telescoping relation relative to each other in the manner shown in Fig. 24. Coil spring 63 is of smaller diameter than spring 62 in order to fit within floating spring supporting member 64 while spring 62 engages over the outside of said member. The other end of spring 62 engages a plug secured in the free inner end of tubular sleeve 58 while the free end of coil spring 63 engages a plug 65 secured by a transverse pin in the central portion of tubular shaft 59. This construction provides for the effective resilient projection of spool supporting member 54 into engagement with the end of a receiving spool 52 for holding it in centered position between lower side frame 50 and for driving the spool to wind exposed sensitized strip material thereon under tension. Due to the various sizes of strip material which this machine is adapted to handle it is found desirable to use the dual telescoping spring construction with the floating member 64 in order to obtain substantially uniform spring pressure against spools of varying length, particularly narrow spools for winding three inch sensitized strip material.

A strip feed indicator disc 66 is mounted on the free end of tubular shaft 59 and is visible through an opening in the upper door on the side of housing 2 constructed in cooperation therewith to provide a light trap. Disc 66 will indicate when the strip feed mechanism is in operation.

A pair of friction clutch discs 67 and 68 are keyed on tubular shaft 59 for axial sliding movement, disc 68 having a cylindrical hub portion rotatably mounting sprocket 69 thereon between discs 67 and 68. Friction clutch disc 68 is engaged against the end of bearing sleeve 60 in the lower side frame as shown in Fig. 24. A collar 70 adjustably mounted on shaft 59 retains coil spring 71 under compression for engaging and moving clutch disc 67 against sprocket 69 toward clutch disc 68 so as to provide a friction drive connection between sprocket 69 and tubular shaft 59 for driving receiving spool 52 to wind sensitized strip thereon. This structure also operates as a brake for holding receiving spool 52 in any position in which it stops by reason of the frictional engagement of clutch disc 68 against the end of bearing sleeve 60. This operates to effectively retain tension on the sensitized film strip being wound on the receiving spool.

Figure 27:
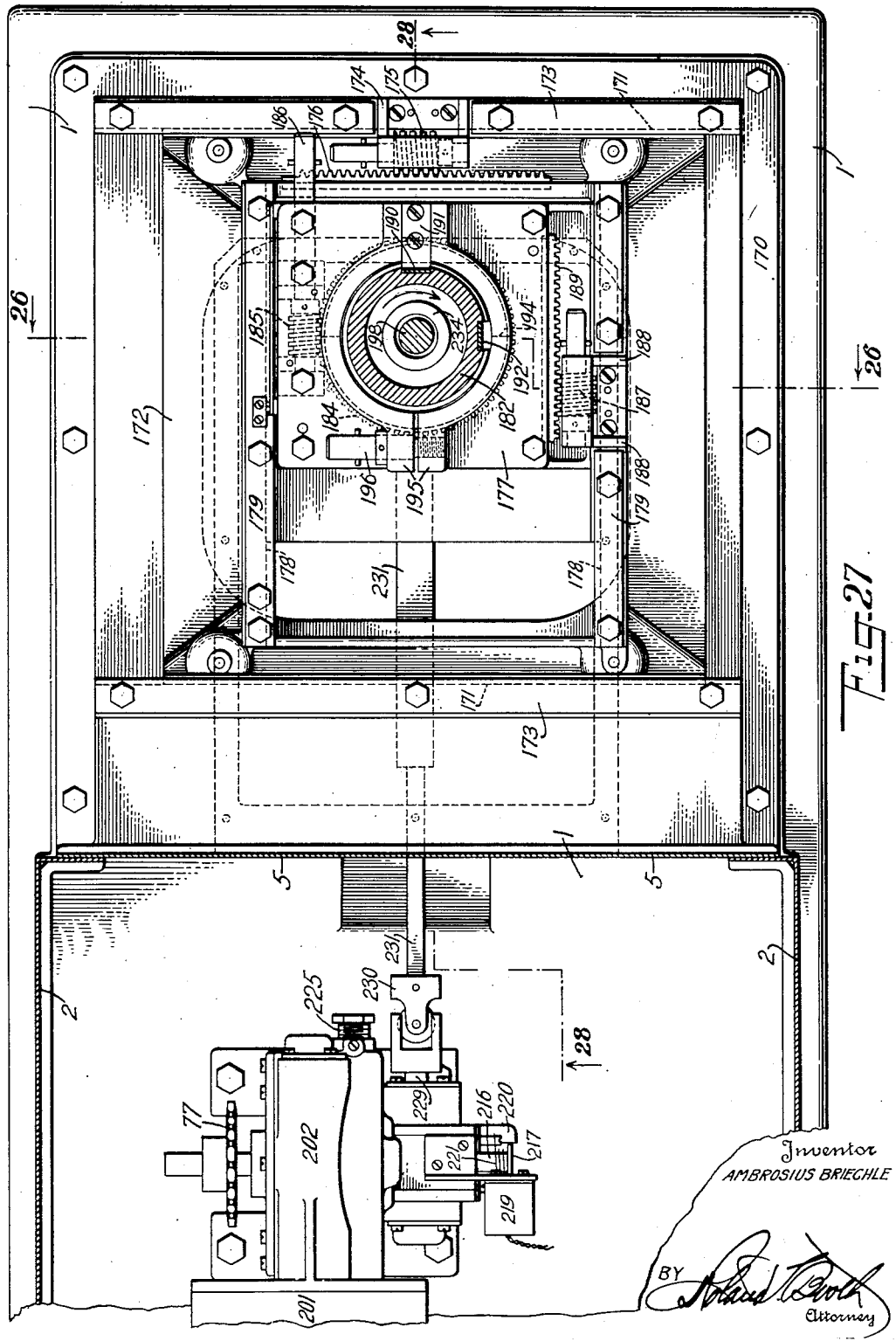
Fig. 27 is a horizontal section on an enlarged scale taken on line 27—27 of Fig. 26 showing the copy table supporting structure and the drive unit.
Figure 28:
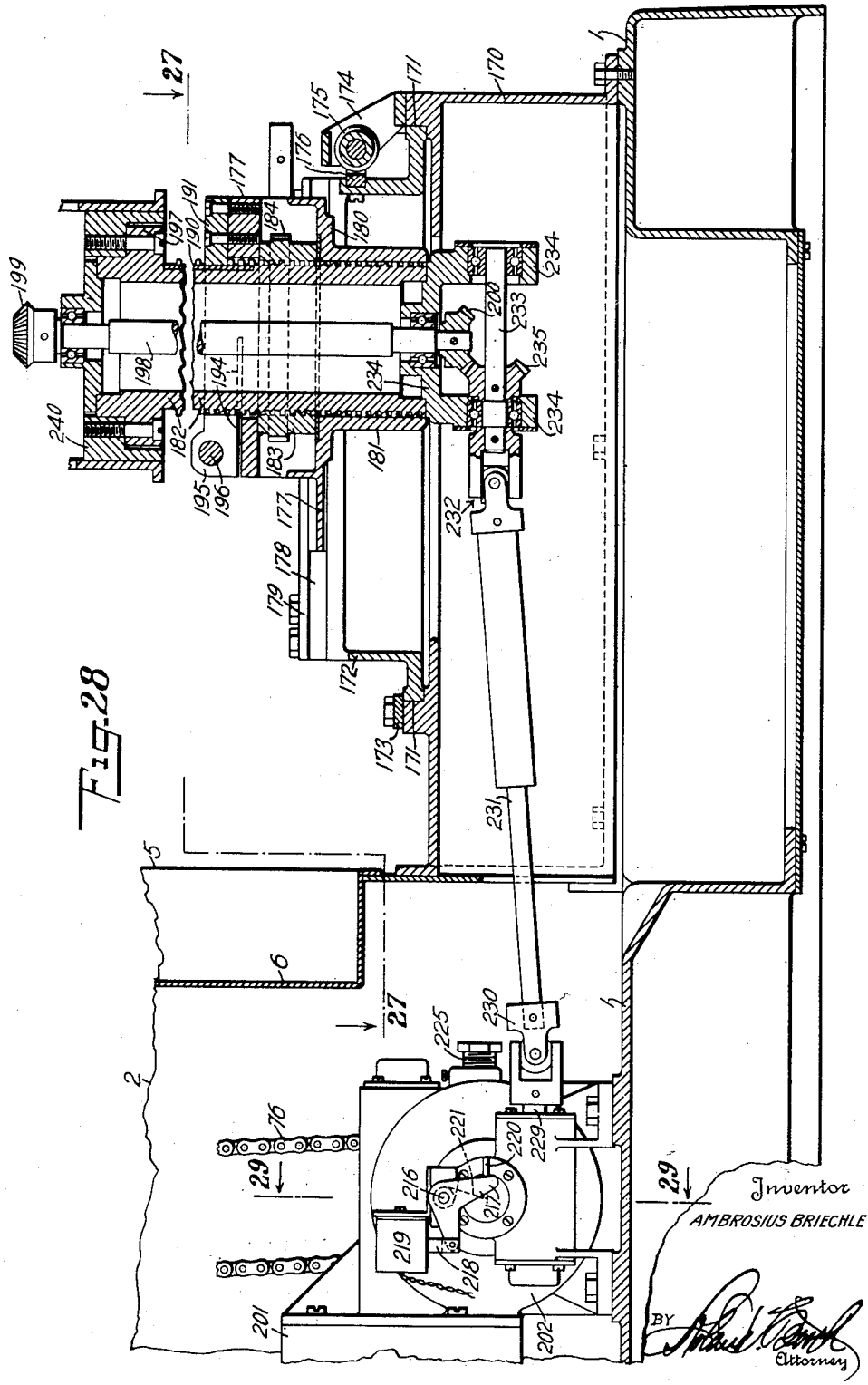
Fig. 28 is a vertical longitudinal section taken substantially along the line 28—28 of Fig. 27.

The receiving spool is driven by an endless chain 72 engaged over sprocket 69. Chain 72 is engaged over another sprocket 73 mounted on a main drive shaft 74 for the strip feed mechanism. The strip feed mechanism is driven by means of sprocket 75 mounted on shaft 74 on the inside and adjacent the right-hand lower side frame. A main drive chain 76 is engaged over sprocket 75 and main drive sprocket 77 of the motor drive unit mounted in the bottom of housing 2 as shown in Figs. 27, 28 and 29. A slack take-up 78 is shown particularly in Figs. 4 to 8 for engaging main drive chain 76 to take up the slack therein for obtaining a uniform driving operation of the sensitized strip feed mechanism.

The main feed roll 51 is provided with a small gear 79 rigidly mounted at the left-hand end thereof meshing with a larger gear 80 mounted on ratchet shaft 81 journalled at opposite ends in lower side frame 50. Ratchet wheel 82 is mounted on ratchet shaft 81 and ratchet arm 83 is also mounted for rotation on shaft 81. Ratchet arm 83 carries a pawl 84 on one end thereof for engagement with the teeth on ratchet wheel 82 in the oscillation of said arm 83 to intermittently rotate ratchet wheel 82, shaft 81 and main feed roll 51 in one direction for feeding sensitized strip material. Ratchet arm 83 has a pitman 85 which is pivotally connected to one end of ratchet arm 83 as clearly shown in Fig. 4 and has the opposite end rotatably connected to slide block 86 slidably mounted between spaced parallel guideways of crank arm 87 having one end rigidly mounted on main drive shaft 74 with the other end in radially extending relation therefrom. An adjusting screw 88 provided with a knurled knob on the outer end is rotatably mounted in crank arm 87 in radial relation and threaded in slide block 86 for radially adjusting the position of slide block 86 on crank arm 87. This slide block adjustment is provided for changing the amplitude of oscillation of ratchet arm 83 in order to vary the length of feed of sensitized strip material by main feed roll 51.

The right-hand end of main drive shaft 74 extends outwardly beyond the lower side frame on the right-hand side of the machine and carries an eccentric disc 89 having one end of eccentric drive link 90 rotatably secured in eccentric relation thereon. The opposite end of eccentric drive link 90 is pivotally connected to the free end of punch operating arm 91 rigidly mounted on the right-hand end of punch operating shaft 42. This arm projects through an opening in the plate portion of supporting frame 8 as shown in Figs. 5 to 7. The rotary connection of eccentric drive link 90 to eccentric disc 89 is positioned with reference to crank arm 87 so that in the rotation of main drive shaft 74 the punch will be operated to punch holes in the sensitized strip during a dwell in the feed of the strip. Therefore, during the operation of the punch, pawl 84 will not engage ratchet wheel 82 for feeding operation thereof.

Punch operating shaft 42 carries an actuating finger 92 for the shutter mechanism of the photographing means in forwardly extending relation on the left-hand side of the shaft and clearly shown in Figs. 6, 11 and 20.

The right-hand end of ratchet shaft 81 is journalled in the right-hand lower side frame and extends outwardly beyond the frame. A spring pressed friction brake disc construction is mounted on the end of this arm as indicated at 93 operating against the end of the bearing for the shaft in the lower side frame for normally retaining the shaft in position against rotation. This construction includes a manually adjustable collar threaded on the shaft so that it may be rotated to adjust the spring tension of the coil spring shown between the collar and the friction discs for moving the friction discs toward the other discs and against the lower side frame. The friction disc engaged by the spring is keyed to the shaft for rotation therewith and longitudinal sliding movement thereon. This brake co-operates to maintain the sensitized strip under tension, prevent the strip from becoming loose in the focal plane during a dwell in the feed and for cooperating in the feed mechanism to obtain accurate feeding of the sensitized strip.

A gate 94 is hingedly mounted on front wall 5 at the upper portion on bracket 95 secured to the right-hand portion of front wall 5 as shown in Fig. 1. Gate 94 is formed of a rigid casting or the like, having a rearwardly extending marginal flange formed with a groove in the edge to engage over the forwardly extending flange of jamb 7 in order to provide a light trap around the gate when it is in closed position on the front of housing 2, see Fig. 8.

A supplemental strip feed roll 96 is slidably mounted in bearing brackets 97 secured to the inside of gate 94, see Figs. 8, 22 and 23. Coil springs carried for the bearing brackets as shown in Figs. 22 and 23 engage bearings 98 carrying roll 96 and normally slide them to the free ends of brackets 97, or toward the rear away from gate 94. When gate 94 is held in closed position by latch 99 on front wall 5 of housing 2, the periphery of supplemental strip feed roll 96 which is mounted in horizontally aligned relation with main feed roll 51 will engage the forwardly extending portion of the periphery of feed roll 51 to grip a sensitized strip therebetween so that supplemental strip feed roll 96 will hold the strip firmly against the periphery of main feed roll 51 to secure positive feeding of the sensitized strip.

Supplemental strip feed roll 96 is positively driven by gear 100 mounted at one end on main feed roll 51 intermeshing with gear 101 on supplemental strip feed roll 96, see Figs. 4, 10, 22 and 23. Retainer strip has the front edge arranged to overlap a rearwardly extending flange on gate 94 above the aperture therein to provide a light baffle when the gate is closed.

*Photographing mechanism*

The photographing mechanism is carried by gate 94 and is arranged so that when latch 99 is released the gate may be moved to open position and all of the mechanism supported on gate 94 will move away from the front of housing 2 and provide access to the front portion of rigid supporting frame 8 as shown in Fig. 6 so that access can be had to the punch, guide blocks 29 and masking plate 32 for setting up the camera for the width of strip that is to be photographed and the amount of exposure of the strip for each photograph made.

A pair of supporting rods 110 have one end of each mounted on the upper front face of gate 94, as clearly shown in Figs. 1 and 2. The lens unit 3 has a movable frame 111 and includes a pair of upwardly extending bosses 112 formed with openings slidably receiving supporting rods 110 for slidably mounting the movable frame for forward and rearward movement on the supporting rods toward and from gate 94. An adjusting shaft 113 has knobs on the ends thereof and is journalled in the top portions of bosses 112. Adjusting shaft 113 carries a pair of pinions having the teeth thereof meshing with racks on the top edges of supporting rods 110 so that by manually gripping the knobs on the ends of shaft 113 and rotating the shaft, movable frame 111 can be adjusted forwardly and rearwardly on rods 110, see Figs. 11 to 13.

Movable frame 111 has lateral flanges extending rearwardly about the margin thereof and has an adjacent marginal portion providing a seat for a retaining ring 114 secured thereto and retaining one end of a bellows tube 115 attached to the margin of said frame. The front face of gate 94 is formed with a rectangular seat 116 on the front face thereof having another retaining ring 117 secured thereto and retaining the rear end of bellows tube 115 against said seat. This provides a light tight connection between movable frame 111 and the front face of gate 94 about the central portion thereof. Gate 94 is formed with a central exposure opening in line with the focal plane on the front face of rigid supporting frame 8.

Frame 111 is formed with an aperture plate 118, Figs. 11 to 13, having central photographing aperture 119 formed in the central portion thereof with the rear face of said aperture plate about said aperture formed to provide an arcuate seat against which arcuate shutter 120 slidably engages for movement into and out of closed position over said aperture in controlling the photographing operation of the machine. Arcuate shutter 120 is mounted on a pair of shutter supporting arms 121 pivotally mounted at 122 on the free ends of the legs of a U-shaped bracket 123 having the portion joining the legs secured to the rear face of aperture plate 118 below the photographic aperture, as shown in Fig. 11.

The shutter is operated by means of a link 124 pivotally connected at one end to one of shutter supporting arms 121 as shown in Fig. 11 and at the opposite end to the free end of an actuating arm 125 carried by a hub 126 pinned on one section of a telescoping shaft 127. One end of telescoping shaft 127 is rotatably mounted in aperture plate 118. Hub 126 is provided with an annular groove in the outer face thereof and a retaining bracket 128 has one end engaged in the annular groove in said hub and the opposite end detachbaly mounted on the rear face of aperture plate 118. This construction serves to retain one section of the telescoping shaft against endwise movement in movable frame 111 and also to hold actuating arm 125 for the shutter in proper operative position.

The other section of telescoping shaft 127 has the free end provided with a rotatable mounting in a bearing opening formed in gate 94, Fig. 13, and carries a flanged pinion 129 adjacent the front face of the gate. Flanged pinion 129 has the teeth thereon meshing with a rack 130 slidably mounted in the arms of a U-shaped guide bracket 131. The flanges on pinion 129 engage opposite sides of rack 130 for retaining the telescoping shaft in the bearing in gate 94. The upper end of rack 130 terminates in aligned relation below the free end of finger 92 as shown in Fig. 11, the rack being mounted for vertical sliding movement in bracket 131. A tension spring 132 has one end secured to the central portion of rack 130 and the other end to the upper arm of guide bracket 131 for normally moving the rack to an upper position where the lower edge of arcuate shutter 120 engages the bottom edge of the arcuate seat formed on the rear face of aperture plate 118, thereby normally holding shutter 120 in position to close photographic aperture 119.

The shutter is moved to open position to take a picture when the punch is operated to punch the sensitized strip during a dwell in the operation of the strip feed means. When finger 92 is moved in a counter-clockwise direction or downwardly as illustrated in Fig. 11, rack 130 is moved downwardly in its guide by finger 92 and rotates telescoping shaft 127 for moving actuating arm 125 upwardly and raises arcuate shutter 120 to open position to allow light to pass through photographic aperture 119. When finger 92 moves back to the position illustrated in Fig. 11, spring 132 will move rack bar 130 upwardly and return shutter 120 to the closed position. The operation of the punch to punch the sensitized strip is completed at the same time while the sensitized strip remains stationary. The strip feed mechanism is operated so that one revolution of main drive sprocket 77 and one revolution of main drive shaft 74 for the strip feed produces one complete cycle of operation to first feed a given length of strip and a document into photographing position and then operate the punch and shutter to photograph the document on the sensitized strip.

Movable frame 111 is formed with an annular forwardly extending flange 133 about aperture plate 118 and photographing aperture 119. The forward marginal portion of flange 133 is formed to provide a seat for detachably mounting lens plate 134. Lens unit 135 is mounted on lens plate 134 and carries the photographic lens or objective therein so arranged that it will focus the image of a document in a photographic position on the surface of the sensitized strip in the focal plane through photographing aperture 119.

A prism frame 136 has a pair of spaced parallel legs 137 depending therefrom and pivotally mounted on a rod 138 carried by projections 139 extending fowardly in spaced parallel relation from the front face of lens plate 134, see Figs. 1, 11 and 13.

A prism 140 is mounted in prism frame 136 in the manner illustrated in Fig. 11 so that light rays reflected from a document in a horizontal position on the top of copy table 4 are reflected at right angles through objective 135 and focused on the sensitized strip in the focal plane. This prism also reverses the image so that a positive reading image will be produced on the sensitized strip to produce what is generally termed as a positive reading negative. The mounting of prism frame 136 in the manner described above provides for pivotal movement of the frame toward and from lens plate 134. A set screw 141 threaded into plate 134 and extending through an opening in an ear at the upper end of prism frame 136, as shown in Fig. 11, provides a means for setting the prism frame in a proper position of adjustment to position the prism with respect to objective 135 and copy table 4 to focus a document on the sensitized strip. A coil spring about set screw 141, shown in Fig. 11, is maintained under compression for normally holding the ear on the top of prism frame 136 against the head of set screw 141. This set screw has a shoulder engaging the face of lens plate 134 to fix the position of the set screw in the lens plate. If it becomes necessary to change the position of prism frame 136 in order to change the position of the prism in the optical system of the machine, shims can be placed about the set screw against the head thereon for obtaining any additional adjustment of the prism that may be necessary for the accurate positioning of the image of a document on the sensitized strip.

In order to obtain uniform half tones in photographing documents it has been found advisable to use color filters depending upon variations in the color of the paper caused either through the use of pigment in the paper or by discoloration resulting from age, dirt and the like. A color filter is therefore provided in the present machine. A segment 142 is fixed on stub shaft 143 rotatably mounted in a bearing formed in lens plate 134, Figs. 1, 11 and 13. The forward end of stub shaft 143 projects in front of lens plate 134 adjacent prism frame 136 on the left-hand side thereof, as shown in Fig. 1, where it carries a knob 144 by which the shaft and segment 142 can be rotated. Segment 142 is formed with a plurality of apertures 145 of a size equal to photographic aperture 119 so that in the operation of segment 142 one of the apertures can be brought into axial alignment with objective 135 and photographic aperture 119. As illustrated in Fig. 12, the upper and lower apertures are provided for mounting color filters of a desired character indicated at 146 usually in the form of a glass plate optically ground and colored in a manner well-known in the art for producing the desired filter effect. Other materials such as celluloid and other well-known plastics are also suitable for use as filters. The central aperture does not carry a filter and is used in photographing documents when a filter is not necessary. A leaf spring 147 mounted on the inside face of flange 133, as shown in Figs. 12 and 13, is formed with a V-shaped end portion for resiliently engaging in one of a series of V-shaped notches 148 in segment 142 to hold the segment in position so that one of the apertures 145 is axially aligned with the objective. An indicator 149 including a pointer on knob 144 and a scale on lens plate 134 as shown in Figs. 1 and 13 serves to indicate the position of the filter segment to the operator of the machine.

It is also desirable to indicate the shutter operation to the machine operator and for this purpose a signal device is mounted on the lens plate, as shown in Figs. 1, 12, 13, 16 and 17. This indicator includes an aperture formed in lens plate 134 over which is mounted bearing plate 150 carrying a rearwardly extending bearing sleeve in integral relation with the bearing plate. A rod 151 is rotatably mounted in the bearing sleeve and has the opposite end extending to the front and rear of said sleeve and bearing plate. A finger 152 is fixed on the rear end of rod 151 and extends laterally in the rear of the bearing sleeve for engagement with a projection 153 formed on shutter supporting arm 121 as shown in Figs. 12 and 13. An indicator disc 154 is mounted on the forward end of rod 151 in the aperture formed in lens plate 134 and has its periphery cooperating with a flange portion on the lens plate to provide a light trap as well as indicate the operation of the shutter. A coil spring is placed under compression between lens plate 134 and indicator disc 154 as shown in Fig. 13 to take up end play between rod 151 and the bearing sleeve carried by bearing plate 150 for holding the rod and indicator disc in a fixed relation to bearing plate 150. A cover plate 155 is mounted on lens plate 134 and has an opening in the upper portion thereof indicated at 156 through which the periphery of indicator disc 154 is visible so that differently colored arcuate sections of the indicator disc will be shown through opening 156 for indicating when the shutter is being moved to open and closed positions. A pin 157 operating in an arcute cut-out section of indicator disc 154 as shown in Fig. 17 limits the extent of rotation of indicator disc 154.

It will be seen from this construction of shutter indicator that whenever the shutter is moved upwardly to the open position projection 153 will rotate rod 151 and indicator disc 154 to indicate the movement of the shutter to the open position. The disc will rotate in one direction in the opening movement of the shutter and then in the opposite direction during the closing movement so that observation of the movement of the disc will show the complete cycle of operation of the shutter at the front of the machine on the right-hand side of prism frame 136, as clearly shown in Fig. 1.

A pair of lamp base fittings 158 are mounted in spaced parallel relation on the bottom marginal portion of gate 94 as shown in Figs. 1 and 2 and adjustably support arms 159 carrying lamp housings 160 and lamp sockets to support electric lamps of a suitable type. The housings will reflect the light from the lamps on the copy table to light documents in photographing position on the copy table and reflect the light from documents through the lens unit for photographing images of documents on a sensitized strip mounted in housing 2. Lamp housings 160 can be adjusted into any suitable position that is found desirable for the best lighting arrangement in making photographic copies of documents. They are mounted on the gate with flexible cord connections extending into the housing as shown in Fig. 1, so that the gate can be swung to open position at which time the lamp housings will be swung to one side of the machine and be out of the way when it is desired to set up the machine for taking pictures.

*Copy table mounting*

A casing 170 is mounted on the end of base 1 opposite housing 2 and extends from the front of the housing to the free end of the base, as clearly shown in Fig. 2. This structure is shown in Figs. 1, 2 and 25 to 28 inclusive. The top portion of casing 170 is formed with opposed spaced parallel transversely extending guideways 171 having a slide body 172 formed with spaced parallel portions slidably engaged in said guideways and retained therein for transverse sliding movement relative to base 1 by means of retaining plates 173. A bracket 174 is mounted on the front upper face of casing 170 and rotatably supports a worm 175 intermeshed with a rack 176 mounted on the front vertical face of slide body 172. Worm 175 has a shaft extension beyond the right-hand side of the bracket as shown in Fig. 1 for the detachable engagement therewith of a hand crank adapted for engagement with a transverse pin in the end of the shaft so that the worm may be rotated for adjusting slide body 172 in guideways 171 transversely of base 1.

A carrier 177 is formed with a pair of spaced parallel guide flanges thereon engaged in guideways 178 formed on the upper face of slide body 172 and extending longitudinally of the base at right angles to guideways 171 for mounting carrier 177 for longitudinal sliding movement relative to base 1 on slide body 172. Retaining strips 179 are detachably mounted over guide projections on carrier 177 and are secured to slide body 172 for effectively retaining carrier 177 slidably engaged for longitudinal movement on slide body 172.

Carrier 177 is formed to provide a horizontal bearing plate 180 in the central portion having an aperture therein and a downwardly extending guide sleeve 181 depending from said bearing plate for holding a copy table supporting post or upright supporting member 182 and guiding it in vertical sliding movement. Upright supporting member 182 has the outer periphery thereof formed with a screw thread threadedly engaging in collar 183 having the lower end in bearing engagement on bearing plate 180. A cover plate detachably mounted on the upper end and forming part of carrier 177 holds collar 183 in bearing engagement between the cover plate and bearing plate 180, as clearly shown in Fig. 26. This holds collar 183 in position so that post 182 is held in vertically adjusted position relative to bearing plate 180. Collar 183 has an external gear 184 formed thereon and a worm 185 rotatably mounted in a bracket carried by carrier 177 is in mesh for rotating gear 184 to raise and lower the post relative to the collar and the base when a manually operable handle is engaged with the cross pin on the projecting shaft extension 186 extending outwardly from carrier 177, as shown in Figs. 1 and 27.

Carrier 177 is also slidable forwardly and rearwardly on slide body 172 when a hand crank is engaged with the pin on the projecting end of the shaft extending from worm 187 rotatably mounted in bracket 188 on one side of slide body 172. Worm 187 engages with rack 189 on the left-hand side of carrier 177 as shown in Fig. 1.

From this construction it will be seen that post 182 can be elevated and lowered to elevate and lower the copy table mounted on the upper end. By operation of worm 185, collar 183 can be rotated to provide for this elevation or lowering of the copy table and post 182. Carrier 177 can be moved longitudinally back and forth over the base while slide body 172 can be adjusted laterally on the base.

A longitudinally extending keyway 190 in post 182 has a key 191 mounted on carrier 177, as shown in Figs. 1, 27 and 28, engaged therein for guiding the post in its vertical movement but preventing it from rotating during the rotation of collar 183. A longitudinal slot 192 is formed in post 182 at a position rotated about the post at right angles from keyway 190 for receiving a strip 193 provided with a scale to indicate the position where the copy table may be set for predetermined photographing operations.

Carrier 177 has a slot 194 formed in the cover plate with the portion above slot 194 bifurcated intermediate the ends of the slot and formed to provide ears 195 that may be drawn toward each other for binding the arms formed by the bifurcated portion of the cover plate against post 192 to lock it firmly in any position of adjustment. A locking member 196 is formed with a shoulder engaging one of the ears and a shank portion extending through an aperture in the ear engaged by the shoulder and threaded into the other ear so that the locking member may be turned to draw the ears 195 toward each other to bring the arms against the post to lock it against movement.

The upper end of post or upright supporting member 182 is provided with an annular flange 197 forming a seat on which the copy table is mounted. Bearing brackets are mounted on the upper and lower ends of post 182 and carry ball bearings therein for rotatably mounting shaft 198 extending axially through said post and beyond the upper and lower ends thereof where opposite ends of the shaft carry bevel gears 199 and 200, respectively.

Drive means

The drive means is illustrated in Figs. 26 to 33 inclusive.

An electric motor 201 is used to provide the source of power. Electric motor 201 is mounted on gear case 202 to form a drive unit or means. The drive means is mounted in the bottom of housing 2 and is bolted to base 1 as shown in Figs. 27 and 28. Access may be had to the motor and gear case through the lower door in the left side wall of housing 2, shown in Fig. 2.

Electric motor 201 has an armature shaft 203 extending through and having bearings in gear case 202. Shaft 203 carries a worm 204 in the upper portion of the gear case. A main drive shaft 205 is rotatably mounted in bearings provided in gear case 202, as shown in Figs. 29 and 30, and has worm gear 206 mounted for free rotation thereon. Worm gear 206 has a sleeve extension 207 thereon about shaft 205 carrying ratchet wheel 208 rigidly secured thereto for constant rotation with the worm gear during the operation of electric motor 201.

A pawl disc 209 has a hub portion rigidly mounted on main drive shaft 205. A pawl 210 has a stub shaft 211 on one side extending laterally through a bearing opening in pawl disc 209 for rotatably mounting pawl 210 on the disc with the free end in position to engage the teeth on ratchet wheel 208. A pawl actuating plate 212 has one portion thereof rigidly mounted on the free end of stub shaft 211 on the opposite side of pawl disc 209 from the pawl, as shown in Fig. 29. A coil spring 213 has one end secured to pawl actuating plate 212 and the opposite end secured to a pin carried by pawl disc 209, in the manner shown in Figs. 32 and 33, for normally operating pawl actuating plate 212 to rotate stub shaft 211 and move the free end of pawl 210 into engagement with one of the ratchet teeth on ratchet wheel 208. Pawl actuating plate 212 carries a segmental control pin 214, as shown in Figs. 29 to 33, projecting laterally from the pawl actuating plate on the side opposite pawl disc 209. This segmental control pin engages with a control cam 215 rigidly mounted for rotation with control shaft 216 rotatable in a bearing portion in the upper part of gear case 202, as shown in Fig. 29. The free end of control shaft 216 projects to the outside of the gear case and has a bell crank 217 pinned on the outer end for operating the shaft.

One arm of bell crank 217 has the armature 218 of solenoid 219 pivotally secured thereto, as shown in Fig. 28. The other arm of bell crank 217 is adapted to engage a stop 220 on the gear case 202 for holding the bell crank against counterclockwise rotation as shown in Fig. 28 in a position, see Fig. 33, where control cam 215 will engage segmental control pin 214 and stop operation of the machine. Energization of solenoid 219 by closing an electric circuit thereto will cause armature 218 to rotate bell crank 217 in a clockwise direction, as shown in Fig. 28, for disengaging control cam 215 from segmental control pin 214. A coil spring 221 is engaged about the hub portion of bell crank 217 as shown in Fig. 28, and has one end engaged around the edge of one leg of bell crank 217 and the opposite end secured to gear case 202 for normally moving bell crank 217 into the position shown in Fig. 28 with one arm thereof engaged with stop 220.

The periphery of pawl disc 209 is recessed at 222, the recess having an arcuate portion extending inwardly from the periphery and terminating in straight portion forming part of a chord of the circle for the periphery of the disc, this shape being clearly shown in Figs. 31 to 33. A roller 223 is rotatably mounted in a plunger 224 slidably mounted in sleeve 225 threaded into an opening in gear case 202 in radial relation to the periphery of pawl disc 209, as illustrated in Figs. 28 and 30 to 33. A coil spring 226 is mounted in sleeve 225 as shown in Fig. 31, and is normally maintained under compression for moving plunger 224 to maintain roller 223 in engagement with the periphery of pawl disc 209. The adjustment of sleeve 225 will vary the tension on spring 226 and control engagement of roller 223 with pawl disc 209 for controlling operation of the pawl disc in a manner that will be hereinafter described.

Sprocket 77 hereinbefore described is mounted on main drive shaft 205. This main drive sprocket 77 drives the chain that operates the strip feed mechanism, the punch and the photographic means.

Main drive shaft 205 carries a worm gear 227 within the gear case at the left-hand side thereof, as shown in Fig. 29, having meshing engagement with a worm gear 228 carried by auxiliary shaft 229 rotatably mounted in the gear case on opposite sides of worm gear 228 in the manner shown in Fig. 30. Auxiliary shaft 229 projects through the gear case and forwardly therefrom where it has one member of a universal point 230 secured thereto while the other member is secured to one section of a telescoping shaft 231. Telescoping shaft 231 extends from housing 2 through an opening in the front portion into casing 170 to the lower end of upright supporting member or post 182. Another universal joint 232 has one section mounted on the other section of telescoping shaft 231. The other section of the universal joint 232 is mounted on a short shaft 233 rotatably mounted in ball-bearings carried in bearing bracket 234 mounted on the lower end of post 182 as clearly shown in Figs. 26 and 28. Bearing bracket 234 also carries the bearing for mounting the lower end of shaft 198 at the lower end of post 182. Short shaft 233 has a bevel gear 235 pinned thereon for intermeshing engagement with bevel gear 200 pinned on shaft 198 for transmitting the driving motion imparted to main drive shaft 205 to shaft 198 through the medium of worm gears 227 and 228 driving auxiliary shaft 229.

The arrows in Figs. 31 to 33 show the direction of rotation of pawl disc 209 and ratchet wheel 208 in the normal operation of the drive means. The drive means is constructed so that in photographing documents the electric motor runs continually at a constant speed and drives worm 204, worm gear 206 and ratchet wheel 208 continuously. As above stated worm gear 206 and ratchet wheel 208 are secured together for rotation on and relative to main drive shaft 205. The construction of the drive means illustrated is designed to secure one complete cycle of operation of the machine for feeding the sensitized strip a predetermined amount and taking a picture thereon of a document fed into photographing position on the copy table.

To secure an operation of the machine solenoid 219 is momentarily energized by closing the electric circuit thereto. The energization of this solenoid operates control shaft 216 to rotate control cam 215 clockwise from the position shown in Fig. 33 a sufficient amount that the lower left-hand end of the cam will move above the flat portion of segmental control pin 214. This will release segmental control pin 214 and allow spring 213 to rotate pawl actuating plate 212 counter-clockwise from the position shown in Fig. 33. Stub shaft 211 will also be rotated to bring the free end of pawl 210 into engagement with a tooth on ratchet wheel 208 immediately upon the release of control pin 214. Ratchet wheel 208 then rotates pawl disc 209 through pawl 210 counter-clockwise, as shown in Figs. 32 and 33, or clockwise as shown in Fig. 31 rotating main drive shaft 205 one revolution and operating all of the mechanism in the camera through a complete cycle.

As the rotation of pawl disc 209 nears the end of one complete revolution, it assumes the position shown in Fig. 32 where the periphery adjacent recess 222 reaches a position in the travel of roller 223 about the periphery so that the roller is about to drop into the recess at the end formed with the arcuate portion. Fig. 32 illustrates the position where the point of intersection between the arcuate end of the recess and the outer periphery of pawl disc 209 has just passed the radial center line of roller 223 connecting the center of shaft 205. At this point pawl 210 is still fully engaged with a tooth on ratchet wheel 208 and segmental control pin 214 has reached a position where the semi-cylindrical portion of the pin engages the shoulder of control cam 215. Since ratchet wheel 208 is power-driven continuously it will continue to rotate pawl disc 209 but the engagement of segmental control pin 214 with control cam 215 will throw pawl 210 out of engagement with the tooth on ratchet wheel 208 in continued movement.

To facilitate the disengagement of pawl 210 it is necessary to relieve the driving pressure between the end of the pawl and the tooth on ratchet wheel 208. This is accomplished by means of roller 223 and recess 222. In the instant immediately following that when the parts reach the position shown in Fig. 32, further rotation of pawl disc 209 will be obtained by spring pressed roller 223 moving rapidly inward under spring pressure into the curved portion of recess 222. This results in the spring operation of the roller toward the disc acting to momentarily accelerate the rotation of pawl disc 209 at a faster speed than ratchet wheel 208 thereby moving the end of pawl 210 momentarily ahead of the tooth and out of engagement therewith. During this momentary period of disengagement of pawl 210 from the tooth on ratchet wheel 208 the accelerated rotation of pawl disc 209 by roller 223 aids in causing control cam 215 to operate segmental control pin 214 and move pawl actuating plate 212 in a counter-clockwise direction as shown in Figs. 32 and 33 until the free end of pawl 210 is moved outward beyond the periphery of the ends of the teeth on ratchet wheel 208, as shown in Fig. 33. Fig. 33 shows the end of this accelerated advancing movement of control disc 209 by the operation of roller 223, the pawl having been moved outwardly and spring 213 placed under greater tension. Pawl disc 209 has its motion arrested in this position completing one complete revolution thereof and one complete cycle of operation of the entire photographing machine to feed a new portion of sensitized strip into position in the focal plane, move a document into photographing position, photograph the document on the strip and simultaneously punch the strip.

The copy table

The copy table structure is shown in Figs. 1, 2, 25, 26 and 34 to 47.

The copy table has a frame formed with a supporting plate 240 having an annular seat engaging on annular flange 197 to which it is rigidly secured by machine screws or the like for rigidity attaching and supporting the copy holder on post 182. A pair of side frame members 241 are secured at the lower edges to opposite sides of supporting plate 240 and extend upwardly above said plate to support copy plate 242 in horizontally extending relation on the upper edges thereof. A supplemental frame 243 is mounted in horizontally extending relation below copy plate 242 and extends between the upper portions of side frame members 241 and is rigidly secured thereto, as shown in Figs. 36 and 38. A shaft supporting bracket 244 is mounted on the under side of supplemental frame 243 in the central portion of the copy table and has bearings carried thereby for rotatably mounting shaft section 245. A bevel gear 246 is rigidly mounted on the rear end of shaft section 245 meshing with bevel gear 199 on the upper end of shaft 198 from which shaft section 245 is driven. The opposite end of shaft section 245 carries a bevel gear 247 rigidly mounted thereon and meshing with a bevel gear 248, Fig. 37, rigidly mounted on copy table drive shaft 249. Copy table drive shaft 249 is journalled at opposite end portions in ball-bearings mounted in side frame members 241 with the right-hand end of shaft 249 looking from the front end of the copy table extending outwardly beyond the outside of the right-hand side frame member 241 for carrying a crank arm for driving the copy feed mechanism in a manner that will be hereinafter described.

Copy plate 242 is formed to receive and have documents to be photographed fed thereover from the front end to the rear end thereof and when in the central rear portion of the copy plate the document will be moved through a photographing position that will be arranged in focus with the photographing means so that documents on said copy plate can be focused on the sensitized strip in the focal plane of supporting member 8. Copy table 242 is formed as shown in the drawings with three longitudinally extending slots 250 two of which are arranged in substantially equi-distant relation at each side of the longitudinal center of copy plate 242 while the third is formed on the left-hand side of the copy plate in spaced parallel relation to the other two slots as clearly shown in Figs. 25, 38 and 43. Endless link belts or chains 251, three in number corresponding to longitudinally extending slots 250 each carry a plurality of retractable feed fingers 252 for document engaging and feeding purposes. These endless link or belt members are each mounted on two sprockets 253, there being three sets of two sprockets each with corresponding sprockets of each set rigidly mounted on spaced parallel sprocket shafts 254 and 255, respectively. Sprocket shaft 254 is mounted at the forward end of the copy table frame and has opposite ends rotatably mounted in ball bearings carried by side frame members 241 as shown in Fig. 37. Sprocket shaft 255 extends transversely of the copy table at the rear end thereof and has opposite ends mounted in ball bearings inside frames 241 as shown in Fig. 37. Sprocket shaft 255 has end portions extending beyond the outer side of side frame members 241 for a purpose to be presently described.

Supplemental frame 243 is provided with a plurality of longitudinally extending guides 256 on the upper face thereof for receiving and guiding the upper flights of endless link belts to guide and hold retractable feed fingers 252 in position to extend through slots 250 for engaging and feeding documents across the top face of copy plate 242. These guides 256 are so positioned in guiding the top flights of endless link belts 251 that only a sufficient amount of the upper free ends of the retractable feed fingers in their extended position project through the slots to fully and firmly engage the edge of a paper sheet or document to obtain positive feeding thereof.

The link belts 251 are illustrated in the drawings in the form of endless chains of conventional construction. Certain of the links of these chains are of special construction to carry retractable feed fingers 252. Either the central link of the chain or one of the pair of side plate links connecting two center links may be constructed to carry feed fingers 252. The details of construction of a side plate link for carrying the feed fingers are illustrated in Figs. 40 to 42 showing a special side plate for connecting two center links at 257 formed with a projecting portion on one edge thereof terminating in a laterally extending projection 258. If a center link were used instead of a side plate link it would be formed with a similar projection to projection 258.

Each retractable feed finger comprises a holder 259 having a foot portion secured to lateral projection 258 by a set screw and a cylindrical passage for slidably mounting feed fingers 252. Finger holder 259 houses a coil spring 260 for compression against the inner end of feed finger 252 for normally projecting it outwardly from the free end of the holder. A retaining screw 261 is mounted in feed finger 252 through an angle slot 262 in holder 259. One portion of the angle slot extends axially of the cylindrical portion of holder 259 and the other part extends circumferentially therefrom at the inner end for holding feed finger 252 in retracted position when it is pushed inwardly against the tension of spring 260 until retaining screw 261 can be moved into the circumferentially extending portion of slot 262. This will hold feed finger 252 in a retracted position where it will not project through the slot 250 and therefore will not feed documents. The free end of each feed finger 252 is formed to provide a flat transversely extending face on the front and rear sides thereof as shown in Figs. 40 and 42 to provide document engaging faces for engaging the edges of documents in the feeding operation as shown in Fig. 40. The free end of each feed finger is therefore of narrow dimension in the direction of feed so two documents can be arranged with edges close together for photographing.

It will be noted in Fig. 36 that document feed fingers 252 are not mounted in uniformly spaced relation on the endless chain but are unequally spaced. This unequal spacing provides for the feeding of documents of various sizes through the photographing position on the copy plate by the particular selection of feed fingers desired for the size of the document while the remaining feed fingers are retracted into inoperative position.

Supplemental frame 243 between longitudinally extending guides 256 is formed with a plurality of upwardly extending projections having copy plate 242 secured to the upper ends to provide a reinforced construction in which copy plate 242 is rigidly supported in flat relation against flexing.

The drive connections between copy table drive shaft 249 and sprocket shaft 255 are shown in Figs. 34, 37, 38 and 43 to 47.

Crank arm 263 is mounted in radially extending relation on the right-hand end of copy table drive shaft 249 for rotation therewith. Crank arm 263 is provided with a pair of radially extending guideways slidably mounting a slide block 264 carrying a projection rotatably mounting one end of pitman 265. A manually rotatable screw 266 is mounted in radial relation in crank arm 263, as clearly shown in Fig. 37, and is threadedly engaged in slide block 264 for holding it in any position of adjustment in the guideways of crank arm 263. An indicator strip 267, Fig. 34, is mounted on crank arm 263 adjacent one of the guides for slide block 264 for cooperation with an indicator mark on the slide block to indicate the different positions in which the slide block may be set for a plurality of different predetermined feeding positions of the slide block on the crank arm for documents of the sizes indicated.

The other end of pitman 265 is pivotally connected to a gear segment 268, Fig. 34, rotatably mounted on shaft extension 269 projecting outwardly from the right-hand side frame member 241 in the lower central portion thereof.

Gear segment 268 has the gear teeth thereon meshing with the teeth of a gear 270 rotatably mounted on a sleeve 271 which is rotatably mounted on the outer end of sprocket shaft 255, Figs. 37, 44 and 45. Gear 270 has an annular collar 272 formed integral therewith on one side and formed with an annular groove 273 having the rollers on the inner ends of control pins 274 engaged in the groove. Control pins 274 are adjustably mounted, as shown in Fig. 47 in the central yoke portion of clutch operating arm 275. Arm 275 has one end pivotally mounted on an upwardly extending pin formed on pivot bracket 276, as clearly shown in Fig. 34. The other and free end of clutch operating arm 275 extends in angular relation to the portion extending between the pivot bracket and control pins 274 and carries an upwardly projecting stud 277 having one end of a tension spring 278 engaged thereon with the opposite end secured to a stud 279 depending from the under side of copy plate 242. Spring 278 normally tends to move clutch operating arm 275 toward the right-hand side frame member 241. Another stud 280 projects from the free end of clutch operating arm 275 at right angles to stud 277 as shown in Fig. 34 and rotatably mounts a roller 281 on the free end thereof.

Gear 270 has a clutch tooth 282 on the inner face projecting inwardly for engagement in a slot 283 formed in the adjacent face of pawl carrying plate 284, Fig. 46. This plate 284 is riveted to an annular flange 285 formed on the inner end of sleeve 271, Fig. 44. One outer corner of pawl carrying plate 284 pivotally mounts a pawl 286 on the inner face thereof in position for the free end to engage with ratchet teeth on ratchet wheel 287. Ratchet wheel 287 is pinned on sprocket shaft 255 adjacent the bearing mounting of said shaft in right-hand side frame member 241, as clearly shown in Fig. 44. The outer face of ratchet wheel 287 is recessed to receive annular flange 285 on sleeve 271 in order that pawl carrying plate 284 can be mounted in close adjacent relation to ratchet wheel 287. A spring 288 is mounted on the other corner of pawl carrying plate 284 in the manner shown in Fig. 46 and has opposite ends arranged to engage pawl carrying plate 284 and pawl 286 for normally moving the free end of pawl 286 into engagement with the teeth on the periphery of ratchet wheel 287 so that in the oscillation of pawl carrying plate 284 back and forth, pawl 286 will engage the teeth on ratchet wheel 287 and rotate the ratchet wheel intermittently in one direction.

A collar 289 is mounted on the end of sprocket shaft 255 for normally retaining sleeve 271 against endwise movement on the outer end of shaft 255, the inner end thereof being engaged with the outer face of ratchet wheel 287.

Gear 270 is slidable axially on sleeve 271 in the operation of clutch operating arm 275 in order that clutch tooth 282 can be engaged and disengaged with slot 283 in pawl carrying plate 284. When clutch operating arm 275 is moved inwardly toward side frame member 241 clutch tooth 282 will be engaged in the slot in pawl carrying plate 284. In this engaged relation rotation of copy table drive shaft 249 will rotate crank arm 263 and convert the rotary motion of said shaft into reciprocating motion through pitman 265 which will oscillate gear segment 268 on its shaft extension 269. This oscillation of gear segment 268 will in turn oscillate gear 270 and pawl carrying plate 284. This oscillation of pawl carrying plate 284 will intermittently drive ratchet wheel 287 in a clockwise direction as illustrated in Figs. 34 and 46 to thereby intermittently rotate sprocket shaft 255 in a clockwise direction as shown in Figs. 34 and 46 and lineally move link belts or chains 251 intermittently in one direction for feeding documents through the photographing position on the copy table from the left to the right as shown in Fig. 34.

When clutch operating arm 275 is moved to disengage clutch tooth 282 from slot 283, continued rotation of copy holder drive shaft 249 will merely oscillate gear segment 268 and gear 270 on sleeve 271 while sprocket shaft 255 and pawl carrying plate 284 remain stationary.

In order to hold sprocket shaft 255 stationary in the disengaged position of clutch tooth 282, the left-hand end of sprocket shaft 255 on the opposite side of the copy table is provided with a friction clutch 290. Friction clutch 290 has a stationary clutch plate 291 engaged against the portion of side frame member 241 surrounding the bearing for sprocket shaft 255 and held against rotation by pins 292, Fig. 37. A plurality of annular friction discs are engaged on rotatable clutch plate 293 keyed on the end of sprocket shaft 255 for longitudinal sliding movement on the shaft. A collar 294 is retained on the end of sprocket shaft 255 by a set screw for holding a coil spring 296 under tension between collar 294 and rotatable clutch plate 293 to maintain the desired amount of friction between clutch plates 291 and 293 and on the clutch discs engaged between them so that sprocket shaft 255 is held stationary against rotation at the end of each positive feeding operation by pawl 286 as described above. By this means accurate feeding of documents by retractable feed fingers 252 can be obtained.

Figure 25:
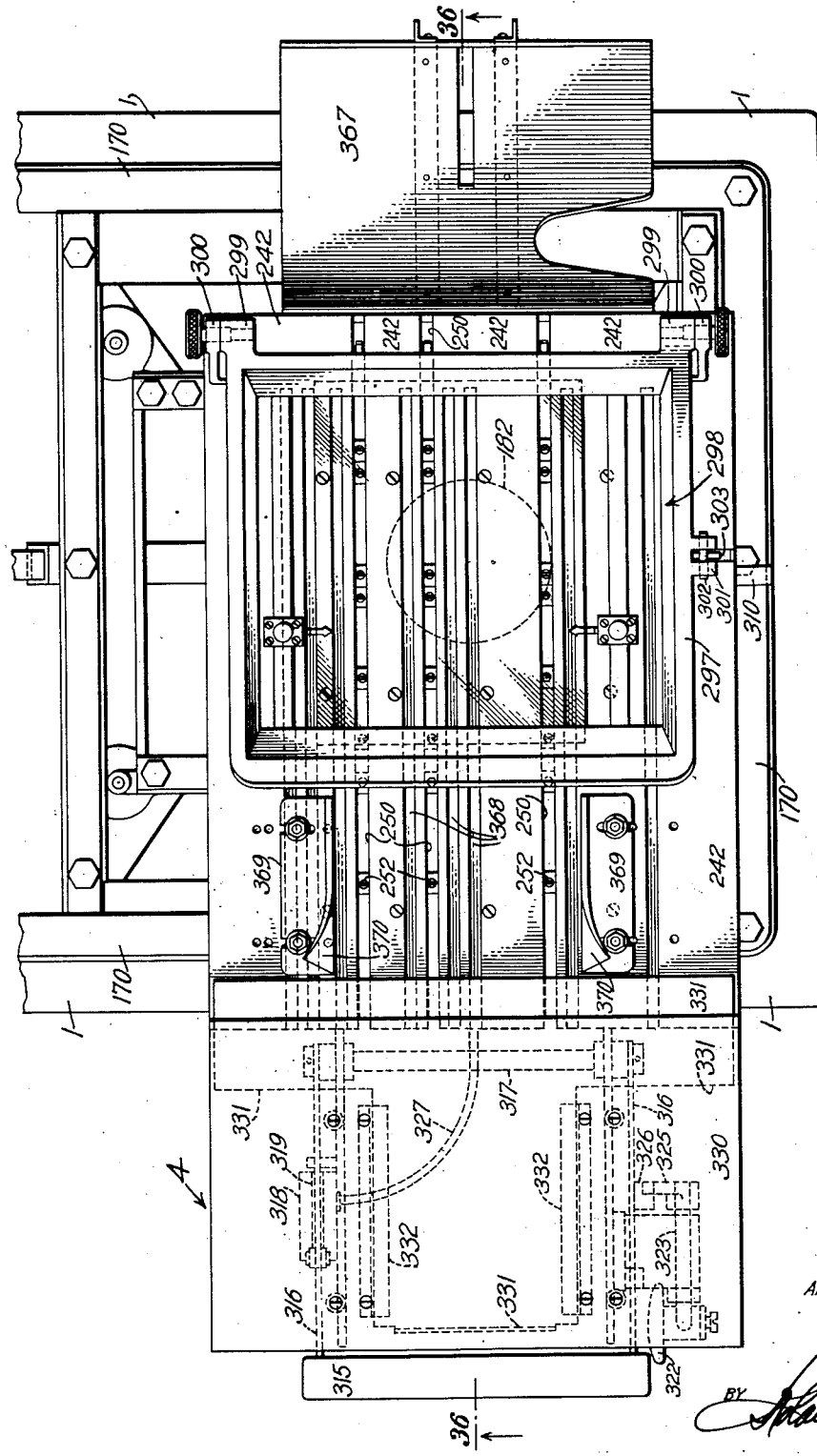
Fig. 25 is an enlarged fragmentary plan view showing the copy table and the end portion of the base of the machine on which it is mounted, the copy table being in the side feed position.

A cover plate frame 297 carrying a transparent cover plate 298 has the rear corners at each side provided with a rearwardly extending pivot projection 299 pivotally mounted on pivot brackets 300 secured to the rear inclined portion of copy plate 242 as clearly shown in Figs. 1, 25 and 36. The right-hand side portion of cover plate frame 297 has a bifurcated projection 301 extending laterally therefrom, as clearly shown in Fig. 25, carrying a transversely extending pin 302.

A manually operable lever 303 is formed to provide a handle at the upper end projecting above cover plate frame 297 and extends in substantially vertical relation downwardly at the right-hand side of the copy table through a slot in copy plate 242 with the lower end pivotally mounted on a laterally projecting stud 304 carried by the free end of rock lever 305. The central portion of rock lever 305 is pivotally mounted on shaft projection 306 provided on the central portion of right-hand side frame member 241. The other end of rock lever 305 carries a roller that rides on the periphery of cam 307 secured to the inner end of the hub portion of crank arm 263 for rotation therewith in the rotation of copy table drive shaft 249.

A shoulder 308 is formed on the inner edge of manually operable lever 303 at the upper end portion for engaging transversely extending pin 302 in the bifurcated projection 301. A coil spring 309 has one end secured to the end portion of rock lever 305 adjacent stud 304 and extends downwardly therefrom and is secured at the lower end to the lower portion of right-hand side frame 241, as shown in Fig. 34. This spring is under tension for normally operating rock lever 305 to hold the roller on the opposite end thereof in engagement with the periphery of cam 307. In the rotation of copy table drive shaft 249 cam 307 will operate rock lever 305 to move manually operable lever 303 up and down in timed relation with the intermittent rotation of sprocket shaft 255 for raising cover plate frame 297 and cover plate 298 upwardly in spaced relation above copy plate 242 during the time that sprocket shaft 255 is rotated for moving the feed fingers and feeding a document on the copy plate.

There are times when it may be desired to produce a plurality of copies of the same document. It is therefore desirable to control the operation of the document feed independent of the operation of the remainder of the machine so that a document will remain stationary on copy plate 242 under cover plate 298 so that a plurality of duplicate copies thereof can be produced.

Cover plate 298 defines the photographing position on copy plate 242. When it is desired to produce duplicate copies of a document, manually operable lever 303 is moved toward the outside or right-hand side of the copy table for disengaging shoulder 308 from transversely extending pin 302. Then, in the operation of copy table drive shaft 249 manually operable lever 303 will merely be oscillated up and down without engaging pin 302 and without raising cover plate frame 297. Lever 303 has the central portion thereof formed with a vertical slot that receives roller 281 on stud 280 of clutch operating arm 275. When manually operable lever 303 is moved to disengage shoulder 308 from pin 302, clutch operating arm 275 is also moved to disengage clutch tooth 282 from slot 283 and disconnect the drive means from sprocket shaft 255. This will provide for the operation of the machine without feeding a document into or out of the photographing position so that as many copies as desired may be made of a document in photographing position.

A holding lever 310 is pivotally mounted on the under face of copy plate 242, as shown in Fig. 44, in horizontal relation with the free end projecting outwardly through a slot in the right-hand side plate of the copy table. Holding lever 310 carries a roller 311 in a position so that the edge of the roller will engage the inner edge of manually operable lever 303 and hold it and arm 275 in the document feed disengaging position thereof, as shown in Fig. 44, and retain this lever 303 in this position during its up and down movement in the production of duplicate copies of a document in photographing position. A coil spring 312 has one end secured to lever 310 and the opposite end secured to a stud projecting downwardly from the under side of copy plate 242. Spring 312 is normally under tension for moving holding lever 310 into position to hold manually operable lever 303 in the disengaged position of the copy feed. A guide bracket 313 mounted on the under side of copy plate 242 holds the free end of holding lever 310 against flexing. By pulling the free end of holding lever 310 forwardly, or to the left as shown in Fig. 44, roller 311 will be disengaged from lever 303. Spring 278 will then operate clutch operating arm 275 and through the medium of roller 281 move lever 303 into its operating position for engaging shoulder 308 with pin 302 while the document feed will be engaged by operation of collar 272 to engage tooth 282 in slot 283 for operation from copy table drive shaft 249.

A main control bar 315 is mounted in advance of the front end of copy table 4 on the free ends of a pair of spaced parallel levers 316 extending rearwardly under the top portion of the copy table and mounted at the rear end on the ends of a shaft 317 rotatable in bearings in side frame members 241 as clearly shown in Fig. 25. A micro-switch 318 is mounted on the forward end of the left-hand side frame 241 as shown in Figs. 25, 35, 36 and 39 and has a spring arm 319 secured thereto at one end and provided with a roller at the opposite end engaging the under side of the lever 316 on the left-hand side of the copy table. This structure is arranged so that depression of main control bar 315 will move the roller and spring arm 319 downwardly as shown in Fig. 35, for example, and operate the micro-switch to close an electric circuit to solenoid 219 for operating control cam 215 to release the drive means for one cycle of operation.

Main control bar 315 is held in upper position through the medium of a coil spring 320 having one end secured to laterally extending arm 321 depending from the left-hand lever 316, as shown in Fig. 35. The other end of coil spring 320 is suitably secured to left-hand side frame member 241 to maintain the spring under a suitable tension for holding main control bar 315 in the upper position in which micro-switch 318 will normally remain in a position to open the circuit to the solenoid and hold it open.

It is also found desirable to provide means for operating micro-switch 318 by means of the knee instead of operating control bar 315 by the hand. For this purpose a knee pad 322 is mounted on an angle lever 323 having one end in horizontally extending relation and rotatably mounted in bearing 324 on the right-hand side frame member 241, Fig. 34. The portion of angle lever 323 carrying knee pad 322 depends downwardly at the front end of the copy table as clearly shown in Figs. 2 and 34. The horizontal portion of angle lever 323 in bearing 324 has a finger 325 rigidly mounted on the free end engaging the top of the laterally extending end of a projection 326 provided on the right-hand lever 316.

By operating knee pad 322 to move angle lever 323 in a counter-clockwise direction as shown in Fig. 2, for example, finger 325 will be moved downwardly and engage projection 326 to move spaced parallel levers 316 downwardly for operating micro-switch 318 to close the circuit to solenoid 219.

Figure 26:
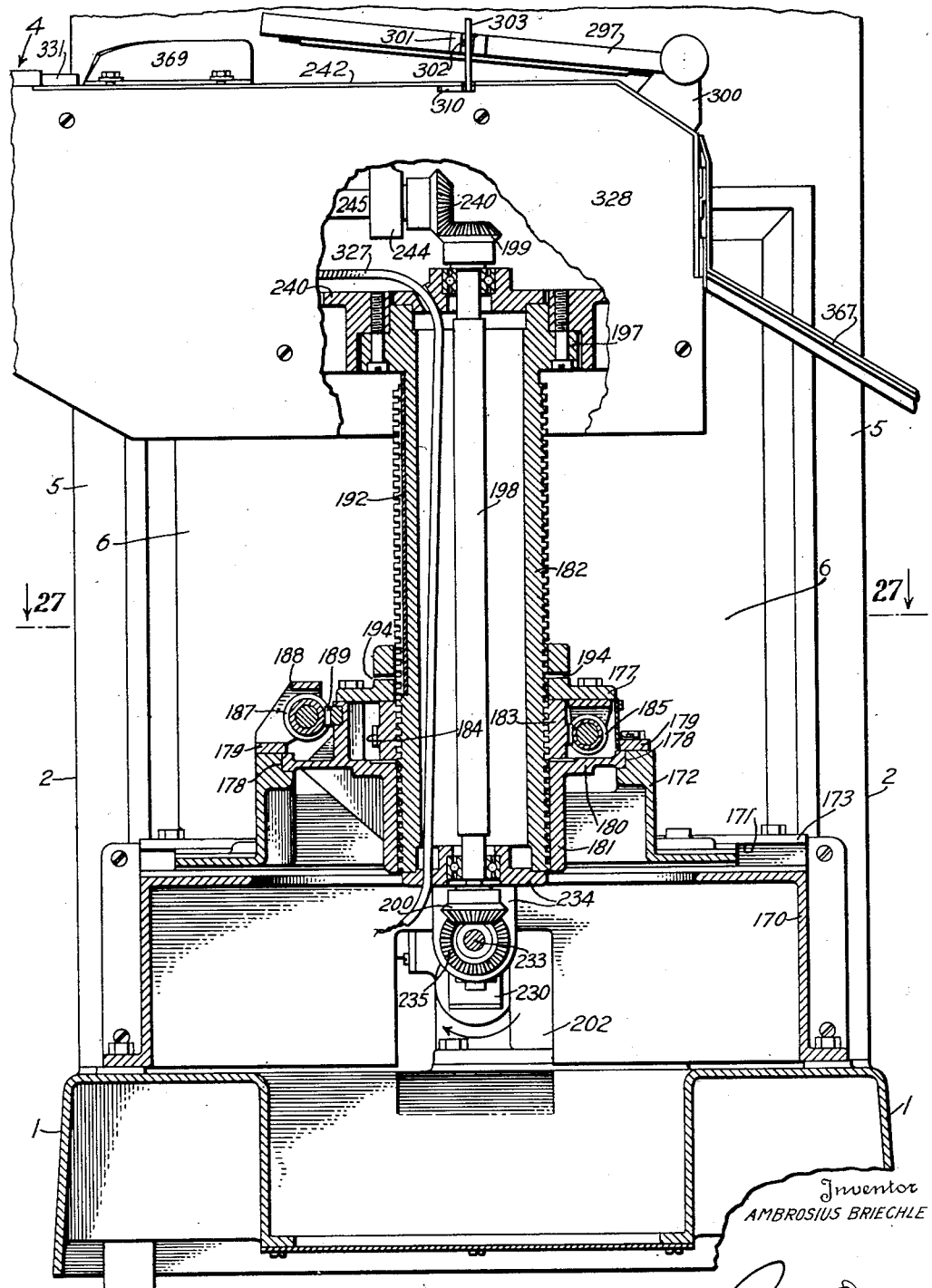
Fig. 26 is an enlarged front elevation showing the copy table in the side feed position with portions of the copy table, the base and the mounting structure for mounting the copy table for adjustment on the base shown in cross-section along the axis of the post.

A cable 327 carrying the wires from micro-switch 318 extends through the central portion of the copy table frame and downwardly through the central portion of post 182, as shown in Fig. 26, and then through casing 170 and base 1 to the drive unit and solenoid 219. For convenience in illustrating the invention this cable is omitted from some of the figures in the drawings.

The copy table has the rear end of copy plate 242 extending to the rear of the photographing position and inclined downwardly and rearwardly as shown at the right-hand side of Fig. 36. The copy plate is then provided with a depending vertically extending portion secured to the rear edges of side frame members 241, as shown. Side cover plates 328 are secured to the under side edges of copy plate 242 at the upper edges and at the lower portions are secured in spaced parallel relation to side frame members 241 to fully enclose the feed mechanism mounted in the copy table. The front end of the copy table is provided with a front cover plate 329 detachably secured about the front end of the frame member 241 as shown in Fig. 36, to provide a document table over the top of the frame at the front portion thereof as indicated at 330 and then extend down over the front ends of frame members 241. The lower front portions of side frame members 241 are formed to provide inclined front edges extending forwardly and upwardly from the bottom edges of the copy table frame as shown in Fig. 36, with the front cover plate provided with an inclined portion secured to these inclined front edges. The side edges of cover plate 329 extend to and are engaged with the front edges of side cover plates 328 also having the front edge portions inclined correspondingly to side frame members 241.

It will be noted that document table 330 is positioned above the horizontal plane of copy plate 242 at the front end of the copy table. A supplemental table section 331, Figs. 25, 36 and 39, is slidably mounted in guides 332 on the under side of document table 330 and has the rear end projecting from under document table 330 over the top face of copy plate 242. The rear portion of supplemental table section 331 extends entirely across the copy table as shown in Fig. 25. This supplemental table section is slidable longitudinally for adjustment over copy plate 242 to provide a longer or shorter document table as desired depending on the size of documents being photographed in the machine.

Wiring

Fig. 48 is a wiring diagram illustrating the electrical connections to the various parts of the machine.

A pair of main power transformers 333 are connected in parallel by circuit wires indicated at 334 with a main source of current supply through a double pole switch 335 or any other suitable means for controlling the electrical supply to the machine. An attachment plug can be used on a length of flexible cable carrying the wires 334 for attachment in a wall receptacle without the use of a double throw switch 335 if desired. Wires 334 provide a circuit to the primary winding on transformer 333.

The secondary windings on transformer 333 have a common return circuit 336. One part of the secondary of each transformer 333 is provided with a common circuit connection to wire 337. Wires 336 and 337 are connected with a fuse box 338 from which the circuits to both wires are extended to a control switch for the secondary circuit through wires 336 and 337 indicated at 339. Switch 339 is manually operable and is mounted on the upper left-hand corner of housing 2 under pilot light 340 connected in circuit so that it is illuminated when switch 339 is closed. Switch 339 is a double pole single throw switch having the other portion of the switch indicated at 341 controlling the circuit wire 342 connected to motor 201 through a fuse box 343. The motor also has a circuit connection 344 with common return circuit 336 through fuse box 343. Transformers 333 are usually provided to operate on the usual commercial supply circuit voltages available in most cities and the secondary circuits hereinabove described have the apparatus therein constructed to operate on 110 volts. It is desirable however to operate some of the controls on low voltage, such as solenoid 219. For this purpose a step-down transformer 345 has the primary connected by a pair of wires 346 through a fuse box 347 to the current supply through wires 336 and 337 under the control of switch 339. The secondary of step-down transformer 345 has a series circuit connection with micro-switch 318 and solenoid 219. The cable 327 houses the two wires providing this series circuit connection which are indicated by the numeral 327 in the wiring diagram, Fig. 48.

It is desirable to have a signal for indicating a break in the sensitized strip or whenever the end of the sensitized strip has passed a point immediately above punch bar 36. For this purpose, a micro-switch 348 is mounted on the inner upper face of gate 94, as shown in Fig. 8, and has arm 349 pivoted on the micro-switch at one end and provided with a roller on the free end for engaging in an aperture formed in guide plate 28. This micro-switch 348 is connected in series with a buzzer 350 and the secondary of step-down transformer 345 in the manner illustrated in Fig. 48. Whenever the sensitized strip is engaged between guide plate 28 and the roller on arm 349, micro-switch 348 will be operated to move the switch parts into disengaged position for opening the circuit to buzzer 350 and holding the circuit open. Whenever the strip is not present between the roller on arm 349 and guide plate 28 or in case gate 94 should accidentally become opened while switch 339 is in the closed position, the micro-switch will operate to close the circuit to buzzer 350 and maintain operation of the buzzer. This will signal a break in the sensitized strip, the passage of the end of the strip past the micro-switch and the opening of gate 94.

The lamps in lamp housings 160 for illuminating documents on the copy table are connected by flexible cables 351 having plugs 352 on the ends thereof for detachable engagement in socket 353 mounted on the right-hand central portion of the front wall 5 of housing 2 as shown in Figs. 1, 2 and 48. Each of the sockets 353 is connected by pairs of wires 354 through fuse boxes 355 with common return circuit 336 and a pair of separate circuit wires 356 and 357 respectively having connections with other portions of each secondary of the transformer designed to provide the desired voltage and current supply for illuminating the lamps.

Operation

This machine is designed to make one or more photographic copies at unity of documents such as index cards and the like, particularly those included in several standard sizes as follows:

| | |
|---|---|
| 2.4 x 3.6 | 5 x 7 |
| 3 x 5 | 6 x 8 |
| 4 x 6 | 6 x 8.5 |

The sizes expressed above are in inches.

The machine as disclosed is designed to use different widths of sensitized paper strips or film, particularly widths of 3.6, 5, 6, 7, 7.6, 8 and 8.5 inches, respectively.

A limited number of duplicate copies of the first three sizes of cards listed above may be made by continuous intermittent feeding of documents in operation of retractable feed fingers 252. This gains a substantial advantage in producing a limited number of duplicate copies of documents because the documents may be continuously fed through the machine while the desired number of duplicates are produced.

This machine is particularly designed to be set up for taking a large number of pictures of documents of one size at a time, as distinguished from shifting from one size to another after taking only a few copies. In making duplicate photographic copies of documents it is customary to open the doors to the housing, gate 94 and the top of the housing and then select a desired width of sensitized strip for taking pictures of one particular size of document, such as one of those listed above. A spool of sensitized paper is placed in the cradle between the upper side plates in the manner hereinabove described by raising roller 13 upwardly while the spool is inserted into the cradle. The spool is centered in the manner hereinabove described and the end of the sensitized strip or protecting lead strip is led over guide roller 26 and threaded over guide plate 28 between guide blocks 29 and under the roller on the end of arm 349 controlling operation of micro-switch 348. Guide blocks 29 are set to the proper width of the strip being used on guide 28 and the strip is then threaded between die blocks 33 and punch guide plate 37.

The strip is then pulled down over ground glass plate 30 through the focal plane and under masking plate 32. Then the strip is engaged over main feed roll 51 with gate 94 still in open position. Next the strip is secured to receiving spool 52 which is positioned in the manner above described for winding the strip thereon in the operation of the machine when main drive shaft 14 for the strip feed mechanism is rotated.

Masking plate 32 is positioned over the strip to mask the portion over ground glass plate 30 that is not used to receive an image of the card size being photographed. In photographing small cards or long narrow cards transversely on the sensitized strip it is obvious that only that portion on which the card image appears will be exposed to the lens unit while the remainder will be masked out by masking plate 32. When the sensitized strip has been threaded in the machine with the end attached to receiving spool 52 in feeding relation, and the various guides and the masking plate adjusted, gate 94 and the doors are then closed for the taking of pictures.

At the time the sensitized strip is placed in the housing for photographing a group of cards, the copy table is also set in position and adjusted for properly feeding the cards through the photographing position. Slide blocks 86 and 264 are adjusted to feed the sensitized strip a sufficient amount to move an exposed portion out of the photographing plane behind masking plate 32 and to move retractable feed fingers to feed a document a sufficient amount so that it will be accurately moved into proper focus for photographing and then moved out of this position and replaced by another document in the same position. Side cover plates 328 are usually removed from the copy table in making these adjustments to set up the machine for photographing a group of documents of one size.

The copy table is positioned either in front feed or side feed position according to the type of documents being photographed and the number of copies desired.

Figure 3:
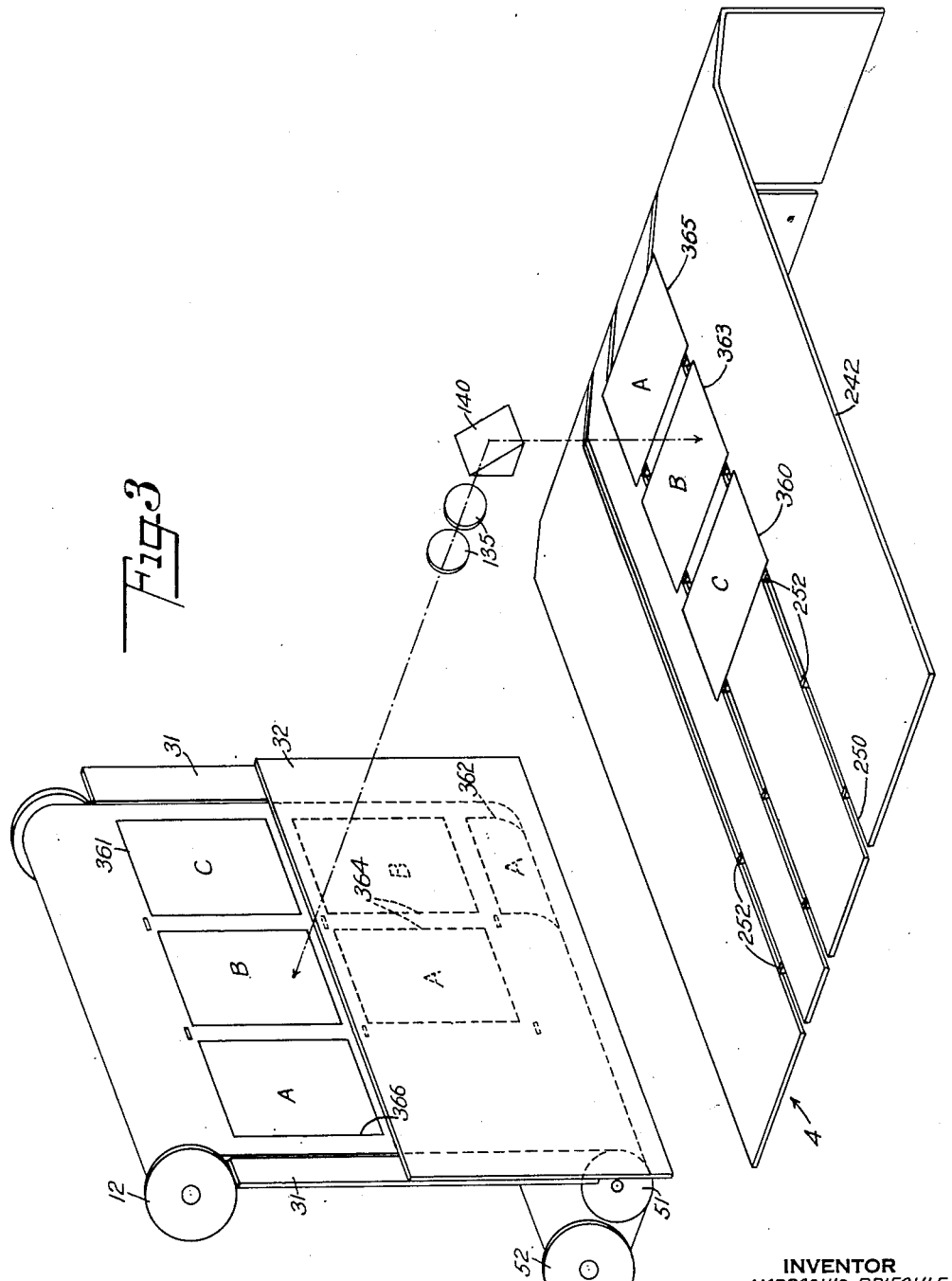
Fig. 3 is a diagram illustrating how the side feed of documents through the photographing position will produce duplicate copies on the sensitized strip with the continuous feeding of documents during each cycle of operation of the machine.

Fig. 3 illustrates diagrammatically one application of the invention for photographing documents to produce three copies of a document with the copy table in side feed position. The illustration in Fig. 3 shows how cards of the small size listed above, that is 2.4 x 3.6 inches, may be fed over copy plate 242 in side feed position and three photographic copies produced on a sensitized strip 7.6 inches wide. This application of the machine is used for State automotive registration purposes in several different states.

It is customary for an applicant for State auto registration to make out a printed application form. A particular area of this form having the 2.4 x 3.6 size is filled out by the applicant with all of the information that he is required to carry on his copy of the certificate of registration. A negative of this portion of the form is produced and these negatives are then used to produce positive copies on the present machine as disclosed in this application in the manner disclosed in Fig. 3.

The copy table is arranged in side feed position and the feed mechanism for document feed fingers 252 is adjusted so that selected feed fingers 252 positioned at the distance of 2.5 inches apart on the endless members are in projected feeding position and the remainder of the fingers are moved into retracted position. Crank arm 263 of the feed table has the rotatable screw 266 adjusted to position slide block 264 for rotating sprocket shaft 255 an amount sufficient to move link belts 251 a distance of 2.5 inches in each lineal movement thereof in feeding the cards through the photographing position. The negatives of the cards will be fed with the 3.6 inch dimension extending transversely of copy plate 242, as shown in Fig. 3.

The sensitized strip masking plate and feed mechanism will be set up so that the strip will be fed 3.85 inches in each cycle of operation of the machine in taking each photograph and punching the strip adjacent thereto. The photographing arrangement as disclosed in Fig. 3 will be such that when one of the negative cards is moved into the photographing position indicated by the numeral 360 in Fig. 3, it will be at the left-hand side of the photographing position toward the front of the copy table and will produce an image in the focal plane on the sensitized strip at the upper right-hand corner of the focal plane, as indicated by the numeral 361. These negative documents are continuously fed from the front end of the copy table in side feed position, so that in each operation of the machine through one complete cycle by depressing control bar 315 a document will be fed forward one step and photographed. Each successive document being moved into this position 360 will produce a photograph on the sensitized strip at position 361 and these photographic images will be in successive order in longitudinally aligned relation on one side of the sensitized strip.

The arrangement shown will produce three copies of each document. The first copy is produced in the position 361. During the production of subsequent copies the image of the first document will be moved successively downward with repeated feeding of the sensitized strip in the manner hereinabove described until the first image of the first document reaches a position indicated in Fig. 3 at 362 at the time the third copy of a copy is made.

The first operation of control bar 315 will first feed a document into position 360 simultaneously feed the sensitized strip into the focal plane and then punch and photograph the document in position 360 on the sensitized strip in position 361. This will complete one cycle of operation obtained by operating control bar 315.

The depression of control bar 315 again will set the machine in motion to complete another cycle of operation of the machine. During this next cycle of operation the card in position 360 will first be moved into position 363 with simultaneous feeding of a new card to position 360 and feeding of the sensitized strip to move the first card image downwardly behind masking plate 32. The cycle of operation is completed by the punching of the strip and photographing the two cards in positions 360 and 363 on the sensitized strip.

Depression of control bar 315 a third time will secure another operation to feed the first card to position 365, the second card to position 363 and a new card to position 360, all in photographing position. Another portion of film is fed into the focal plane above mask 32 and when this is completed the punching and photographing means will be operated to complete the cycle when the situation disclosed in Fig. 3 will exist.

The first card photographed designated A, Fig. 3, will have the first image thereof located at position 362, the second image in the central portion of the sensitized strip is located under masking plate 32 at the position 364. The third image of card A in position 365 will be produced on the sensitized strip at position 366. The second card indicated by the Letter B will have the photographic copies thereof in corresponding positions on the sensitized strip following those of card A. Card C will then be photographed in successive operations to produce three copies following the copies of card B.

In the third cycle of operation it will be noted that cards A, B and C are photographed simultaneously and in subsequent operations three cards will be photographed in a similar manner as long as new cards are fed. The card A and following cards will be discharged from position 365, Fig. 3, over the rear downwardly inclined surface of copy plate 242 into card receptacle 367 mounted on the rear end of the copy table, Fig. 1.

In the many operations for producing pictures of documents, it will be understood that the mechanism on the copy table as hereinabove described will be operated to lower cover plate 298 and cover plate frame 297 into a position where cover plate 298 will engage the upper face of documents on the feed table in the photographing position and hold them firmly in a flat position on the table so that they will be clearly photographed on the sensitized strip. During each feeding operation of the cards over the copy table in the photographing position the mechanism operates to lift cover plate frame 297 with the cover plate in the manner as shown in Figs. 34 and 35 so that it will not interfere with the feeding of the documents and in order to avoid scratching of the under face of the cover plate. However, in photographing some types of documents, cover plate frame 297 will be removed and a guide frame placed on copy plate 242 with portions engaged in grooves 368 for holding it in position.

It will be understood that in the operation of control bar 315 to energize the solenoid 219, the drive means will operate to produce one complete cycle of operation, by having pawl disc 209 operated through one complete revolution for each depression of the control bar. This will produce one complete revolution of main drive shaft 74 for the sensitized strip feed mechanism with slide block 86 on crank arm 87 adjusted to obtain the length of feed desired for the particular photographing operation such as the one disclosed in Fig. 3 and described above.

The copy table mechanism will be operated so that copy table drive shaft 249 will also be rotated through one revolution. This will first operate cam 307 to hold cover plate frame 297 in an elevated position while segmental gear 268 is moved from the position shown in Fig. 34 in a counter-clockwise direction in the clockwise rotation of crank arm 263, one-half revolution as shown in Fig. 34. Pawl carrying plate 284 will be rotated in a clockwise direction for rotating feed shaft 255 for feeding documents over copy plate 242. Segmental gear 268 will be moved an amount equal to twice the radial distance of slide block 264 from shaft 249. In the completion of the revolution of the copy table drive shaft, gear segment 268 will be moved in a clockwise direction back to the position shown in Fig. 34. This movement will cause pawl carrying plate 284 to move in a counter-clockwise direction as shown in Fig. 34, pawl 286 will idle over ratchet wheel 287, documents will not be fed, and cover plate frame 297 will be in a lowered position to hold the documents while they are being photographed.

In setting up the copy table for document feed purposes, for example to feed cards of the size as herein described above in connection with Fig. 3, guide frames are used with frame 297 removed for guiding the documents at the edges so that they will be positioned transversely of the copy plate and guided in a straight path during the feeding movement through the photographing position. For this purpose copy plate 242 may be provided with a series of longitudinally extending shallow grooves 368 intermediate of and on opposite sides of slots 250 as clearly shown in Fig. 25. Guide strips, not shown, are formed on the bottom of the guide frames and fit into selected grooves for holding the frame in position on copy plate 242 for guiding the cards. It will be understood that a series of guide frames may be used instead of frame 297, each for a different size of document. Masking plates may also be used on the copy table in making photographic copies of documents. The several grooves are formed in copy plate 242 to align and position the masking plates and guide frames in desired positions.

A pair of angle guide members 369 have upwardly extending guide flanges formed thereon with the forward edges curved outwardly as indicated at 370, Fig. 25. The horizontal portions of angle guide members 369 are transversely slotted to receive suitable set screws for retaining them in adjusted position on copy plate 242 in advance of cover plate frame 297. Angle guide members 369 are employed to also guide documents of the desired width into the photographing position in a transverse position on copy plate 242 that will bring the document in the desired portion of the photographing position, such as illustrated in connection with the disclosure in Fig. 3, where the documents are fed through the photographing position at the left-hand side of the optical center of the photographing means compared with the position of copy table 242 in order to bring the major portion of the image photographed on the sensitized strip above the optical center in the focal plane on supporting member 8.

In the operation of the sensitized strip feed mechanism as above described sprocket 73 and crank arm 87 are rotated in a counter-clockwise direction as shown by the arrow in Fig. 4. During the first half of the revolution from the position shown in Fig. 4 the sensitized strip will be fed an amount equal to the adjustment provided on the crank arm for the throw of slide block 86. On the second half of the revolution back to the position shown in Fig. 1 the strip feed mechanism will idle and the strip will remain stationary. The punch and photographic means will be operated on the second half revolution through eccentric drive links 90 to move punch operating arm 91 in a counter-clockwise direction as shown in Fig. 5 from a position approximately the same as that shown in Fig. 5 to punch the sensitized strip and open the shutter by the operation of finger 92 downwardly. As the parts return to the position illustrated in Figs. 4 and 5 the operation of first feeding the sensitized strip while the documents are being fed on the copy table is obtained through one-half of the operation cycle of the drive means and through the second half of the operation thereof the document being fed and the sensitized strip remain stationary while the punch and shutter are operated to produce a photograph of documents in the photographing position on the sensitized strip in the portion of the focal plane that is not covered by masking plate 32. The masking plate 32 of course is used to control the size of the area of the focal plane used for photographing purposes to photograph document sizes smaller than the photographing plane. Where documents of a size that fill the field of the objective are photographed, then the masking plate is removed so that the entire focal plane in front of the ground glass plate is used in the photographing operation.

It will be understood that 3 x 5 and 4 x 6 inch cards may be photographed with the copy table in the side feed position in a manner similar to that disclosed in Fig. 3 so that two photographic copies of documents may be produced in a similar manner to the production of three copies as described and shown in Fig. 3. This side feed position of the copy table therefore facilitates the production of a large number of copies of documents where two or three copies of each document are desired and at the same time rapid photographing of documents can be obtained because of the continuous feeding operation of documents on the copy table and through the photographing plane with a new document being fed for each cycle of operation of feeding and photographing through depressing bar 315.

Where larger documents than those just mentioned are to be photographed and in cases where only single photographic copies are desired, it is preferable to feed the copies over the copy plate with the copy table arranged in the front feed position. In photographing documents with the copy table in the front feed position it will be understood that a sensitized strip having the same width as the document being photographed will be used and mounted in the strip feed mechanism. By width of the document is meant the dimension of the document that is arranged to extend transversely from side to side of the copy table. When the machine is set up for photographing documents in the front feed position at unity, using a strip having the same width as the transverse dimension of the card across the copy table, then the position of the document on the copy table is arranged so that the rear edge of the document on the copy table will have its image at the top edge of the focal plane on rigid supporting member 8 adjacent the position where the sensitized strip is punched.

Feed fingers 252 will be selectively set in position to feed the size of documents desired and the remaining feed fingers moved into retracted position. The various cranks have the links adjusted for the desired amount of feed of the sensitized strip and the document with the spool engaging members adjusted to center the spools between the side frame members and the guides for the strip adjusted in proper position. Then, for each depression of main control bar 315 a document is fed into photographing position on the copy table, the sensitized strip is fed to bring an unexposed portion into photographing position and the punch and photographing means is operated to photograph the document in completing one cycle of operation. Documents are fed subsequently from the forward end of the feed table between the side guides into position to be picked up by feed fingers 252 and fed into and through the photographing position with operation of control bar 315 to obtain subsequent cycles of operation of the machine for successively photographing successive documents. If the documents can be fed at the front of the copy table fast enough by an operator using both hands and operating the micro-switch with the knee pad instead of control bar 315, holding the switch engaged continuously will secure continuous operation of the machine for feeding and photographing documents. A good operator can continuously feed documents of the various sizes mentioned into the machine during continuous operation thereof for various periods of time.

When duplicate photographic copies of documents are desired for any of the different sizes with the copy table in front feed position, it is necessary for the operator to manually operate manually operable lever 303 to disengage shoulder 308 from pin 302 thereby disengaging the clutch and stopping the copy feed mechanism while the drive unit may continue to operate the sensitized strip, punch and photographing means for producing as many copies of the document as may be desired through the operation of control bar 315 in the usual manner. When the desired number of copies have been made holding lever 310 is operated to release manually operable lever 303 and allow it to return into its normal operating position where shoulder 308 engages pin 302 and the clutch mechanism is engaged for operating sprocket shaft 255 and feed fingers 252 to feed documents over copy plate 242.

In setting up the machine for any of these photographing operations it will be appreciated that the copy table may have its position adjusted longitudinally and laterally on the base by the operation of the various adjustments of the copy table mounting structure hereinbefore described. The copy table can also be raised or lowered relative to the lens unit and the prism so that copies at unity may be brought into proper focus on ground glass plate 30 by viewing the image of the copy and adjusting the focus through opening a door in the rear wall of housing 2, not shown in the drawing. This adjustment of the copy table will also be made for bringing the document image into proper registry for photographing at the desired position on the sensitized strip. The chip box is also removed for this purpose and is replaced after the desired focus of the copy on the ground glass plate is obtained.

Within the range of adjustment of the lens unit on supporting rods 110 and the vertical adjustment of post 182, both photographic enlargements and photographic reductions of documents having sizes different from the sizes referred to above may be made.

The provision of a copy table with a document feed for feeding documents in one direction from the front to the rear end of the copy table and its mounting for positioning in either front or side feed position, provides a document photographing machine that will photograph a large variety of document sizes normally used in business for rapidly producing one or more copies thereof in an efficient manner and at low cost. The ability to shift the copy table from the front to the side feed position materially increases the ability of the machine disclosed herein to handle and produce a greater variety of photographic copies of documents than has heretofore been possible with machines that are not capable of being operated in the manner of the present invention. The structural cooperation between the copy table, the copy table mounting and the drive means facilitates the shifting of the copy table from the front feed position to the side feed position without disassembling and reconstructing the machine in making the shift and without disconnecting the various assemblies of the machine from one another. The change in setting up of the machine from the front feed position to the side feed position or for changing the position of the parts from taking pictures of one size of documents to that of another size of documents is facilitated by the cooperative features of construction of the copy table, the copy table mounting, the drive means and the mounting of the photographing means on the gate carried by housing 2. The provision of the gate structure for opening up the front of the housing to provide access to the various parts of the strip feeding mechanism also cooperates in facilitating the employment of the machine herein disclosed for photographing the many different sizes of documents herein referred to.

It will be further understood that in addition to the document sizes above mentioned many different intermediate sizes of documents may be photographed by setting the machine up for strip feed and document feed corresponding to the results desired, the examples given being mentioned for the purpose of illustration of some of the varieties of commercial document sizes in common use that are readily photographed by the operation of this machine to produce one or more duplicate copies of the documents, as desired. Considerable economy is effected in the use of sensitized paper due to the photographing of the documents close together thereon so there is little waste of sensitized paper between the photographic images of documents.

The invention claimed is:

1. A document photographing machine comprising means having a focal plane and formed for holding and guiding a sensitized strip in centered relation in said focal plane, an optical system for producing a positive reading image on said strip in said focal plane having a lens unit mounted for movement toward and from said focal plane operable to photograph documents of varying size on said sensitized strip to produce images varying in size according to said documents, copy holding and feeding means mounted for adjustment toward and from said lens unit for supporting documents in a photographing plane normal to said optical system, said copy holding and feeding means having parts operable to engage and move documents in one direction thereon through said photographing plane, said copy holding and feeding means being movable into either of two angular positions for operation of said parts in one position to feed documents in said photographing plane to produce successive images arranged in longitudinal relation on said strip and in the other position to produce duplicate images arranged in successive relation transversely of said strip utilizing substantially the entire width of said sensitized strip, a single drive means for operating said parts and feeding both the documents and sensitized strip in one direction in timed proportionate relation through said planes, and manually operable control means for obtaining a cycle of operation of said machine in each operation thereof, to feed and photograph a document.

2. A document photographing machine, comprising means having a focal plane and formed for holding and guiding a sensitized strip in centered relation through said focal plane, means for feeding said strip through said first-mentioned means, an optical system for producing a positive reading image on said strip in said focal plane having a lens unit mounted for movement toward and from said focal plane operable to photograph documents of varying size on said sensitized strip to produce images of predetermined size, a copy table for holding documents thereon in a photographing position in said optical system, supporting means for adjustably supporting said copy table in the photographing position in either of two positions substantially at right angles, document feeding means on said copy table for intermittently feeding documents in one direction across said copy table into a plurality of different successive positions within the transverse limits of said photographing position for producing duplicate images on said sensitized strip in adjacent relation utilizing substantially the full width of said film in one position of said copy table and for producing images in adjacent longitudinal relation on said strip in the other position of said copy table, adjustable drive means connected to said document feeding means and said means for feeding said strip for proportionately feeding both the strip and documents relative to each other in both positions of said copy table and manually controlled means operable to release said drive means for producing a cycle of operation for operating said document feeding means to feed a document into one of said successive photographing positions, feed said sensitized strip and operate said machine to produce a photographic copy of said document on said strip for each operation thereof in either position of said copy table.

3. A document photographing machine, comprising a film strip supporting and guiding means having a focal plane, means for feeding a sensitized strip in one direction through said guiding means and focal plane, a copy table for supporting documents in a photographing position mounted for movement into either of two positions in substantially right angular relation, document feed means mounted on said copy table having a plurality of adjustable parts mounted to feed a document across said copy table in side feed position into a plurality of successive positions in said photographing position forming equal parts of the transverse width of said photographing position to utilize substantially the entire width of the sensitized strip for producing a plurality of duplicate copies of a document across said sensitized strip in successive operations of said document feed means, an optical system for producing a positive reading image of a document in said photographing position on said sensitized strip in said focal plane, drive means connected to both the sensitized strip feeding means and document feed means for operating both simultaneously in timed relation in each position of said copy table, and manually controlled means for producing one cycle of operation of said drive means for each manual operation thereof to feed and make a photographic reproduction of at least one document in one position on said sensitized strip in either position of said copy table.

4. A document photographing machine, comprising a film strip supporting and guiding means having a focal plane, means for feeding a sensitized strip in one direction through said guiding means and focal plane in centered relation, a copy table for supporting documents in a photographing position, document feed means on said copy table operable to feed documents in one direction over said copy table intermittently into a plurality of successive positions at uniform spaced distances, at least some of which are uniform fractional parts of at least one dimension of said photographing position for obtaining complete duplicate copies of each document in a plurality of adjacent positions utilizing substantially the entire width of said sensitized strip in a side feed position of said copy table, means mounting said copy table for rotation into two positions in said photographing position, one a side feed position for feeding documents transversely through the photographing position to the direction of sensitized strip feed, and the other a front feed position for feeding documents in the same plane as sensitized strip feed, means carrying said copy table mounting means for adjustment in three directions relative to said lens unit, one adjustment moving said copy table toward and from said lens unit to move it into focus and the other two adjustments moving said copy table in the photographing position toward one side and an adjacent side to align a plurality of document feed positions with the focal plane of said sensitized strip in both positions of the copy table, drive means connected to said sensitized strip feeding means and said document feed means through said mounting means for simultaneously feeding said strip and documents in proportionate relation, and manually controlled means for producing in each operation thereof an operation of said drive means for feeding a document in said photographing position on said copy table and feed said sensitized strip to produce a photographic copy of a document on said strip in either position of said copy table and document feed means.

5. A document photographing machine, comprising a film strip supporting and guiding means having a focal plane, means for feeding a sensitized strip in one direction through said guiding means and focal plane in centered relation, a copy table for supportnig documents in a photographing position, an optical system for producing a positive reading image on said strip in said focal plane having a lens unit mounted for movement toward and from said focal plane operable to photograph documents of varying size in said photographing position on said sensitized strip to produce images of predetermined size, punching means adjacent said focal plane for punching position fixing apertures in said strip, document feed means on said copy table for intermittently feeding documents into a plurality of successive positions at uniform spaced distances forming equal parts of the distance between opposite sides of said photographing position for producing duplicate copies of a document in successive positions utilizing substantially the entire surface of said sensitized strip, means mounting said copy table for adjustment into two positions, one a side feed position where the document feed means feeds documents transversely to the direction of sensitized strip feed and the other where the documents are fed in the same direction as the sensitized strip, means for adjusting said copy table toward and from said lens unit to position documents fed in said photographing position, drive means connecting said first-mentioned means, document feed means and punching means for simultaneously feeding said strip and a document on said copy table and punching said strip simultaneously with photographing a document on said copy table, and manually actuated control means for said drive means for securing a cycle of operation thereof, whereby said strip is punched adjacent each photographic image thereon simultaneously with the photographing of a document in either position of said copy table for enabling the image of each document to be severed from the strip by using the adjacent position fixing apertures in their fixed relation thereto as a severing guide.

6. A document photographing machine, comprising a base, a housing mounted on and projecting upwardly from one end of said base, a film strip supporting and guiding means having a focal plane in the upper end of said housing, an optical system having a lens unit mounted on the upper end of said housing in projecting relation therefrom over the opposite end of said base for movement toward and from said housing, an upright supporting member mounted on the free end of said base for transverse, longitudinal and vertical movement, a copy table mounted on said upright supporting member and arranged for rotation of said copy table relative to said base into longitudinal and transversely extending positions, document feed means mounted on said copy table operable to feed documents across said table in one direction, said copy table being positioned below said lens unit so a document thereon can be photographed by said optical system on a sensitized strip fed into said focal plane, driving means mounted on said base, motion transmitting means driven by said drive means connected to said document feed means through said upright supporting member and feeding a sensitized strip in said housing through said focal plane, and manual control means on said copy table for initiating a cycle of operation of said drive means to feed a document on said table, photograph said document on said sensitized strip and feed said strip whereby at least one document may be photographed in each cycle of operation of said feed and manual control means and the position of said supporting means is adjusted to register said document feed with the focal plane in both positions of said copy table.

7. A document photographing machine comprising a base, an upwardly projecting housing on one end thereof, photographing means carried by said housing having a lens unit supported over the other end of said base, a focal plane in said housing and means for feeding a sensitized strip through said focal plane, an upright post mounted on the other end of said base for adjustment horizontally thereon in two directions, means for varying the effective length that said post projects above said base, a copy table rotatably mounted on the upper end of said post, document feeding means mounted on said copy table for feeding documents thereon in one direction, and means for synchronously operating said photographing means and document feed means to feed a document across said feed table and photograph it on a sensitized strip in said housing having portions thereof extending through said post for connection with said document feed means the adjustment of said upright post cooperating to register said document feed with said lens unit and focus a document in a desired registered position in said focal plane.

8. A document photographing machine comprising a base, an upwardly projecting housing on one end thereof, photographing means carried by said housing having a focal plane, means for feeding a sensitized strip therein and a lens unit supported over the other end of said base, an upright post mounted on said other end of said base for adjustment horizontally thereon in two directions, means for varying the effective length that said post projects above said base, a copy table rotatably mounted on the upper end of said post, document feeding means mounted on said copy table for feeding documents, thereon in one direction intermittently into a plurality of successive positions at uniform spaced distances forming equal parts of the distance between opposite sides of a photographing position of said lens unit for producing duplicate copies of a document in successive positions utilizing substantially the entire surface of said sensitized strip in a side feed position of said copy table on said post, the adjustment of said post moving a document into focused and registered position in said photographing position with said focal plane and sensitized strip, and means for operating said document feeding means and photographing means to photograph a document on said copy table on a sensitized strip in the focal plane in said housing.

9. A document photographing machine comprising a base, an upwardly projecting housing on one end thereof, means for feeding a sensitized strip in centered relation in a focal plane in said housing, photographing means carried by said housing having a lens unit supported over the other end of said base for focusing an image in said focal plane, an upright post mounted on said other end of said base having one end projecting upwardly above said base, a copy table rotatably mounted on said post for movement into transversely and longitudinally extending positions relative to the base, document feed means carried by said copy table for feeding documents in one direction across said copy table under said lens unit for being photographed on the sensitized strip in said housing by said photographing means, power drive means mounted on said base and having direct driving connections through said posts with said document feed means and direct driving connection through said housing with said first-mentioned means, photographing means for feeding a document in timed relation with said first-mentioned means and photographing means to photograph a document fed into photographing position on said copy table on said sensitized strip, and manually operated control means on said copy table for initiating and controlling said power drive means to produce one cycle of operation to photograph a document in each operation thereof.

10. A document photographing machine comprising a base, an upwardly projecting housing on one end thereof, sensitized strip supporting and feeding means having a focal plane mounted in fixed position in the upper end of said housing, photographing means mounted in a fixed position on said housing having a lens unit supported over the other end of said base, an upright post mounted on said other end of said base with one end projecting above said base, a copy table mounted on the upper end of said post for supporting a document in a photographing position in cooperation with said photographing means for photographing a document on said sensitized strip in said focal plane, means for varying the effective length of said post projecting above said base for positioning a document on said copy table in focus with said focal plane, means for adjusting said copy table in two directions in said photographing position for aligning documents with said focal plane, document feed means carried by said copy table for feeding a document over the surface thereof through said photographing position, a shaft rotatable in said post having a driving connection at the upper end with said document feed means, power operated means having a driving connection in said base with the lower end of said shaft and another driving connection in said housing for operating said strip supporting and feeding means, and manually actuated control means for said power operated means to produce a cycle of operation thereof in each manual operation for photographing a document in the photographing position on said sensitized strip in said focal plane.

11. A document photographing machine comprising a base, an upwardly projecting housing on one end thereof, sensitized strip mounting means in the upper end of said housing having a fixed focal plane through which the sensitized strip is fed, photographing means carried by said housing having a lens unit supported over the other end of said base, an upright post, a copy table mounted on the upper end of said post under and normal to the axis of said lens unit for movement between side and front feed positions to support a document in photographing position in each position thereof for photographing on said strip in said focal plane, carrier means for said post mounted on the other end of said base and operable to vary the position of said post relative to said base for focusing a document with said photographing means, supporting said copy table in position to hold a document accurately in the photographing position, document feed means carried by said copy table for feeding a document in one direction thereon, the rotation of said copy table providing for the feeding of documents in two different directions relative to the direction of feed of said sensitized strip for obtaining complete copies of the documents on said strip through said feed means cooperating to position documents in registered relation in said focal plane with predetermined portions of said strip, operating means connected with said photographing means for operating said means to photograph a document on said sensitized strip at the upper end of said housing in said focal plane, a driving connection mounted in said base and having parts rotatable in said upright post connected to and operating said document feed means to feed documents across said copy table in timed relation with the operation of said photographing means, power drive means on said base connected to drive said operating means and driving connection, and manually actuated control means for securing an operation of said power drive means to feed said sensitized strip, a document on said copy table and photograph a document on said sensitized strip in said housing for each operation thereof.

12. A document photographing machine comprising a base, an upwardly projecting housing on one end thereof, photographing means carried by said housing having a lens unit supported over the other end of said base, an upright post, a copy table mounted on the upper end of said upright post below said lens unit for supporting a document in position to be photographed, and carrier means for mounting said post on said base having a pair of members slidable one on the other and one of said members being slidably mounted on the base for movement in a direction at right angles to slidable movement of the other member thereon, and also having means on the slidable member not engaged with the base for engaging and supporting said post for relative vertical movement to vary the effective length of said post projecting above said base, and intermittently operable document feed means on said copy table for feeding documents uniform distances across said copy table in each operation thereof into and out of the photographing position, whereby said carrier means is operable to position said copy table to register the position of a document fed by said feed means in accurate registery in focus in the photographing field of said photographing means.

13. A document photographing machine of the character set forth in claim 12, wherein the upright post is externally threaded and slidably engaged in the other of said slide members, and the rotatable member carried in said last mentioned slide member has threaded engagement with said post for varying the position of said post in said slide member in the rotation thereof so that the effective length of such post relative to said base may be varied and the position of said post adjusted on said base in two directions to position said document feed means and said copy table to accurately register adjacent sides of a document in a fed position on said copy table in a fixed relation to corresponding adjacent sides of the photographing position and also position said document in focus with said photographing means.

14. A document photographing machine comprising a base, an upwardly propecting housing on one and thereof, a sensitized strip supporting and guiding means having a focal plane mounted in the upper end of said housing, photographing means fixed on the upper end of said housing having a lens unit supported over the other end of said base, an upright post, a copy table mounted on the upper end of said post under said lens unit for supporting documents in a plane normal to said photographing means and lens unit, document feeding means carried by said copy table for feeding documents in one direction across the surface of said table through a photographing position in focus with said focal plane a shaft rotatable in said post connected with said document feed means for operating said document feed means in the rotation thereof, means on said base mounting said post for adjustment to register the document feeding means and adjacent sides of a fed document in said photographing position for accurately producing a photograph of a document in a predetermined position on the sensitized strip in said focal plane, said shaft having the lower end projecting below said post into said base, means for feeding the sensitized strip in said guiding means, operating said photographing means and having a driving connection with the lower end of said shaft for operating said document feed means, and manually operable means for producing a cycle of operation of the last-mentioned means to feed a document across said feed table and photograph it on said sensitized strip in said focal plane.

15. A document photographing machine comprising means formed for holding and guiding any one of a series of sensitized strips of varying widths in centered relation longitudinally through a focal plane thereon, a copy table having a photographing position, document feed means operable to move documents on said copy table into successive uniformly spaced positions between the margins of said photographing position for producing duplicate copies of documents on said sensitized strip in said focal plane, an optical system operable for photographing documents in photographing position on said copy table on said sensitized strip in said focal plane to produce a positive reading copy, marking means for providing said sensitized strip with document position fixing marks mounted adjacent said focal plane in the path of said strip, supporting means rigidly mounting said first-mentioned means, optical system and marking means, and mounting said copy table for adjustment to focus a document in photographing position in said focal plane, and adjust said copy table in a plane normal to the axis of said lens system to accurately position the document feed means and a document fed thereby to produce in image in a predetermined position in said focal plane adjacent said marking means, means for feeding said sensitized strip having a manually operable member movable to vary the length of said strip fed in each cycle of movement thereof also formed to operate said marking means and optical means simultaneously between each strip feeding operation, operating means having a driving connection with said last mentioned strip feeding means and means connecting said document feed means and said operating means having a manually operable member for varying the length of feed of said document feed means whereby documents of varying size may be photographed successively on a sensitized strip and each has position fixing marks adjacent a corresponding edge of the image on said sensitized strip at a fixed distance from said corresponding edge to enable accurate severance of each document copy from said strip.

16. A document photographing machine, comprising means formed for holding and guiding any one of a series of sensitized strips of varying widths in centered relation longitudinally through a focal plane thereon, a copy table having a photographing position, document feed means operable to move documents on said copy table into a plurality of successive equally spaced positions at least one of which is within the edges of said photographing position, an optical system operable for photographing a document in photographing position on said copy table on said sensitized strip in said focal plane to produce a positive reading copy, marking means for providing said sensitized strip with document position fixing marks mounted adjacent said focal plane in the path of said strip, means for adjusting said copy table to position said feed means to accurately register the image of the document in the photographing position with said focal plane and marking means for securing a predetermined relation of adjacent sides of the document copy on a sensitized strip of selected width operating means manually releasable for a fixed cycle of operation, strip feed means connected for actuation by said operating means for moving said sensitized strip and operating said optical system and marking means in timed relation in photographing and marking a document having a manually operable member for varying the length of feed of said sensitized strip, and means for driving said document feed means actuated by said operating means having a manually operable member for varying the length of feed of a document on said copy table whereby documents of varying size may be photographed on sensitized strip of different size and will have the marks made by said marking means in fixed relation with respect to one edge of the document image on said strip.

17. A document photographiing machine comprising strip feeding means for feeding a sensitized strip through a focal plane, photographing means operable to photograph documents on said strip, a copyholder having a photographing position mounted in cooperative relation with said photographing means and strip feeding means in photographing documents, document feeding means on said copy holder for feeding documents into and out of said photographing position, a cover plate movably mounted on said copyholder for movement into and out of a position for holding documents in contact with said copyholder in said photographing position and against movement during photographing, cover plate moving means operated in timed relation by said document feeding means to move said cover plate out of said position during document feed, manually operable means for moving and retaining said moving means in inoperative position to render said document feed means inoperative and allow said cover plate to remain in said document holding position, and manually controlled means operable for each manual operation thereof to photograph a document in said photographing position on said strip operable independently of said plate moving means.

18. A document photographing machine comprising strip feeding means for feeding a sensitized strip through a focal plane, photographing means operable to photograph documents on said strip, a copyholder having a photographing position mounted for movement into either of two angular positions in cooperative relation with and normal to said photographing means and strip feeding means, document feed means on said copyholder for feeding documents in one direction thereon into and out of said photographing position and adapted in the different positions of the copyholder to feed documents in two directions relative to said photographing means through said photographing position, a cover plate for normally holding documents against movement on said copyholder in photographing position, plate moving means connected with said document feed means for moving said cover plate out of document holding position during document feed, control means for moving said plate moving means into inoperative position and rendering said document feed means inoperative in said inoperative position, operating means for normally operating said document feed means, strip feeding means and photographing means in timed relation for photographing documents, and manually operable means controlling said operating means to secure a complete cycle of operation of said machine for photographing a document in said photographing position on said sensitized strip independently of the control of said document feed means and cover plate by said control means.

19. A document photographing machine comprising a housing having a front wall formed with a large aperture in the upper portion, a supporting frame mounted in said housing in alignment with said aperture having a flat plate portion and forwardly offset marginal flange secured to the marginal portions of said front wall about said aperture, sensitized strip guiding means on the front of the plate portion of said frame for guiding a sensitized strip as it passes said aperture, a gate mounted on the front of said housing for movement between open and closed positions over said aperture in opposed spaced relation to said plate portion, said gate being formed for lighttight cooperation with the margin of said front wall and supporting frame about said aperture in the closed position, said gate in open position providing free access through said aperture to said supporting frame and guiding means, and photographing means mounted on said gate operable to photograph documents through an opening in said gate on to a sensitized strip in said guiding means on the front of said plate portion of said supporting frame.

20. A document photographing machine, comprising a housing having a front wall formed with a large aperture in the upper portion, a supporting frame having a flat plate portion and a peripheral flange offset to one side thereof mounted in said housing with said flange secured to the inner margin of said wall about said aperture, sensitized strip guiding means on the flat plate portion of said frame for guiding a sensitized strip in line with said aperture and holding said strip in a focal plane provided on the flat plate portion of said frame, a gate mounted on the front of said housing for movement between open and closed positions over said aperture, said gate being formed for light-tight cooperation with the margin of said front wall about said aperture in the closed position and providing free access to said frame through said aperture in open position, said gate having an opening formed therein in alignment with said focal plane, a lens unit mounted on said gate for movement toward and from said gate for focusing documents in said focal plane, said lens unit having a shutter movably mounted thereon for controlling the photographing operation, shutter moving means carried by said gate and lens unit and connected for operating said shutter, and means mounted on said supporting frame having parts aligned with parts of said shutter moving means in the closed position of said gate actuating said shutter in the operation thereof for making photographs on a sensitized strip in said focal plane.

21. A document photographing machine, comprising a housing having a front wall formed with a large aperture in the upper portion, a supporting frame mounted on the front wall in said housing in alignment with said aperture, sensitized strip guiding means on the front of said frame for guiding a sensitized strip in line with said aperture and holding said strip in a focal plane on the front of said frame, a gate hingedly mounted on said front wall for movement between open and closed positions, said gate closing said aperture in the front wall and having light-tight cooperation therewith about the margin of said aperture in the closed position, a lens unit in front of said gate, means on the gate slidably mounting said lens unit for movement toward and from said gate for focusing images through an opening in said gate on said strip in said focal plane, said lens unit having a shutter for controlling the photographing operation of said lens unit, shutter moving means having cooperating parts mounted on said lens unit and said gate relatively movable in the adjustment of said lens unit relative to said gate, and means for intermittently feeding said strip having a member mounted on said frame and projecting through the openings in said front wall and gate into aligned relation with parts of said shutter moving means in the closed position of said gate for engaging and operating the part of said shutter moving means mounted on said gate for operating said shutter in each photographing operation of said machine during a dwell in the feeding of said strip.

22. A document photographing machine comprising a housing having an aperture in the front wall, a supporting frame mounted in said housing having a peripheral offset flange secured to the margin of said housing about said aperture, strip guiding means on said frame for holding and guiding a sensitized strip through a focal plane on the front central portion of said frame opposite said aperture, a strip feed roll rotatably mounted in the lower portion of said frame having a peripheral portion projecting forwardly therefrom, a gate mounted for movement into open and closed positions on said housing relative to said aperture in registry with said frame and strip feed roll, a cooperative strip feed roll rotatably mounted in said gate, projecting through said aperture in the closed position of said gate and having strip feeding cooperation with said strip feed roll, means on said gate for photographing a document on said strip in said focal plane, and means for operating said strip feed roll to feed sensitized strip material over said supporting frame while engaged in said guide means.

23. A document photographing machine, comprising a housing having an aperture in the front wall, a supporting frame mounted in said housing and having a focal plane at the front thereof in alignment with said aperture, strip guiding means on said frame for holding and guiding a sensitized strip through said focal plane, a strip feed roll rotatably mounted on said frame and having a gear thereon, a gate mounted for movement between open and closed positions over said aperture relative to said frame, a cooperative strip feed roll mounted on said gate, projecting inwardly therefrom through said aperture and having a gear thereon for engagement with said strip feed roll on said frame in the closed position of said gate, the gears of said rolls intermeshing for driving cooperation in feeding a strip therebetween with said rolls having strip feeding cooperation and being disengaged in the opening of said gate, and means for operating said strip feed roll to feed a sensitized strip in said guide means and through said focal plane.

24. A document photographing machine comprising a housing having an aperture in the front wall, a supporting frame mounted in said housing and having a focal plane on the front face thereof in alignment with said aperture, strip guiding means on said frame for guiding a sensitized strip through said focal plane, a main feed roll rotatably mounted in said frame, a gate mounted for movement between open and closed positions over the aperture in said housing and the front of said frame, a supplemental feed roll rotatably mounted on the inside of said gate and projecting into said housing for strip feeding cooperation with said main feed roll in the closed position of said gate, photographing means mounted on the outside of said gate for photographing documents on a strip in said focal position, and means on said supporting member for operating said photographing means through said aperture and operating said strip feed rolls in timed relation for photographing documents on a strip in said focal plane fed by said rolls and guided by said guide means.

25. A document photographing machine comprising a supporting frame having a focal plane on the front face thereof, strip guiding means on said frame for guiding a sensitized strip through said focal plane, punch means on said frame adjacent said focal plane for perforating said strip, a main feed roll rotatably mounted on said frame adjacent said focal plane, a gate mounted for movement between open and closed positions over the front of said frame, a supplemental feed roll rotatably mounted on said gate for strip feeding cooperation with said main feed roll in the closed position of said gate, photographing means mounted on said gate and operable for photographing documents on said sensitized strip in said focal position, means for actuating said photographing means mounted on said gate, and operating means on said frame engaged with and operating said punch and having parts aligned with, engaging and operating said last-mentioned means in timed relation when the gate is in closed position for simultaneously punching said strip with photographing thereon in said focal plane, said operating means having a connection with said main feed roll for operating said feed rolls intermittently to feed said strip between punching and photographing operations.

26. A document photographing machine comprising a housing having an aperture in the front wall, a supporting frame having a focal plane on the front face thereof and a marginal flange offset forwardly of said space secured to said housing about said aperture, strip guiding means on said frame for guiding a sensitized strip through said focal plane, a main feed roll rotatably mounted on said frame adjacent said focal plane, a gate mounted on said housing for movement toward and from said housing and frame into closed and open positions over said aperture relative to the housing, a supplemental feed roll rotatably mounted on the inner side of said gate and projecting through said aperture into said housing for strip feeding cooperation with said main feed roll in the closed position of said gate, photographing means mounted on the outer side of said gate and operable for photographing documents on a strip in said focal position, means on said gate connected for actuating said photographing means to take a picture, and means on said frame having parts interengageable with said supplemental feed roll and said gate-carried actuating means in the closed position of said gate for operating said photographing means and feed rolls intermittently for photographing on a strip in said focal plane during a dwell in the feed thereof.

27. A document photographing machine comprising a housing having an aperture in the front wall, a supporting frame having a peripheral offset flange secured to said housing about the margin of said aperture and a focal plane on the front face thereof, strip guiding means on said frame for guiding a sensitized strip through said focal plane, a main feed roll rotatably mounted on said frame adjacent said focal plane, a gate hingedly mounted on said housing for swinging movement into closed and open positions over said aperture in said housing, a manually operable latch for normally retaining said gate in closed position manually releasable to provide for manual swinging of said gate to open position to provide access to the front of said frame through said aperture, said main feed roll and said strip guiding means, a supplemental feed roll rotatably mounted on the inner face of said gate for projecting through said aperture into strip feeding cooperation with said main feed roll in the closed position of said gate and accessible in the open position, photographing means mounted on the outer side of said gate operable for photographing on the portion of a strip in said focal plane in the closed position of said gate through the aperture in said housing, and operating means on said frame having parts interengaging and cooperating with parts carried by said supplemental feed roll and photographing means in the closed position of said gate for operating said photographing means and feed rolls to feed said strip in timed intermittent relation.

28. A feed device for a document photographing machine comprising a supporting frame having a flat portion on the front face thereof, strip guiding means on said frame for guiding a sensitized strip over said flat portion, upper side frames mounted on the upper portion of said supporting frame and projecting rearwardly in spaced parallel relation, lower side frames on said supporting frame projecting rearwardly in spaced parallel relation below said upper side frames, a plurality of rollers journalled in said upper side frames in transversely extending spaced parallel relation therebetween and forming a supply spool cradle for receiving a spool with the spool end peripheries engaged with said rollers, spool positioning members mounted in said upper side frames for holding a spool in centered relation in said cradle and providing frictional engagement with the ends of a spool to normally resist spool rotation, said supply spool carrying a sensitized strip for feeding over the front of said supporting frame in said strip guiding means over said flat portion, and means mounted in said lower side frames for feeding said strip and winding it upon a take-up spool carried thereby.

29. A feed device for a document photographing machine comprising a supporting frame, strip guiding means on said frame for guiding a sensitized strip over the front central portion, a pair of upper side frames mounted in rearwardly extending spaced parallel relation on said supporting frame, a plurality of transversely extending spaced parallel rollers rotatably mounted between the lower portions of said upper side frames for cooperation therewith to form a supply spool cradle, a spool retaining roller extending transversely at the upper edges of said upper side frames, means mounting said spool retaining roller for movement between operative and inoperative positions to open said cradle in the inoperative position for the insertion and removal of a spool and to retain a spool with the spool end peripheries engaged between said rollers in the operative position for free rotation so a sensitized strip may be unwound from said supply spool, and spool positioning means having a rod mounted in one side frame for axial adjustment toward and from the other side frame in said cradle, a spool engaging member on the end of said rod in said cradle, a cooperating rod having a spool engaging member on the end in said cradle slidably mounted in the other side frame, means for resiliently projecting said cooperating rod toward the opposite side frame and rod therein for having the spool engaging members on said rods engage and frictionally retain a spool therebetween in said cradle, and means for feeding a sensitized strip from a spool in said cradle through said strip guiding means on said supporting frame.

30. A feed device for a document photographing machine comprising a supporting frame, a pair of side frames mounted on said supporting frame and extending in spaced parallel relation from one side thereof, a pair of rollers extending between the lower portions of said side frames and rotatably mounted therein to form a spool cradle in cooperation with said side frames, a pair of arms each pivoted on one of said side frames and having the free ends extending above said side frames, a spool retaining roller mounted in the free ends of said arms, means for normally operating said arms to cause said spool retaining roller to engage the periphery of the ends of a spool in said cradle to retain said ends in rolling engagement with said pair of rollers in said cradle and spool centering means mounted in said side frames for engaging opposite ends of a spool in said cradle for holding it in centered relation in said cradle and providing a brake for tensioning the strip on said spool during the unwinding operation.

31. A feed device for a document photographing machine comprising a supporting frame, a pair of side frames mounted on said supporting frame and extending in spaced parallel relation from one side of said supporting frame, a plurality of rollers rotatably mounted on and extending between said side frames for cooperation to form a cradle for receiving and retaining a spool therein for rotary movement with the peripheries of the spool ends engaged with said rollers, one of said rollers being movable into and out of spool holding position to provide for spool insertion and removal from said cradle, a pair of rods slidably mounted one in each side frame for axial movement in coaxial relation with one end of each rod extending into said cradle, a spool engaging member on the end of each of said rods in said cradle, latch means having cooperative parts on one side frame and rod for retaining one of said rods in any one of a plurality of positions for fixing the position of a spool in said cradle, and resilient means actuating the other rod for normally retaining the spool engaging member thereon in engagement with a spool for holding said spool engaged with the spool engaging member of the first-mentioned rod for retaining the spool in a predetermined position in said cradle and applying tension to a strip carried by said spool during unwinding thereof.

32. A feed device for a document photographing machine comprising a supporting frame, a pair of side frames extending laterally from a side thereof in spaced parallel relation, a rod slidably mounted in one side frame for axial movement toward and from the other side frame, a spool supporting member mounted on the end of said rod between said side frames, a shaft rotatably mounted in the other side frame in coaxial relation with said rod, a spool supporting member mounted on the inner end of said shaft for axial movement toward the opposite side frame for cooperation of both spool supporting members to engage opposite ends of a spool and rotatably support it in position between said side frames, said shaft carried spool supporting member having driving cooperation with a spool supported thereby, a driven member rotatably mounted on said shaft, a friction clutch on said shaft engaging said driven member for providing a driving connection to rotate said spool in the rotation of said driven member and means for driving said driven member.

33. A feed device for a document photographing machine comprising a supporting frame, a pair of side frames extending laterally from one side thereof in spaced parallel relation, a spool supporting member adjustably mounted on the inside of one of said side frames for adjustment toward and from the opposite side frame to support a spool between said side frames in a fixed position of adjustment for rotation of said spool to wind a sensitized strip thereon, a shaft rotatably mounted in the other side frame in coaxial relation with said spool supporting member, a member rotatable on said shaft, brake means mounted on said shaft for cooperation with said rotatable member for driving the shaft in the rotation of said member, said brake means also cooperating with said side frame for normally holding said shaft against rotation except by said member, a tubular member mounted on said shaft for rotation therewith and having axial sliding movement relative to said shaft with one end projecting beyond the inner end of said shaft towards the opposite side member, a spool supporting and driving member mounted on the free inner end of said tubular member for driving engagement with the opposite end of a spool supported on said spool supporting member for driving said spool in the rotation of said shaft to wind strip thereon, and resilient means carried by said shaft for normally operating said tubular member to project said spool supporting and driving member inwardly toward said first mentioned spool supporting member and for normally retaining a spool engaged on said spool supporting member and said spool supporting and driving member for rotation in the operation of said rotatable member.

34. A feed device for a document photographing machine comprising a supporting frame, a pair of side frames extending laterally from one side thereof in spaced parallel relation, a spool supporting member rotatably and adjustably mounted in one of said side frames for axial movement toward and from the opposite side frame to position a spool between said side frames, a tubular shaft rotatable in the opposite side frame in axial relation to said spool supporting member, means for rotating said shaft, a sleeve mounted on said shaft for axial sliding movement having one end projecting inwardly beyond said shaft and side frame toward said spool supporting member, a spool supporting member rigidly mounted on the free inner end of said sleeve for cooperation with the first mentioned spool supporting member to engage opposite ends of a spool and support the same between said side frames for rotation thereof to wind strip thereon in the rotation of said shaft, and means for retaining said tubular member in position to retain the spool supporting member thereon in engagement with a spool having a pair of coil springs of different size engaged in telescoping relation, one end of one of said springs being engaged with said sleeve, the opposite end of the other spring being secured against movement relative to said shaft and a floating spring supporting member engaging the opposite ends of each of said springs and supporting them in said telescoping relation for cooperation in projecting said sleeve and spool supporting member thereon into supporting and driving cooperation with one end of a spool supported by the first mentioned spool supporting member.

AMBROSIUS BRIECHLE.

References Cited in the file of this patent

UNITED STATES PATENTS

| Number | Name | Date |
| --- | --- | --- |
| 1,043,619 | Mapson | Nov. 5, 1912 |
| 1,197,732 | Gall | Sept. 12, 1916 |
| 1,455,096 | Roebuck | May 15, 1923 |
| 1,702,494 | Caps | Feb. 19, 1929 |
| 1,800,007 | Caps | Apr. 7, 1931 |
| 1,801,458 | Satterlee | Apr. 21, 1931 |
| 1,801,540 | Caps | Apr. 21, 1931 |
| 1,818,462 | Caps | Aug. 11, 1931 |
| 1,826,599 | Caps | Oct. 6, 1931 |
| 1,833,951 | Morton et al. | Dec. 1, 1931 |
| 1,855,789 | Caps | Apr. 26, 1932 |
| 1,909,424 | Powers | May 16, 1933 |
| 1,919,433 | Hutchings | July 25, 1933 |
| 1,998,324 | Lloyd | Apr. 16, 1935 |
| 2,001,596 | Caps et al. | May 14, 1935 |
| 2,001,597 | Caps | May 14, 1935 |
| 2,001,598 | Caps et al. | May 14, 1935 |
| 2,048,764 | Wood | July 28, 1936 |

(Other references on following page)

UNITED STATES PATENTS

| Number | Name | Date |
|---|---|---|
| 2,091,283 | Johnson | Aug. 31, 1937 |
| 2,166,419 | O'Neill | July 18, 1939 |
| 2,124,223 | Zaengle | July 19, 1938 |
| 2,125,004 | Hamerstadt | July 26, 1938 |
| 2,153,902 | Tondreau | Apr. 11, 1939 |
| 2,227,987 | Tuttle | Jan. 7, 1941 |
| 2,228,880 | Landrock | Jan. 14, 1941 |
| 2,232,966 | Peterson | Feb. 25, 1941 |
| 2,251,570 | Hessert | Aug. 5, 1941 |
| 2,287,271 | Powers | June 23, 1942 |
| 2,321,486 | Holt | June 8, 1943 |
| 2,335,189 | Mayer | Nov. 23, 1943 |
| 2,350,831 | Schubert | June 6, 1944 |
| 2,359,429 | Langdon | Oct. 3, 1944 |
| 2,371,542 | Place | Mar. 13, 1945 |
| 2,419,474 | Wilcox | Apr. 22, 1947 |